US012793277B2

(12) United States Patent
Oh et al.

(10) Patent No.: US 12,793,277 B2
(45) Date of Patent: Nov. 10, 2026

(54) POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

(71) Applicant: LG Electronics Inc., Seoul (KR)

(72) Inventors: Hyunmook Oh, Seoul (KR); Sejin Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 403 days.

(21) Appl. No.: 18/034,310

(22) PCT Filed: Nov. 1, 2021

(86) PCT No.: PCT/KR2021/015587
§ 371 (c)(1),
(2) Date: Apr. 27, 2023

(87) PCT Pub. No.: WO2022/092971
PCT Pub. Date: May 5, 2022

(65) Prior Publication Data

US 2023/0386088 A1 Nov. 30, 2023

(30) Foreign Application Priority Data

Oct. 30, 2020 (KR) ........................ 10-2020-0143690

(51) Int. Cl.
*H04N 19/174* (2014.01)
*G06T 9/00* (2006.01)
*H04N 19/119* (2014.01)
*H04N 19/30* (2014.01)
(Continued)

(52) U.S. Cl.
CPC ........... *G06T 9/001* (2013.01); *H04N 19/119* (2014.11); *H04N 19/174* (2014.11); *H04N 19/30* (2014.11); *H04N 19/597* (2014.11); *H04N 19/91* (2014.11)

(58) Field of Classification Search
None
See application file for complete search history.

(56) References Cited

U.S. PATENT DOCUMENTS

2017/0347122 A1 11/2017 Chou et al.
2020/0043182 A1 2/2020 Janus et al.
(Continued)

FOREIGN PATENT DOCUMENTS

| | | | |
|---|---|---|---|
| KR | 20200007733 | A | 1/2020 |
| KR | 20200007735 | A | 1/2020 |
| WO | 2020190090 | A1 | 9/2020 |

OTHER PUBLICATIONS

"G-PCC codec description v8", O/IEC JTC 1/SC 29/WG 11, Coding of moving pictures and audio Convenorship: JISC (Japan). Oct. 2, 2020. N19525.

*Primary Examiner* — Mark R Milia
(74) *Attorney, Agent, or Firm* — Bryan Cave Leighton Paisner LLP

(57) ABSTRACT

A point cloud data transmission method according to embodiments may comprise the steps of: encoding geometry data of point cloud data; encoding attribute data of the point cloud data on the basis of the geometry data; and transmitting the encoded geometry data, the encoded attribute data, and signaling data.

12 Claims, 52 Drawing Sheets

(51) Int. Cl.
*H04N 19/597* (2014.01)
*H04N 19/91* (2014.01)

(56) References Cited

U.S. PATENT DOCUMENTS

2021/0004992 A1* 1/2021 Flynn ...................... G06T 17/10
2022/0286713 A1 9/2022 Oh et al.

* cited by examiner (b)

FIG. 35

| seq_parameter_set( ) { | Descriptor |
|---|---|
| main_profile_compatibility_flag | u(1) |
| unique_point_positions_constraint_flag | u(1) |
| level_idc | u(8) |
| sps_seq_parameter_set_id | ue(v) |
| sps_bounding_box_present_flag | u(1) |
| if( sps_bounding_box_present_flag ) { | |
| sps_bounding_box_offset_x | se(v) |
| sps_bounding_box_offset_y | se(v) |
| sps_bounding_box_offset_z | se(v) |
| sps_bounding_box_offset_log2_scale | ue(v) |
| sps_bounding_box_size_width<br>sps_bounding_box_size_height | ue(v)<br>ue(v) |
| sps_bounding_box_size_depth | ue(v) |
| } | |
| sps_source_scale_factor_numerator_minus1 | ue(v) |
| sps_source_scale_factor_denominator_minus1 | ue(v) |
| sps_num_attribute_sets | ue(v) |
| for( i = 0; i< sps_num_attribute_sets; i++ ) { | |
| attribute_dimension_minus1[ i ] | ue(v) |
| attribute_instance_id[ i ] | ue(v) |
| if(attribute_dimension_minus1[ i ] > 0 ) | |
| attribute_secondary_bitdepth_minus1[ i ] | ue(v) |
| attribute_cicp_colour_primaries[ i ] | ue(v) |
| attribute_cicp_transfer_characteristics[ i ] | ue(v) |
| attribute_cicp_matrix_coeffs[ i ] | ue(v) |
| attribute_cicp_video_full_range_flag[ i ] | u(1) |
| known_attribute_label_flag[ i ]<br>if( known_attribute_label_flag[ i ] ) | u(1) |
| known_attribute_label[ i ] | ue(v) |
| else | |
| attribute_label_four_bytes[ i ] | u(32) |
| } | |
| log2_max_frame_idx | u(5) |
| axis_coding_order | u(3) |
| sps_bypass_stream_enabled_flag | u(1) |
| sps_extension _flag<br>if( sps_extension _flag ) | u(1) |
| while( more_data_in_byte_stream( ) ) | |
| sps_extension_data_flag | u(1) |
| byte_alignment( ) | |
| } | |

FIG. 36

| seq_parameter_set( ) { | Descriptor |
|---|---|
| ...... | |
| scalable_transmission_enable_flag | u(1) |
| ...... | |
| } | |

FIG. 37

| geometry_parameter_set( ) { | Descriptor |
|---|---|
| gps_geom_parameter_set_id | ue(v) |
| gps_seq_parameter_set_id | ue(v) |
| gps_box_present_flag | u(1) |
| if ( gps_box_present_flag ){ | |
| gps_gsh_box_log2_scale_present_flag | u(1) |
| if ( gps_gsh_box_log2_scale_present_flag = = 0 ) | |
| gps_gsh_box_log2_scale | ue(v) |
| } | |
| unique_geometry_points_flag | u(1) |
| geometry_planar_mode_flag | u(1) |
| if( geometry_planar_mode_flag ){ | |
| geom_planar_mode_th_idcm | ue(v) |
| geom_planar_mode_th[ 1 ] | ue(v) |
| geom_planar_mode_th[ 2 ] | ue(v) |
| } | |
| geometry_angular_mode_flag | u(1) |
| if ( geometry_angular_mode_flag ){ | |
| lidar_head_position[0] | se(v) |
| lidar_head_position[1] | se(v) |
| lidar_head_position[2] | se(v) |
| number_lasers | ue(v) |
| for( i = 0; i < number_lasers; i++ ) { | |
| laser_angle[ i ] | se(v) |
| laser_correction[ i ] | se(v) |
| } | |
| planar_buffer_disabled | u(1) |
| implicit_qtbt_angular_max_node_min_dim_log2_to_split_z | se(v) |
| implicit_qtbt_angular_max_diff_to_split_z | se(v) |
| } | |
| neighbour_context_restriction_flag | u(1) |
| inferred_direct_coding_mode_enabled_flag | u(1) |
| bitwise_occupancy_coding_flag | u(1) |
| adjacent_child_contextualization_enabled_flag | u(1) |
| log2_neighbour_avail_boundary | ue(v) |
| log2_intra_pred_max_node_size | ue(v) |
| log2_trisoup_node_size | ue(v) |
| geom_scaling_enabled_flag | u(1) |
| if ( geom_scaling_enabled_flag ) | |
| geom_base_qp | ue(v) |
| gps_implicit_geom_partition_flag | u(1) |
| if ( gps_implicit_geom_partition_flag ) { | |
| gps_max_num_implicit_qtbt_before_ot | ue(v) |
| gps_min_size_implicit_qtbt | ue(v) |
| } | |
| gps_extension _flag | u(1) |
| if ( gps_extension _flag ) | |
| while( more_data_in_byte_stream ( ) ) | |
| gps_extension_data_flag | u(1) |
| byte_alignment( ) | |
| } | |

FIG. 38

| geometry_parameter_set( ) { | Descriptor |
|---|---|
| …… | |
| if(scalable_transmission_enable_flag ) { | |
| geom_scalable_transmission_enable_flag | u(1) |
| if( geom_scalable_transmission_enable_flag ) { | |
| num_scalable_layers | ue(v) |
| for(i=0; i<num_scalable_layers; i++) { | |
| scalable_layer_id[i] | u(8) |
| if(geom_tree_type == 0 ) // octree | |
| num_octree_layers_in_scalable_layer[i] | u(8) |
| tree_depth_start[i] | u(8) |
| tree_depth_end[i] | u(8) |
| node_size[i] | u(8) |
| num_nodes[i] | u(8) |
| } | |
| num_slices_in_scalable_layer[i] | u(8) |
| for( j=0; j<num_slices_in_scalable_layers; j++) | |
| sub_group_id[i][j]<br>num_nodes_in_subgroup[i][j] | u(8)<br>u(8) |
| bitstream_type[i][j] | u(8) |
| slice_id[i][j] | u(8) |
| } | |
| } | |
| } | |
| …… | |
| } | |

FIG. 39

| attribute_parameter_set( ) { | Descriptor |
|---|---|
| aps_attr_parameter_set_id | ue(v) |
| aps_seq_parameter_set_id | ue(v) |
| attr_coding_type | ue(v) |
| aps_attr_initial_qp | ue(v) |
| aps_attr_chroma_qp_offset | se(v) |
| aps_slice_qp_delta_present_flag | u(1) |
| LodParametersPresent = ( attr_coding_type == 0 \|\| attr_coding_type == 2 ) ? 1 : 0 | |
| if ( LodParametersPresent) { | |
| lifting_num_pred_nearest_neighbours_minus1 | ue(v) |
| lifting_search_range_minus1 | ue(v) |
| for ( k = 0; k < 3; k++ ) | |
| lifting_neighbour_bias[ k ] | ue(v) |
| if ( attr_coding_type == 2 ) | |
| lifting_scalability_enabled_flag | u(1) |
| if ( ! lifting_scalability_enabled_flag ) { | |
| lifting_num_detail_levels_minus1<br>[Ed. The V7.0 code use the variable without minus1. It should be aligned] | ue(v) |
| if ( lifting_num_detail_levels_minus1 > 0 ) { | |
| lifting_lod_regular_sampling_enabled_flag | u(1) |
| for ( idx = 0; idx < num_detail_levels_minus1; idx++ ) { | |
| if ( lifting_lod_regular_sampling_enabled_flag ) | |
| lifting_sampling_period_minus2[ idx ] | ue(v) |
| else | |
| lifting_sampling_distance_squared_scale_minus1[ idx ] | ue(v) |
| if ( idx != 0 ) | |
| lifting_sampling_distance_squared_offset[ idx ] | ue(v) |
| } | |
| } | |
| } | |
| if ( attr_coding_type == 0 ) { | |
| lifting_adaptive_prediction_threshold | ue(v) |
| lifting_intra_lod_prediction_num_layers | ue(v) |
| lifting_max_num_direct_predictors | ue(v) |
| inter_component_prediction_enabled_flag | u(1) |
| } | |
| } | |
| if ( attribute_coding_type == 1 ) { //RAHT | |
| raht_prediction_enabled_flag | u(1) |
| if (raht_prediction_enabled_f lag) { | |
| raht_prediction_threshold0 | ue(v) |
| raht_prediction_threshold1 | ue(v) |
| } | |
| } | |
| aps_extension _flag | u(1) |
| if( aps_extension _flag ) | |
| while( more_data_in_byte_stream( ) ) | |
| aps_extension_data_flag | u(1) |
| byte_alignment( ) | |
| } | |

FIG. 40

| attribute_parameter_set( ) { | Descriptor |
|---|---|
| …… | |
| if(scalable_transmission_enable_flag ) { | |
| attr_scalable_transmission_enable_flag | u(1) |
| if( attr_scalable_transmission_enable_flag ) { | |
| aligned_slice_structure_enabled_flag | u(1) |
| if( aligned_slice_structure_enabled_flag ) { | |
| num_scalable_layers | ue(v) |
| for(i=0; i<num_scalable_layers; i++) | |
| num_slices_in_scalable_layer[i] | u(8) |
| for( j=0; j<num_slices_in_scalable_layers; j++) | |
| slice_id_offsets[i][j] | u(8) |
| } | |
| else { | |
| num_scalable_layers<br>for(i=0; i<num_scalable_layers; i++) { | ue(v) |
| scalable_layer_id[i] | u(8) |
| corresponding_geom_scalable_layer[i] | u(8) |
| num_octree_layers_in_scalable_layer[i] | u(8) |
| tree_depth_start[i] | u(8) |
| tree_depth_end[i] | u(8) |
| node_size[i] | u(8) |
| num_nodes[i] | u(8) |
| num_slices_in_scalable_layer[i] | u(8) |
| for( j=0; j<num_slices_in_scalable_layers; j++) | |
| slice_id[i][j] | u(8) |
| } | |
| } | |
| } | |
| } | |
| …… | |
| } | |

FIG. 41

| geometry_slice_bitstream( ) { | Descriptor |
|---|---|
| geometry_slice_header( ) | |
| geometry_slice_data( ) | |
| } | |

FIG. 42

| geometry_slice_header( ) { | Descriptor |
|---|---|
| gsh_geometry_parameter_set_id | ue(v) |
| gsh_tile_id | ue(v) |
| gsh_slice_id | ue(v) |
| frame_idx | u(n) |
| gsh_num_points | u(24) |
| if( gps_box_present_flag ) { | |
| if( gps_gsh_box_log2_scale_present_flag ) | |
| gsh_box_log2_scale<br>gsh_box_origin_x | ue(v)<br>ue(v) |
| gsh_box_origin_y | ue(v) |
| gsh_box_origin_z | ue(v) |
| } | |
| if ( gps_implicit_geom_partition_flag ) { | |
| gsh_log2_max_nodesize_x | ue(v) |
| gsh_log2_max_nodesize_y_minus_x | se(v) |
| gsh_log2_max_nodesize_z_minus_y | se(v) |
| } else { | |
| gsh_log2_max_nodesize | ue(v) |
| } | |
| if( geom_scaling_enabled_flag ) { | |
| geom_slice_qp_offset | se(v) |
| geom_octree_qp_offsets_enabled_flag | u(1) |
| if( geom_octree_qp_offsets_enabled_flag ) | |
| geom_octree_qp_offsets_depth | ue(v) |
| } | |
| byte_alignment( ) | |
| } | |

FIG. 43

| geometry_data_unit_header( ) { | Descriptor |
|---|---|
| ...... | |
| slice_id<br>bitstream_type | u(8) |
| if( geom_scalable_transmission_enable_flag ) { | |
| scalable_layer_id | u(8) |
| if(num_slices_in_scalable_layer[scalable_layer_id]) | |
| sub_group_id | u(8) |
| num_tree_depth_in_data_unit | u(8) |
| for(i=0; i<num_tree_depth_in_data_unit; i++) { | |
| tree_depth[i] | u(8) |
| num_nodes[i] | u(8) |
| num_nodes_in_subgroup[i][sub_group_id] | u(8) |
| } | |
| bitstream_type | u(2) |
| if( bitstream_type == 2 ) { | |
| dc_bitstream_offset | u(8) |
| dc_bitstream_length | u(8) |
| dc_backward_enabled_flag | u(1) |
| } | |
| } | |
| ref_slice_id | u(8) |
| ...... | |
| } | |

FIG. 44

| geometry_slice_data( ) { | Descriptor |
|---|---|
| for( depth = 0; depth < MaxGeometryOctreeDepth; depth++ ) { | |
| for( nodeIdx = 0; nodeIdx < NumNodesAtDepth[ depth ]; nodeIdx++ ) { | |
| xN = NodeX[ depth ][ nodeIdx ] | |
| yN = NodeY[ depth ][ nodeIdx ] | |
| zN = NodeZ[ depth ][ nodeIdx ] | |
| geometry_node( depth, nodeIdx, xN, yN, zN ) | |
| } | |
| } | |
| if ( log2_trisoup_node_size > 0 ) | |
| geometry_trisoup_data( ) | |
| } | |

FIG. 45

| attribute_slice_bitstream( ) { | Descriptor |
|---|---|
| attribute_slice_header( ) | |
| attribute_slice_data( ) | |
| } | |

FIG. 46

| attribute_slice_header( ) { | Descriptor |
|---|---|
| ash_attr_parameter_set_id | ue(v) |
| ash_attr_sps_attr_idx | ue(v) |
| ash_attr_geom_slice_id | ue(v) |
| if ( aps_slice_qp_delta_present_flag ) { | |
| ash_attr_qp_delta_luma | se(v) |
| if( attribute_dimension_minus1[ ash_attr_sps_attr_idx ] > 0 ) | |
| ash_attr_qp_delta_chroma | se(v) |
| } | |
| ash_attr_layer_qp_delta_present_flag | u(1) |
| if ( ash_attr_layer_qp_delta_present_flag ) { | |
| ash_attr_num_layer_qp_minus1 | ue(v) |
| for( i = 0; i < NumLayerQp; i++ ){<br>ash_attr_layer_qp_delta_luma[i] | <br>se(v) |
| if( attribute_dimension_minus1[ ash_attr_sps_attr_idx ] > 0 ) | |
| ash_attr_layer_qp_delta_chroma[i] | se(v) |
| } | |
| } | |
| ash_attr_region_qp_delta_present_flag | u(1) |
| if ( ash_attr_region_qp_delta_present_flag ) { | |
| ash_attr_qp_region_box_origin_x | ue(v) |
| ash_attr_qp_region_box_origin_y | ue(v) |
| ash_attr_qp_region_box_origin_z | ue(v) |
| ash_attr_qp_region_box_width | ue(v) |
| ash_attr_qp_region_box_height | ue(v) |
| ash_attr_qp_region_box_depth | ue(v) |
| ash_attr_region_qp_delta<br>} | se(v) |
| byte_alignment( ) | |
| } | |

FIG. 47

| attribute_data_unit_header( ) { | Descriptor |
|---|---|
| ...... | |
| slice_id | u(8) |
| if( attr_scalable_transmission_enable_flag ) { | |
| if (aligned_slice_structure_enabled_flag ) | |
| aligned_geom_data_unit_id | u(8) |
| else { | |
| scalable_layer_id | u(8) |
| num_tree_depth_in_data_unit | u(8) |
| for(i=0; i<num_tree_depth_in_data_unit; i++) { | |
| tree_depth[i] | u(8) |
| num_nodes[i] | u(8) |
| } <br> } | |
| } | |
| ref_slice_id | u(8) |
| ...... <br> } | |

FIG. 48

| attribute_slice_data( ) { | Descriptor |
| --- | --- |
| dimension = attribute_dimension[ ash_attr_sps_attr_idx ] | |
| zerorun<br>for( i = 0; i < pointCount; i++ ) { | ae(v) |
| if( attr_coding_type = = 0 &&<br>maxPredDiff[ i ] > lifting_adaptive_prediction_threshold &&<br>MaxNumPredictors > 1 ) { | |
| predIndex[ i ] | ae(v) |
| } | |
| if( zerorun > 0 ) { | |
| for( k = 0; k < dimension ; k++ ) | |
| values[ k ][ i ] = 0 | |
| zerorun −= 1 | |
| } | |
| else { | |
| attribute_coding( dimension, i ) | ae(v) |
| zerorun | ae(v) |
| } | |
| } | |
| byte_alignment( ) | |
| } | |

POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

This application is a National Phase application under 35 U.S.C. 371 of International Application No. PCT/KR2021/015587, filed on Nov. 1, 2021, which claims the benefit of Korean Application No. 10-2020-0143690, filed on Oct. 30, 2020, the contents of which are incorporated by reference herein in their entirety.

TECHNICAL FIELD

Embodiments relate to a method and apparatus for processing point cloud content.

BACKGROUND ART

Point cloud content is content represented by a point cloud, which is a set of points belonging to a coordinate system representing a three-dimensional space (or volume). The point cloud content may express media configured in three dimensions, and is used to provide various services such as virtual reality (VR), augmented reality (AR), mixed reality (MR), extended reality (XR), and self-driving services. However, tens of thousands to hundreds of thousands of point data are required to represent point cloud content. Therefore, there is a need for a method for efficiently processing a large amount of point data.

In other words, a high throughput is required to transmit and receive data of the point cloud. Accordingly, in the process of transmitting and receiving the point cloud data, in which encoding for compression and decoding for decompression are performed, the computational operation is complicated and time-consuming due to the large volume of the point cloud data.

DISCLOSURE

Technical Problem

An object of the present disclosure devised to solve the above-described problems is to provide a point cloud data transmission device, a point cloud data transmission method, a point cloud data reception device, and a point cloud data reception method for efficiently transmitting and receiving a point cloud.

Another object of the present disclosure is to provide a point cloud data transmission device, a point cloud data transmission method, a point cloud data reception device, and a point cloud data reception method for addressing latency and encoding/decoding complexity.

The objects of the present disclosure are not limited only what has been described hereinabove and the scope of the present disclosure may be extended to other objects that may be inferred by those skilled in the art based on the entire contents of the present document.

Technical Solution

To achieve these objects and other advantages and in accordance with embodiments, a point cloud data transmission method includes encoding geometry data of point cloud data, encoding attribute data of the point cloud data based on the geometry data, and transmitting the encoded geometry data, the encoded attribute data, and signaling data.

In one embodiment, the encoded geometry data may be segmented into one or more geometry slices, wherein one of the one or more geometry slices may contain direct coding-based geometry data and arithmetic entropy coding-based geometry data.

In one embodiment, the encoded geometry data may be segmented into one or more geometry slices, wherein one of the one or more geometry slices may contain direct coding-based geometry data, and one of the one or more geometry slices may contain arithmetic entropy coding-based geometry data.

In one embodiment, the encoded attribute data may be segmented into one or more geometry slices.

In one embodiment, the signaling data may include information on the one or more slices and information related to direct coding.

In accordance with embodiments, a point cloud data transmission device includes a geometry encoder configured to encode geometry data of point cloud data, an attribute encoder configured to encode attribute data of the point cloud data based on the geometry data, and a transmitter configured to transmit the encoded geometry data, the encoded attribute data, and signaling data.

In one embodiment, the encoded geometry data may be segmented into one or more geometry slices, wherein one of the one or more geometry slices may contain direct coding-based geometry data and arithmetic entropy coding-based geometry data.

In one embodiment, the encoded geometry data may be segmented into one or more geometry slices, wherein one of the one or more geometry slices may contain direct coding-based geometry data, and one of the one or more geometry slices may contain arithmetic entropy coding-based geometry data.

In one embodiment, the encoded attribute data may be segmented into one or more geometry slices.

In one embodiment, the signaling data may include information on the one or more slices and information related to direct coding.

In accordance with embodiments, a point cloud data reception device may include receiving geometry data, attribute data, and signaling data, decoding the geometry data based on the signaling data, decoding the attribute data based on the signaling data and the decoded geometry data, and rendering the decoded point cloud data based on the signaling data.

In one embodiment, the geometry data may be contained in one or more geometry slices, wherein one of the one or more geometry slices may contain direct coding-based geometry data and arithmetic entropy coding-based geometry data.

In one embodiment, the geometry data may be contained in one or more geometry slices, wherein one of the one or more geometry slices may contain direct coding-based geometry data, and one of the one or more geometry slices may contain arithmetic entropy coding-based geometry data.

In one embodiment, the attribute data is contained in one or more geometry slices.

In one embodiment, the signaling data may include information on the one or more slices and information related to direct coding.

Advantageous Effects

A point cloud data transmission method, a point cloud data transmission device, a point cloud data reception method, and a point cloud data reception device according to embodiments may provide a good-quality point cloud service.

A point cloud data transmission method, a point cloud data transmission device, a point cloud data reception method, and a point cloud data reception device according to embodiments may achieve various video codec methods.

A point cloud data transmission method, a point cloud data transmission device, a point cloud data reception method, and a point cloud data reception device according to embodiments may provide universal point cloud content such as a self-driving service (or an autonomous driving service).

A point cloud data transmission method, a point cloud data transmission device, a point cloud data reception method, and a point cloud data reception device according to embodiments may perform space-adaptive partition of point cloud data for independent encoding and decoding of the point cloud data, thereby improving parallel processing and providing scalability.

A point cloud data transmission method, a point cloud data transmission device, a point cloud data reception method, and a point cloud data reception device according to embodiments may perform encoding and decoding by partitioning the point cloud data in units of tiles and/or slices, and signal necessary data therefore, thereby improving encoding and decoding performance of the point cloud.

A point cloud data transmission method, a point cloud data transmission device, a point cloud data reception method, and a point cloud data reception device according to embodiments may divide and transmit compressed data of point cloud data according to a predetermined criterion. In addition, when layered coding is used, compressed data may be divided and transmitted according to layers. Accordingly, the storage and transmission efficiency of the transmission device may increase.

According to a point cloud data transmission method, a point cloud data transmission device, a point cloud data reception method, and a point cloud data reception device according to embodiments, when a bitstream is divided into slices and delivered, the receiver may selectively deliver the bitstream to the decoder depending on the decoder performance or the density of the point cloud data to be represented. In this case, as selection is performed before decoding, decoder efficiency may be increased and decoders of various performances may be supported. In addition, when direct compression is used, scalability efficiency may be increased through an independent slice or layer-group-based slice configuration.

DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure.

FIG. 35 shows an embodiment of a syntax structure of a sequence parameter set according to embodiments.

FIG. 36 shows another embodiment of a syntax structure of a sequence parameter set according to embodiments.

FIG. 37 shows an example of a syntax structure of a geometry parameter set according to embodiments.

FIG. 38 shows another example of a syntax structure of a geometry parameter set according to embodiments.

FIG. 39 shows an example of a syntax structure of an attribute parameter set according to embodiments.

FIG. 40 shows an example of a syntax structure of an attribute parameter set according to embodiments.

FIG. 41 shows an example of a syntax structure of a geometry slice bitstream( ) according to embodiments.

FIG. 42 shows an example of a syntax structure of a geometry slice header according to embodiments.

FIG. 43 shows an example of a syntax structure of a geometry data unit header according to embodiments.

FIG. 44 shows an example of a syntax structure of a geometry data unit according to embodiments.

FIG. 45 shows an example of a syntax structure of an attribute slice bitstream( ) according to embodiments.

FIG. 46 shows an example of a syntax structure of an attribute slice header according to embodiments.

FIG. 47 shows another example of a syntax structure of an attribute data unit header according to embodiments.

FIG. 48 shows another example of a syntax structure of an attribute data unit according to embodiments.

BEST MODE

Figure 1:
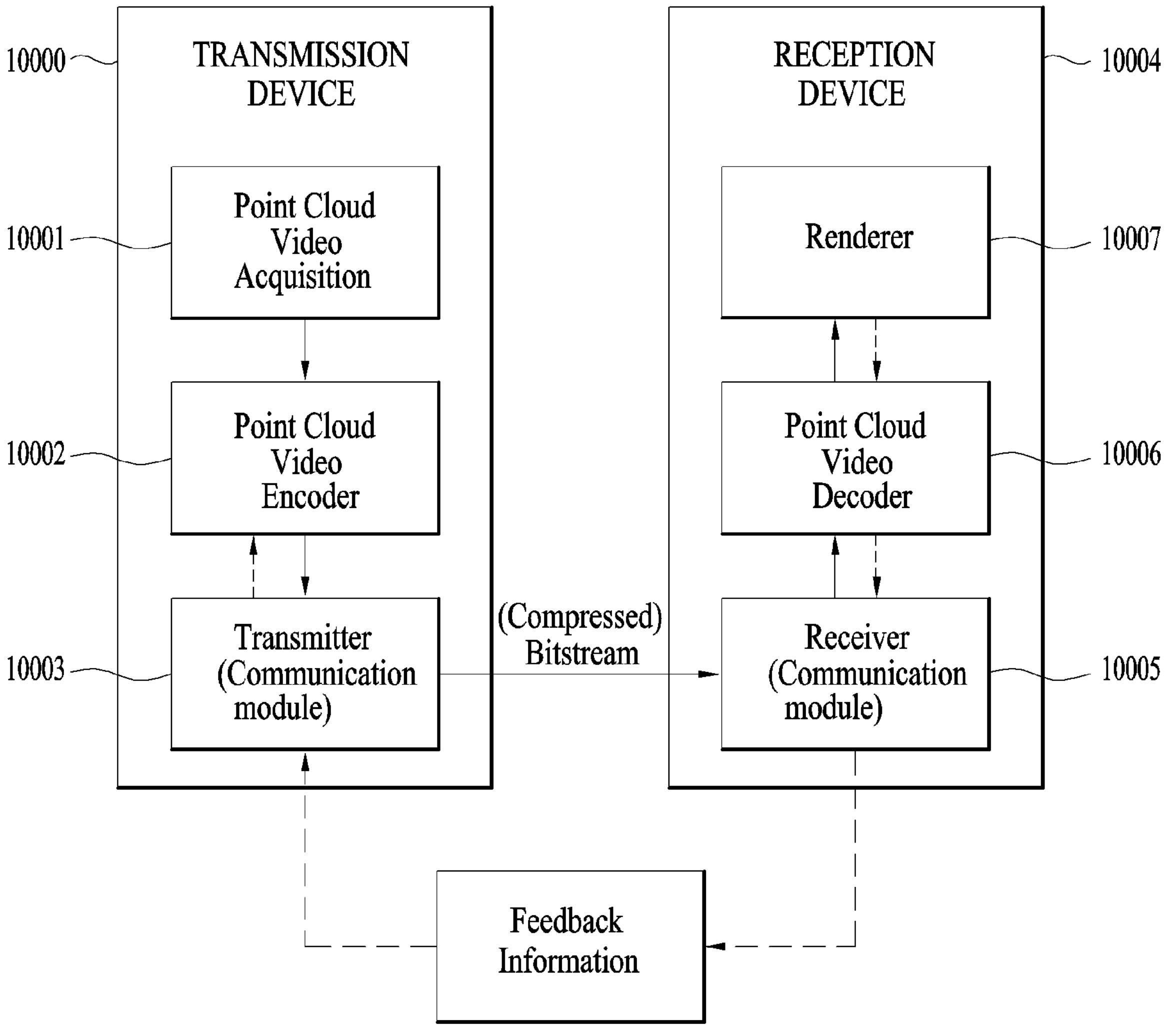
FIG. 1 illustrates an exemplary point cloud content providing system according to embodiments.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. It should be noted that the following examples are only for embodying the present disclosure and do not limit the scope of the present disclosure. What can be easily inferred by an expert in the technical field to which the present disclosure belongs from the detailed description and examples of the present disclosure is to be interpreted as being within the scope of the present disclosure.

The detailed description in this present specification should be construed in all aspects as illustrative and not restrictive. The scope of the disclosure should be determined by the appended claims and their legal equivalents, and all changes coming within the meaning and equivalency range of the appended claims are intended to be embraced therein.

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that may be implemented according to the present disclosure. The following detailed description includes specific details in order to provide a thorough understanding of the present disclosure. However, it will be apparent to those skilled in the art that the present disclosure may be practiced without such specific details. Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings. In addition, the following drawings and detailed description should not be construed as being limited to the specifically described embodiments, but should be construed as including equivalents or substitutes of the embodiments described in the drawings and detailed description.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquisition unit 10001, a point cloud video encoder 10002, and/or a transmitter (or communication module) 10003.

The point cloud video acquisition unit 10001 according to the embodiments acquires a point cloud video through a processing process such as capture, synthesis, or generation. The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (e.g., a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (e.g., a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component or module) separate from the receiver 10005.

The point cloud video decoder 10006 decodes the bitstream containing the point cloud video data. The point cloud video decoder 10006 may decode the point cloud video data according to the method by which the point cloud video data is encoded (e.g., in a reverse process of the operation of the point cloud video encoder 10002). Accordingly, the point cloud video decoder 10006 may decode the point cloud video data by performing point cloud decompression coding, which is the inverse process of the point cloud compression. The point cloud decompression coding includes G-PCC coding.

The renderer 10007 renders the decoded point cloud video data. According to an embodiment, the renderer 10007 may render the decoded point cloud data according to a viewport. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/or the service provider. According to embodiments, the feedback information may be used in the reception device 10004 as well as the transmission device 10000, or may not be provided.

The head orientation information according to the embodiments may represent information about a position, orientation, angle, and motion of a user's head. The reception device 10004 according to the embodiments may calculate viewport information based on the head orientation information. The viewport information is information about a region of a point cloud video that the user is viewing (that is, a region that the user is currently viewing). That is, the viewport information is information about a region that the user is currently viewing in the point cloud video. In other words, the viewport or viewport region may represent a region that the user is viewing in the point cloud video. A viewpoint is a point that the user is viewing in the point cloud video, and may represent a center point of the viewport region. That is, the viewport is a region centered on a viewpoint, and the size and shape of the region may be determined by a field of view (FOV). Accordingly, the reception device 10004 may extract the viewport information based on a vertical or horizontal FOV supported by the device as well as the head orientation information. In addition, the reception device 10004 may perform gaze analysis or the like based on the head orientation information and/or the viewport information to determine the way the user consumes a point cloud video, a region that the user gazes at in the point cloud video, and the gaze time. According to embodiments, the reception device 10004 may transmit feedback information including the result of the gaze analysis to the transmission device 10000. According to embodiments, a device such as a VR/XR/AR/MR display may extract a viewport region based on the position/orientation of a user's head and a vertical or horizontal FOV supported by the device. According to embodiments, the head orientation information and the viewport information may be referred to as feedback information, signaling information, or metadata.

The feedback information according to the embodiments may be acquired in the rendering and/or display process. The feedback information may be secured by one or more sensors included in the reception device 10004. According to embodiments, the feedback information may be secured by the renderer 10007 or a separate external element (or device, component, or the like). The dotted lines in FIG. 1 represent a process of transmitting the feedback information secured by the renderer 10007. The feedback information may not only be transmitted to the transmitting side, but also be consumed by the receiving side. That is, the point cloud content providing system may process (encode/decode/render) point cloud data based on the feedback information. For example, the point cloud video decoder 10006 and the renderer 10007 may preferentially decode and render only the point cloud video for a region currently viewed by the user, based on the feedback information, that is, the head orientation information and/or the viewport information.

The reception device 10004 may transmit the feedback information to the transmission device 10000. The transmission device 10000 (or the point cloud video encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmitting device, a transmitter, a transmission system, or the like, and the reception device 10004 may be called a decoder, a receiving device, a receiver, a reception system, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
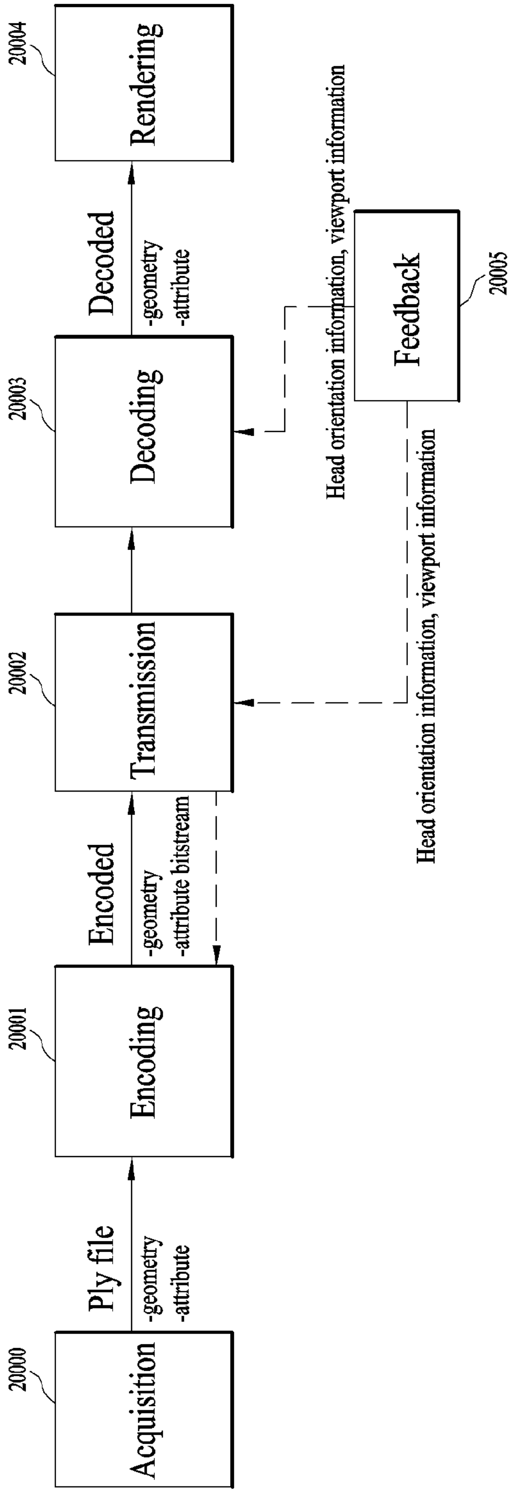
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC). The point cloud content providing system according to the embodiments (e.g., the point cloud transmission device 10000 or the point cloud video acquisition unit 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (e.g., values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, or the like, and the attribute may be called attributes, attribute information, attribute data, or the like.

The point cloud content providing system (e.g., the point cloud transmission device 10000 or the point cloud video acquisition unit 10001) may secure point cloud data from information (e.g., depth information, color information, etc.) related to the acquisition process of the point cloud video.

The point cloud content providing system (e.g., the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (e.g., the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (e.g., signaling information related to the geometry encoding and the attribute encoding). The point cloud content providing system may encapsulate a bitstream that carries the encoded point cloud data and transmit the same in the form of a file or segment.

The point cloud content providing system (e.g., the reception device 10004 or the receiver 10005) according to the embodiments may receive the bitstream containing the encoded point cloud data. In addition, the point cloud content providing system (e.g., the reception device 10004 or the receiver 10005) may demultiplex the bitstream.

The point cloud content providing system (e.g., the reception device 10004 or the point cloud video decoder 10005)

may decode the encoded point cloud data (e.g., the geometry bitstream, the attribute bitstream) transmitted in the bitstream. The point cloud content providing system (e.g., the reception device 10004 or the point cloud video decoder 10005) may decode the point cloud video data based on the signaling information related to encoding of the point cloud video data contained in the bitstream. The point cloud content providing system (e.g., the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (e.g., the reception device 10004 or the point cloud video decoder 10005) may reconstruct the point cloud video based on the positions according to the reconstructed geometry and the decoded attributes.

The point cloud content providing system according to the embodiments (e.g., the reception device 10004 or the renderer 10007) may render the decoded point cloud data (20004). The point cloud content providing system (e.g., the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (e.g., the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

Figure 3:
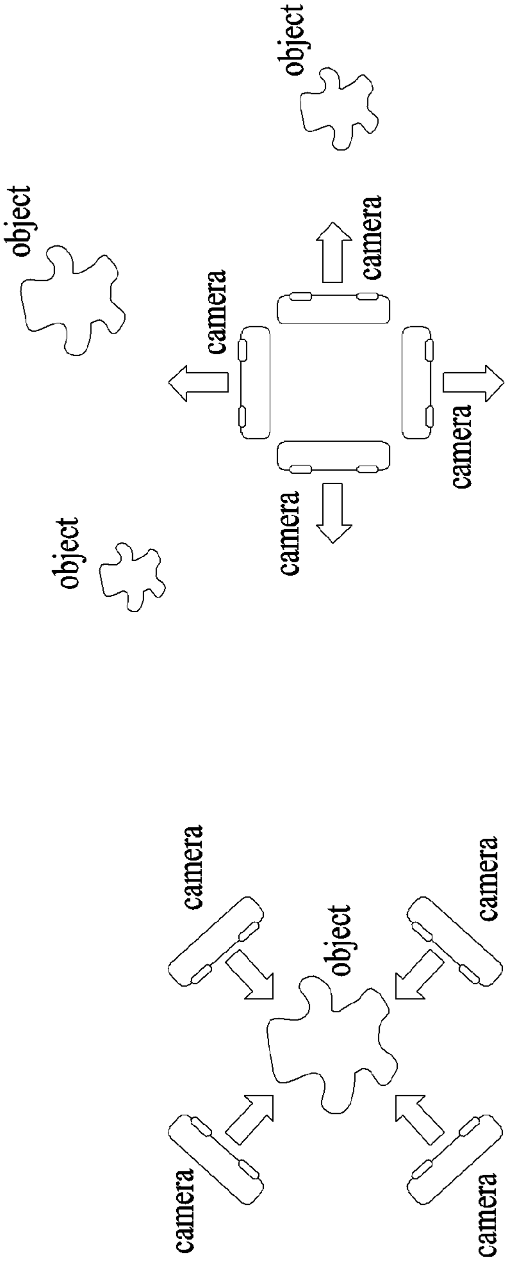
FIG. 3 illustrates an exemplary process of capturing a point cloud video according to embodiments.

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in FIG. 3, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (e.g., a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
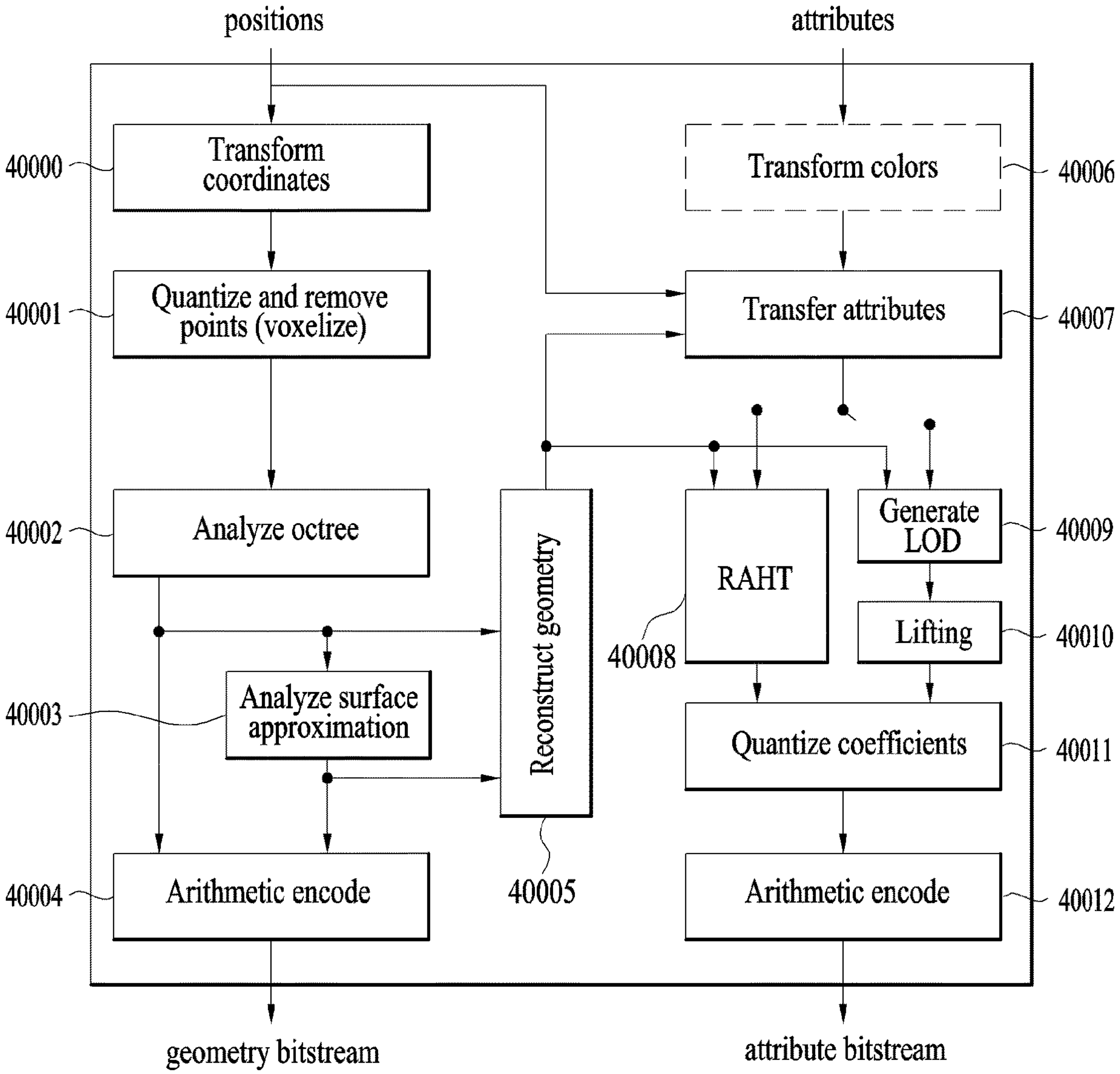
FIG. 4 illustrates an exemplary block diagram of point cloud video encoder according to embodiments.

FIG. 4 illustrates an exemplary point cloud video encoder according to embodiments.

FIG. 4 shows an example of the point cloud video encoder 10002 of FIG. 1. The point cloud video encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 and 2, the point cloud video encoder may perform geometry encoding and attribute encoding. The geometry encoding is performed before the attribute encoding.

The point cloud video encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometry reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (e.g., a three-dimensional space represented by an XYZ coordinate system). The position information in the three-dimensional space according to the embodiments may be referred to as geometry information.

The quantizer 40001 according to the embodiments quantizes the geometry information. For example, the quantizer 40001 may quantize the points based on a minimum position value of all points (e.g., a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. The voxelization means a minimum unit representing position information in 3D space. Points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center point of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (e.g., from RGB to YCbCr). The operation of the color transformer 40006 according to embodiments may be optionally applied according to the color values included in the attributes.

The geometry reconstructor 40005 according to the embodiments reconstructs (decompresses) the octree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighboring points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighboring points existing within a specific position/radius from the position of the center of each voxel based on the K-D tree or the Morton code. The K-D tree is a binary search tree and supports a data structure capable of managing points based on the positions such that nearest neighbor search (NNS) can be performed quickly. The Morton code is generated by presenting coordinates (e.g., (x, y, z)) representing 3D positions of all points as bit values and mixing the bits. For example, when the coordinates representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD). The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud video encoder of FIG. 4 may be implemented by hardware including one or more processors or integrated circuits configured to communicate with one or more memories included in the point cloud content providing apparatus, software, firmware, or a combination thereof. The one or more processors may perform at least one of the operations and/or functions of the elements of the point cloud video encoder of FIG. 4 described above. Additionally, the one or more processors may operate or execute a set of software programs and/or instructions for performing the operations and/or functions of the elements of the point cloud video encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
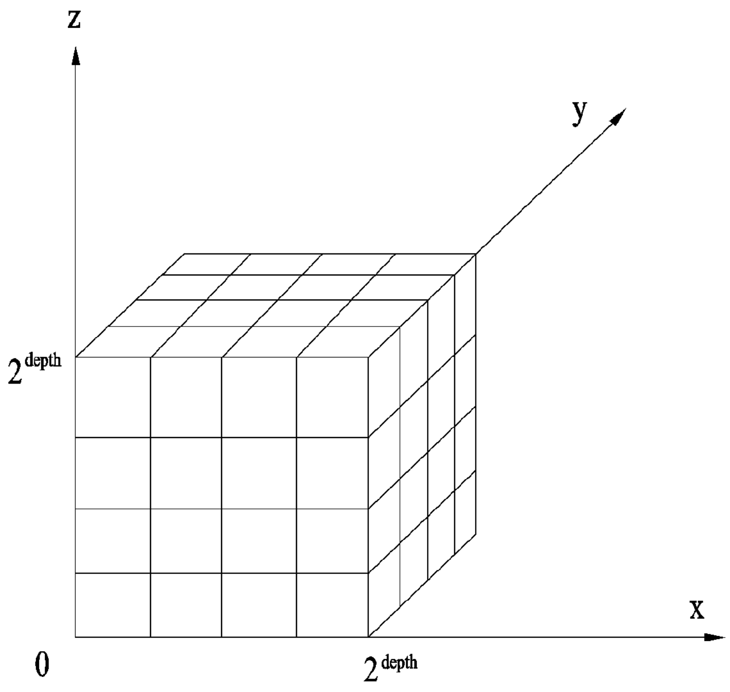
FIG. 5 illustrates an example of voxels in a 3D space according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud video encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and ($2^d$, $2^d$, $2^d$) is recursively subdivided. One voxel includes at least one point. The spatial coordinates of a voxel may be estimated from the positional relationship with a voxel group. As described above, a voxel has an attribute (such as color or reflectance) like pixels of a 2D image/video. The details of the voxel are the same as those described with reference to FIG. 4, and therefore a description thereof is omitted.

Figure 6:
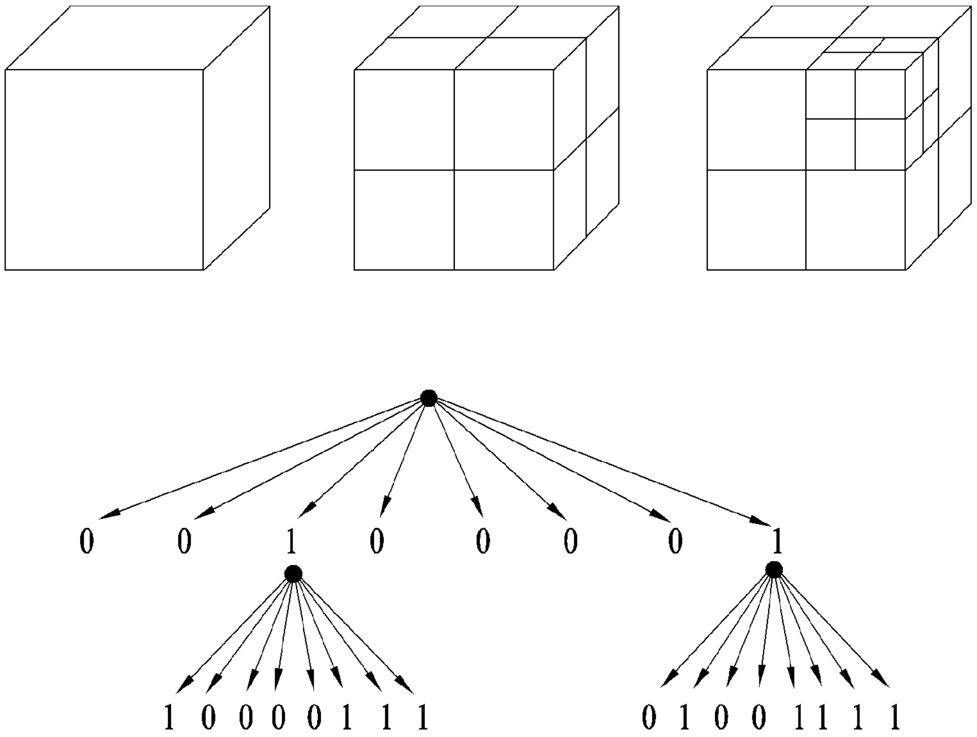
FIG. 6 illustrates an example of octree and occupancy code according to embodiments.

FIG. 6 shows an example of an octree and occupancy code according to embodiments.

As described with reference to FIGS. 1 to 4, the point cloud content providing system (point cloud video encoder 10002) or the octree analyzer 40002 of the point cloud video encoder performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and ($2^d$, $2^d$, $2^d$). Here, $2^d$ may be set to a value constituting the smallest bounding box surrounding all points of the point cloud content (or point cloud video). Here, d denotes the depth of the octree. The value of d is determined in Equation 1. In Equation 1, ($x^{int}_n$, $y^{int}_n$, $z^{int}_n$) denotes the positions (or position values) of quantized points.

$$d = Ceil\left(\text{Log2}\left(\text{Max}\left(x_n^{int}, y_n^{int}, z_n^{int}, n = 1, \ldots, N\right) + 1\right)\right) \quad \text{Equation 1}$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud video encoder (e.g., the arithmetic encoder 40004) according to the embodiments may perform entropy encoding on the occupancy codes. In order to increase the compression efficiency, the point cloud video encoder may perform intra/inter-coding on the occupancy codes. The reception device (e.g., the reception device 10004 or the point cloud video decoder 10006) according to the embodiments reconstructs the octree based on the occupancy codes.

The point cloud video encoder (e.g., the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud video encoder according to the embodiments may skip voxelization and perform direct coding to directly code the positions of points included in the specific region. The coordinates of a direct coding point according to the embodiments are referred to as direct coding mode (DCM). The point cloud video encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud video decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud video encoder (or the arithmetic encoder 40004) according to the embodiments may perform entropy coding on the positions (or position values) of the points.

The point cloud video encoder (e.g., the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud video encoder according to the embodiments may specify a level at which trisoup geometry encoding is to be applied. For example, when the specific level is equal to the depth of the octree, the point cloud video encoder does not operate in the trisoup mode. In other words, the point cloud video encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud video encoder according to the embodiments may perform entropy encoding on the starting point (x, y, z) of the edge, the direction vector (Δx, Δy, Δz) of the edge, and the vertex position value (relative position value within the edge). When the trisoup geometry encoding is applied, the point cloud video encoder according to the embodiments (e.g., the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed according to Equation 2 by: i) calculating the centroid value of each vertex, ii) subtracting the center value from each vertex value, and iii) estimating the sum of the squares of the values obtained by the subtraction.

Equation 2

$$\begin{bmatrix}\mu_x\\ \mu_y\\ \mu_z\end{bmatrix} = \frac{1}{n}\sum_{i=1}^{n}\begin{bmatrix}x_i\\ y_i\\ z_i\end{bmatrix} \quad 1$$

$$\begin{bmatrix}\bar{x}_i\\ \bar{y}_i\\ \bar{z}_i\end{bmatrix} = \begin{bmatrix}x_i\\ y_i\\ z_i\end{bmatrix} - \begin{bmatrix}\mu_x\\ \mu_y\\ \mu_z\end{bmatrix} \quad 2$$

$$\begin{bmatrix}\sigma_x^2\\ \sigma_y^2\\ \sigma_z^2\end{bmatrix} = \sum_{i=1}^{n}\begin{bmatrix}\bar{x}_i\\ \bar{y}_i\\ \bar{z}_i\end{bmatrix} \quad 3$$

Then, the minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of 0 is estimated through a tan 2(bi, ai), and the vertices are ordered based on the value of 0. Table 1 below shows a combination of vertices for creating a triangle according to the number of the vertices. The vertices are ordered from 1 to n. Table 1 below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

TABLE 1

Triangles formed from vertices ordered 1, . . . , n

| n | Triangles |
|---|---|
| 3 | (1, 2, 3) |
| 4 | (1, 2, 3), (3, 4, 1) |
| 5 | (1, 2, 3), (3, 4, 5), (5, 1, 3) |
| 6 | (1, 2, 3), (3, 4, 5), (5, 6, 1), (1, 3, 5) |
| 7 | (1, 2, 3), (3, 4, 5), (5, 6, 7), (7, 1, 3), (3, 5, 7) |
| 8 | (1, 2, 3), (3, 4, 5), (5, 6, 7), (7, 8, 1), (1, 3, 5), (5, 7, 1) |
| 9 | (1, 2, 3), (3, 4, 5), (5, 6, 7), (7, 8, 9), (9, 1, 3), (3, 5, 7), (7, 9, 3) |
| 10 | (1, 2, 3), (3, 4, 5), (5, 6, 7), (7, 8, 9), (9, 10, 1), (1, 3, 5), (5, 7, 9), (9, 1, 5) |
| 11 | (1, 2, 3), (3, 4, 5), (5, 6, 7), (7, 8, 9), (9, 10, 11), (11, 1, 3), (3, 5, 7), (7, 9, 11), (11, 3, 7) |
| 12 | (1, 2, 3), (3, 4, 5), (5, 6, 7), (7, 8, 9), (9, 10, 11), (11, 12, 1), (1, 3, 5), (5, 7, 9), (9, 11, 1), (1, 5, 9) |

The upsampling process is performed to add points in the middle along the edge of the triangle and perform voxelization. The added points are generated based on the upsampling factor and the width of the block. The added points are called refined vertices. The point cloud video encoder according to the embodiments may voxelize the refined vertices. In addition, the point cloud video encoder may perform attribute encoding based on the voxelized positions (or position values).

Figure 7:
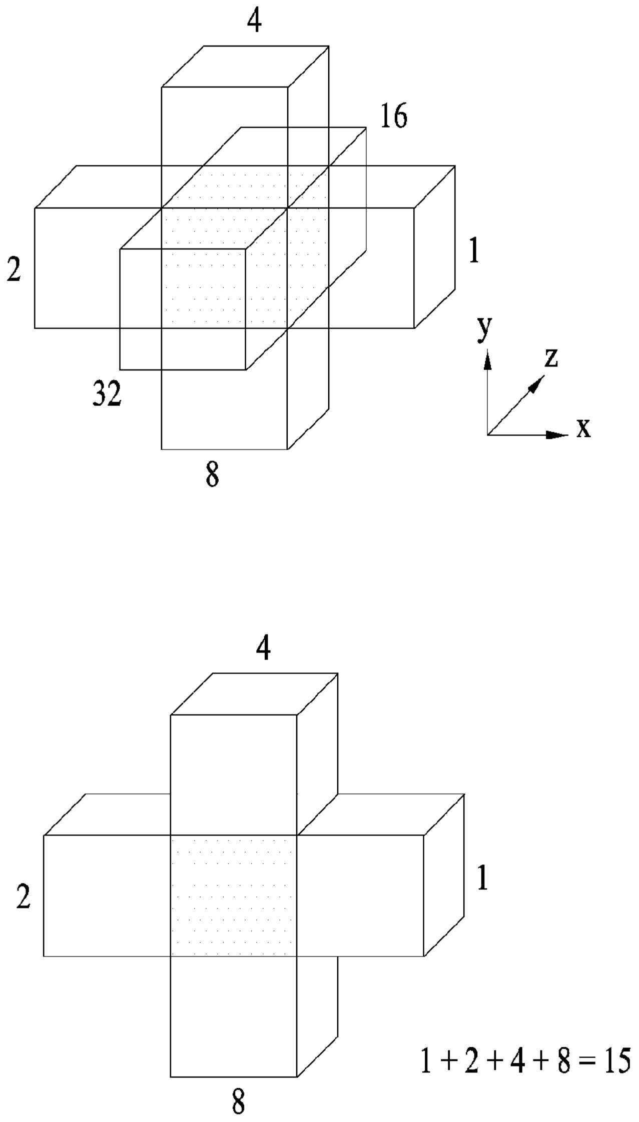
FIG. 7 illustrates an example of a neighbor node pattern according to embodiments.

FIG. 7 shows an example of a neighbor node pattern according to embodiments. In order to increase the compression efficiency of the point cloud video, the point cloud video encoder according to the embodiments may perform entropy coding based on context adaptive arithmetic coding.

The point cloud video encoder may entropy encode based on a context adaptive arithmetic coding to enhance compression efficiency of the point cloud video.

As described with reference to FIGS. 1 to 6, the point cloud content providing system or the point cloud video encoder 10002 of FIG. 1, or the point cloud video encoder or arithmetic encoder 40004 of FIG. 4 may perform entropy coding on the occupancy code immediately. In addition, the point cloud content providing system or the point cloud video encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using $2^3=8$ methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud video encoder according to the embodiments determines occupancy of neighbor nodes of each node of the octree and obtains a value of a neighbor pattern. The neighbor node pattern is used to infer the occupancy pattern of the node. The upper part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The lower part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud video encoder may perform coding according to the neighbor node pattern value (for example, when the neighbor node pattern value is 63, 64 kinds of coding may be performed). According to embodiments, the point cloud video encoder may reduce coding complexity by changing a neighbor node pattern value (based on, for example, a table by which 64 is changed to 10 or 6).

Figure 8:
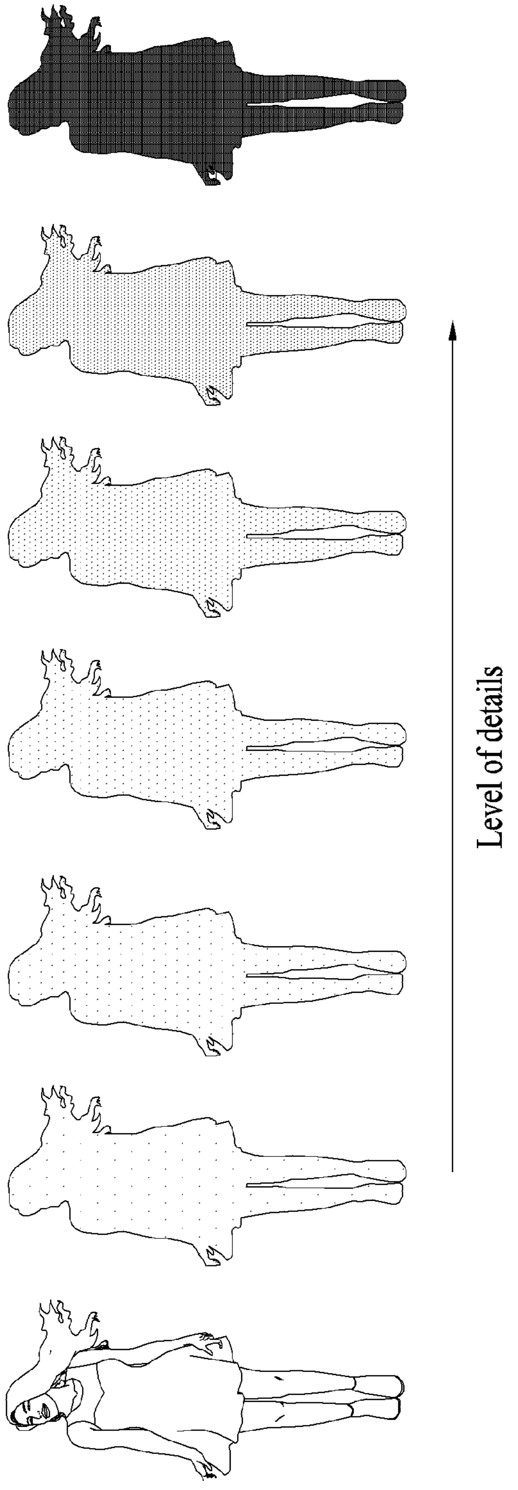
FIG. 8 illustrates an example of point configuration of a point cloud content for each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, upsampling, and voxelization. Since the attribute depends on the geometry, attribute encoding is performed based on the reconstructed geometry.

The point cloud video encoder (e.g., the LOD generator 40009) may classify (or reorganize) points by LOD. FIG. 8 shows the point cloud content corresponding to LODs. The leftmost picture in FIG. 8 represents original point cloud content. The second picture from the left of FIG. 8 represents distribution of the points in the lowest LOD, and the rightmost picture in FIG. 8 represents distribution of the points in the highest LOD. That is, the points in the lowest LOD are sparsely distributed, and the points in the highest LOD are densely distributed. That is, as the LOD rises in the direction pointed by the arrow indicated at the bottom of FIG. 8, the space (or distance) between points is narrowed.

Figure 9:
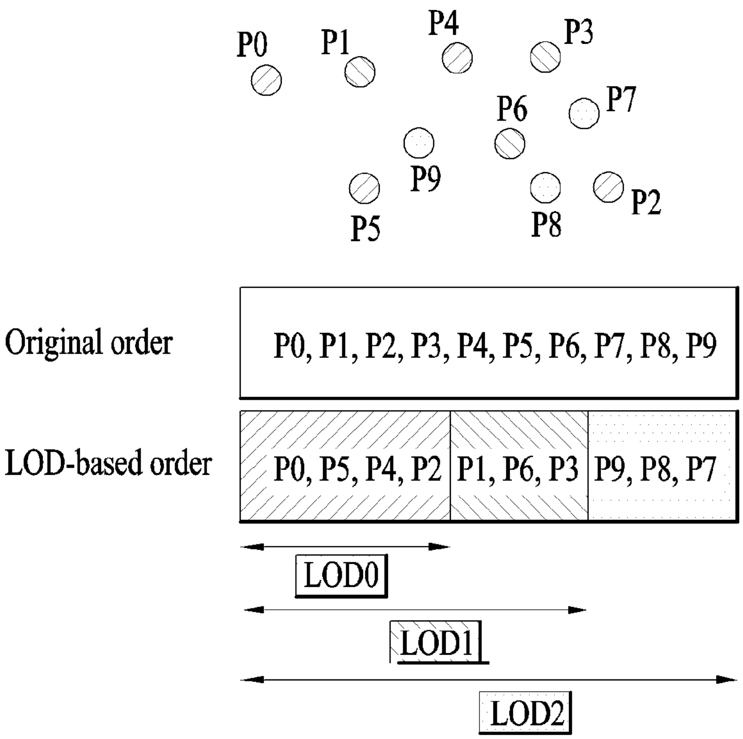
FIG. 9 illustrates an example of point configuration of a point cloud content for each LOD according to embodiments.

FIG. 9 illustrates an example of point configuration for each LOD according to embodiments.

As described with reference to FIGS. 1 to 8, the point cloud content providing system, or the point cloud video encoder (e.g., the point cloud video encoder 10002 of FIG. 1, the point cloud video encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud video encoder, but also by the point cloud video decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud video encoder according to the embodiments may perform prediction transform coding based on LOD, lifting transform coding based on LOD, and RAHT transform coding selectively or in combination.

The point cloud video encoder according to the embodiments may generate a predictor for points to perform prediction transform coding based on LOD for setting a predicted attribute (or predicted attribute value) of each point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud video encoder according to the embodiments (e.g., the coefficient quantizer 40011) may quantize and inversely quantize the residual of each point (which may be called residual attribute, residual attribute value, attribute prediction residual value or prediction error attribute value and so on) obtained by subtracting a predicted attribute (or attribute value) each point from the attribute (i.e., original attribute value) of each point. The quantization process performed for a residual attribute value in a transmission device is configured as shown in table 2. The inverse quantization process performed for a residual attribute value in a reception device is configured as shown in Table 3.

TABLE 2

```
int PCCQuantization(int value, int quantStep) {
if( value >=0) {
return floor(value / quantStep + 1.0 / 3.0);
} else {
return −floor(−value / quantStep + 1.0 / 3.0);
}
}
```

TABLE 3

```
int PCCInverseQuantization(int value, int quantStep) {
if( quantStep ==0) {
return value;
} else {
return value * quantStep;
}
}
```

When the predictor of each point has neighbor points, the point cloud video encoder (e.g., the arithmetic encoder 40012) according to the embodiments may perform entropy coding on the quantized and inversely quantized residual attribute values as described above. 1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.

2) Lift prediction process: Subtract the value obtained by multiplying the attribute value of the point by the weight from the existing attribute value to calculate a predicted attribute value.

3) Create temporary arrays called updateweight and update and initialize the temporary arrays to zero.

4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.

5) Lift update process: Divide the attribute values of the update array for all predictors by the weight value of the updateweight array of the predictor index, and add the existing attribute value to the values obtained by the division.

6) Calculate predicted attributes by multiplying the attribute values updated through the lift update process by the weight updated through the lift prediction process (stored in the QW) for all predictors. The point cloud video encoder (e.g., coefficient quantizer 40011) according to the embodiments quantizes the predicted attribute values. In addition, the point cloud video encoder (e.g., the arithmetic encoder 40012) performs entropy coding on the quantized attribute values.

The point cloud video encoder (e.g., the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud video encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

Equation 3 below represents a RAHT transformation matrix. In Equation 3, $g_{l_{x,y,z}}$ denotes the average attribute value of voxels at level l. $g_{l_{x,y,z}}$ may be calculated based on $g_{l+1_{2x,y,z}}$ and $g_{l+1_{2x+1,y,z}}$. The weights for $g_{l_{2x,y,z}}$ and $g_{l_{2x+1,y,z}}$ are $w1=w_{l_{2x,y,z}}$ and $w2=w_{l_{2x+1,y,z}}$.

$$\begin{bmatrix} g_{l-1_{x,y,z}} \\ h_{l-1_{x,y,z}} \end{bmatrix} T_{w1w2} \begin{bmatrix} g_{l_{2x,y,z}} \\ g_{l_{2x+1,y,z}} \end{bmatrix} \quad \text{Equation 3}$$

$$T_{w1w2} = \frac{1}{\sqrt{w1+w2}} \begin{bmatrix} \sqrt{w1} & \sqrt{w2} \\ -\sqrt{w2} & \sqrt{w1} \end{bmatrix}$$

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (e.g., encoding by the arithmetic encoder 40012). The weights are calculated as $w_{l_{-1}\ x,y,z}=w_{l_{2x,y,z}}+w_{l_{2x,+1,y,z}}$. The root node is created through the $g_{1_{0,0,0}}$ and $g_{1_{0,0,1}}$ as Equation 4.

$$\begin{bmatrix} gDC \\ h0_{0,0,0} \end{bmatrix} = T_{w1000\ w1001} \begin{bmatrix} g1_{0,0,0z} \\ g1_{0,0,1} \end{bmatrix} \quad \text{Equation 4}$$

The value of gDC is also quantized and subjected to entropy coding like the high-pass coefficients.

Figure 10:
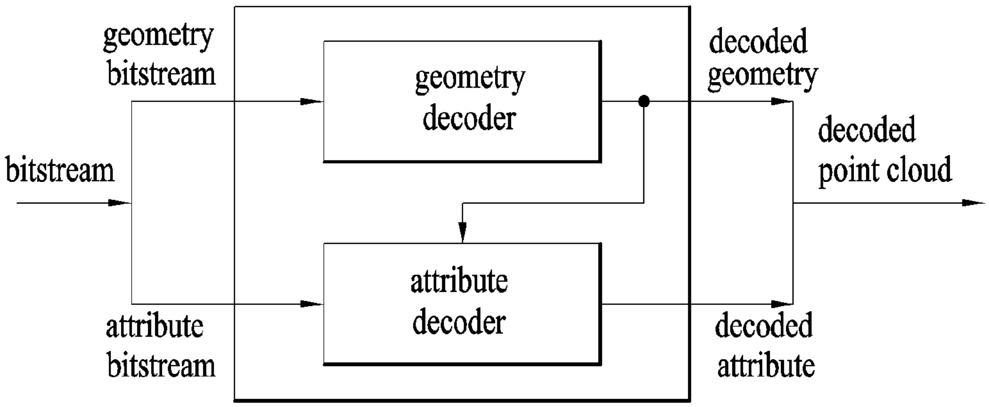
FIG. 10 illustrates an example of a block diagram of a point cloud video decoder according to embodiments.

FIG. 10 illustrates a point cloud video decoder according to embodiments.

The point cloud video decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud video decoder may receive a geometry bitstream and an attribute bitstream contained in one or more bitstreams. The point cloud video decoder includes a geometry decoder and an attribute decoder. The geometry decoder performs geometry decoding on the geometry bitstream and outputs decoded geometry. The attribute decoder performs attribute decoding on the attribute bitstream based on the decoded geometry, and outputs decoded attributes. The decoded geometry and decoded attributes are used to reconstruct point cloud content (a decoded point cloud).

Figure 11:
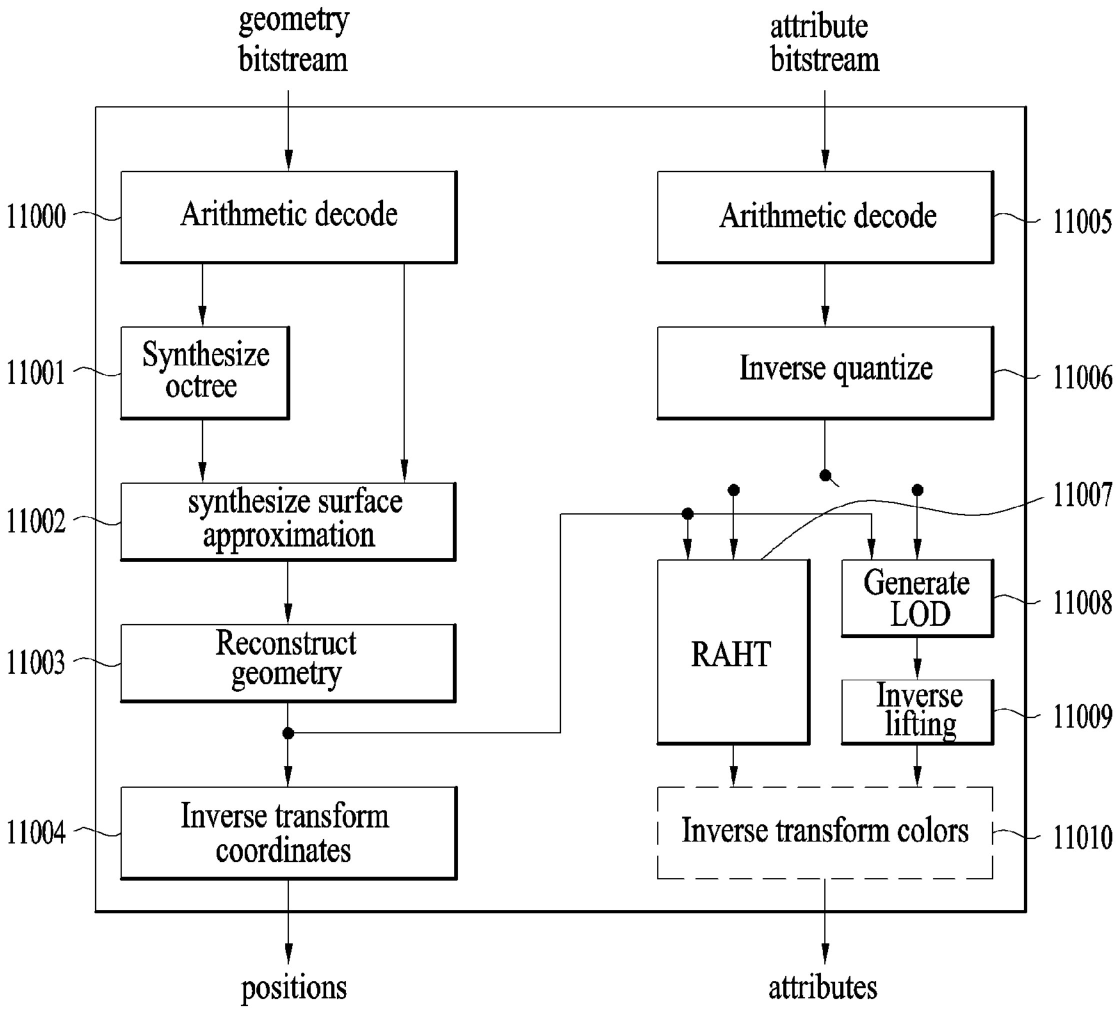
FIG. 11 illustrates an example of a point cloud video decoder according to embodiments.

FIG. 11 illustrates a point cloud video decoder according to embodiments.

The point cloud video decoder illustrated in FIG. 11 is an example of the point cloud video decoder illustrated in FIG. 10, and may perform a decoding operation, which is a reverse process of the encoding operation of the point cloud video encoder illustrated in FIGS. 1 to 9.

As described with reference to FIGS. 1 and 10, the point cloud video decoder may perform geometry decoding and attribute decoding. The geometry decoding is performed before the attribute decoding.

The point cloud video decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, and the geometry reconstructor 11003, and the coordinate inverse transformer 11004 may perform geometry decoding. The geometry decoding according to the embodiments may include direct decoding and trisoup geometry decoding. The direct decoding and trisoup geometry decoding are selectively applied. The geometry decoding is not limited to the above-described example, and is performed as an inverse process of the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the inverse process of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud video encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud video encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud video encoder.

Although not shown in the figure, the elements of the point cloud video decoder of FIG. 11 may be implemented by hardware including one or more processors or integrated circuits configured to communicate with one or more memories included in the point cloud content providing apparatus, software, firmware, or a combination thereof. The one or more processors may perform at least one or more of the operations and/or functions of the elements of the point cloud video decoder of FIG. 11 described above. Additionally, the one or more processors may operate or execute a set of software programs and/or instructions for performing the operations and/or functions of the elements of the point cloud video decoder of FIG. 11.

Figure 12:
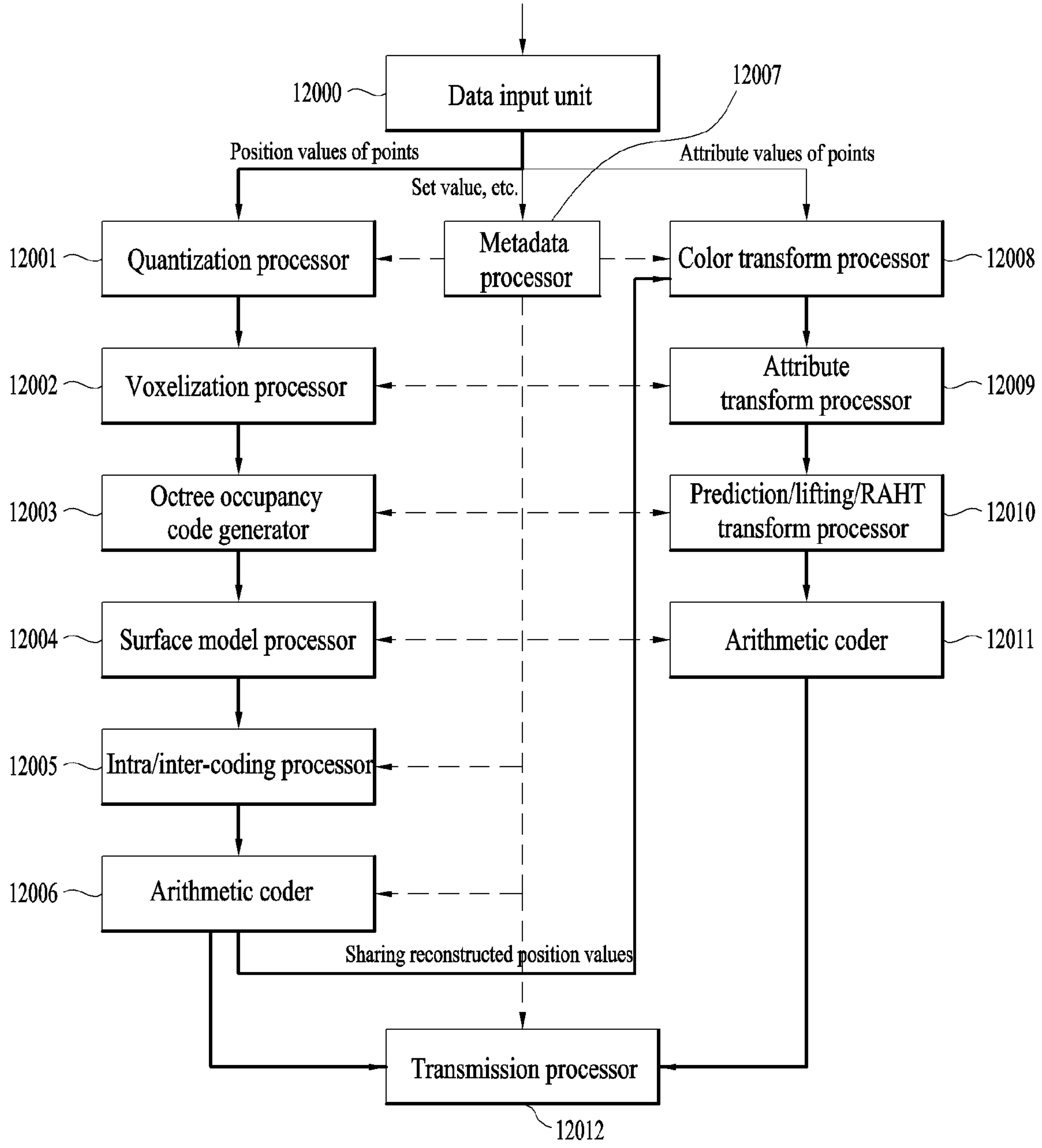
FIG. 12 illustrates a configuration for point cloud video encoding of a transmission device according to embodiments.

FIG. 12 illustrates a transmission device according to embodiments.

The transmission device shown in FIG. 12 is an example of the transmission device 10000 of FIG. 1 (or the point cloud video encoder of FIG. 4). The transmission device illustrated in FIG. 12 may perform one or more of the operations and methods the same as or similar to those of the point cloud video encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same as or similar to the operation and/or acquisition method of the point cloud video acquisition unit 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same as or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same as or similar to the operation and/or quantization of the quantizer 40001 described with reference to FIG. 4. Details are the same as those described with reference to FIGS. 1 to 9.

The voxelization processor 12002 according to embodiments voxelizes the quantized position values of the points. The voxelization processor 12002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same as or similar to the operation and/or method of the point cloud video encoder (or the octree analyzer 40002) described with reference to FIGS. 4 and 6. Details are the same as those described with reference to FIGS. 1 to 9.

The surface model processor 12004 according to the embodiments may perform trisoup geometry encoding based on a surface model to reconstruct the positions of points in a specific region (or node) on a voxel basis. The surface model processor 12004 may perform an operation and/or method the same as or similar to the operation and/or method of the point cloud video encoder (e.g., the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same as or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same as or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same as or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same as or similar to the operation and/or method of the color transformer 40006 described with reference to FIG. 4 is performed. A detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same as or similar to the operation and/or method of the attribute transformer 40007 described with reference to FIG. 4. A detailed description thereof is omitted. The prediction/lifting/RAHT transform processor 12010 according to the embodiments may code the transformed attributes by any one or more combinations of RAHT coding, prediction transform coding, and lifting transform coding. The prediction/lifting/RAHT transform processor 12010 performs at least one of the operations the same as or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same as or similar to the operation and/or method of the arithmetic encoder 40012.

The transmission processor 12012 according to the embodiments may transmit each bitstream containing encoded geometry and/or encoded attributes and metadata, or transmit one bitstream configured with the encoded geometry and/or the encoded attributes and the metadata. When the encoded geometry and/or the encoded attributes and the metadata according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS or tile inventory) for signaling of a tile level, and slice data. The slice data may include information about one or more slices. One slice according to embodiments may include one geometry bitstream $Geom0^0$ and one or more attribute bitstreams $Attr0^0$ and $Attr1^0$. The TPS (or tile inventory) according to the embodiments may include information about each tile (e.g., coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same as or similar to the operation and/or transmission method of the transmitter 10003. Details are the same as those described with reference to FIGS. 1 and 2, and thus a description thereof is omitted.

Figure 13:
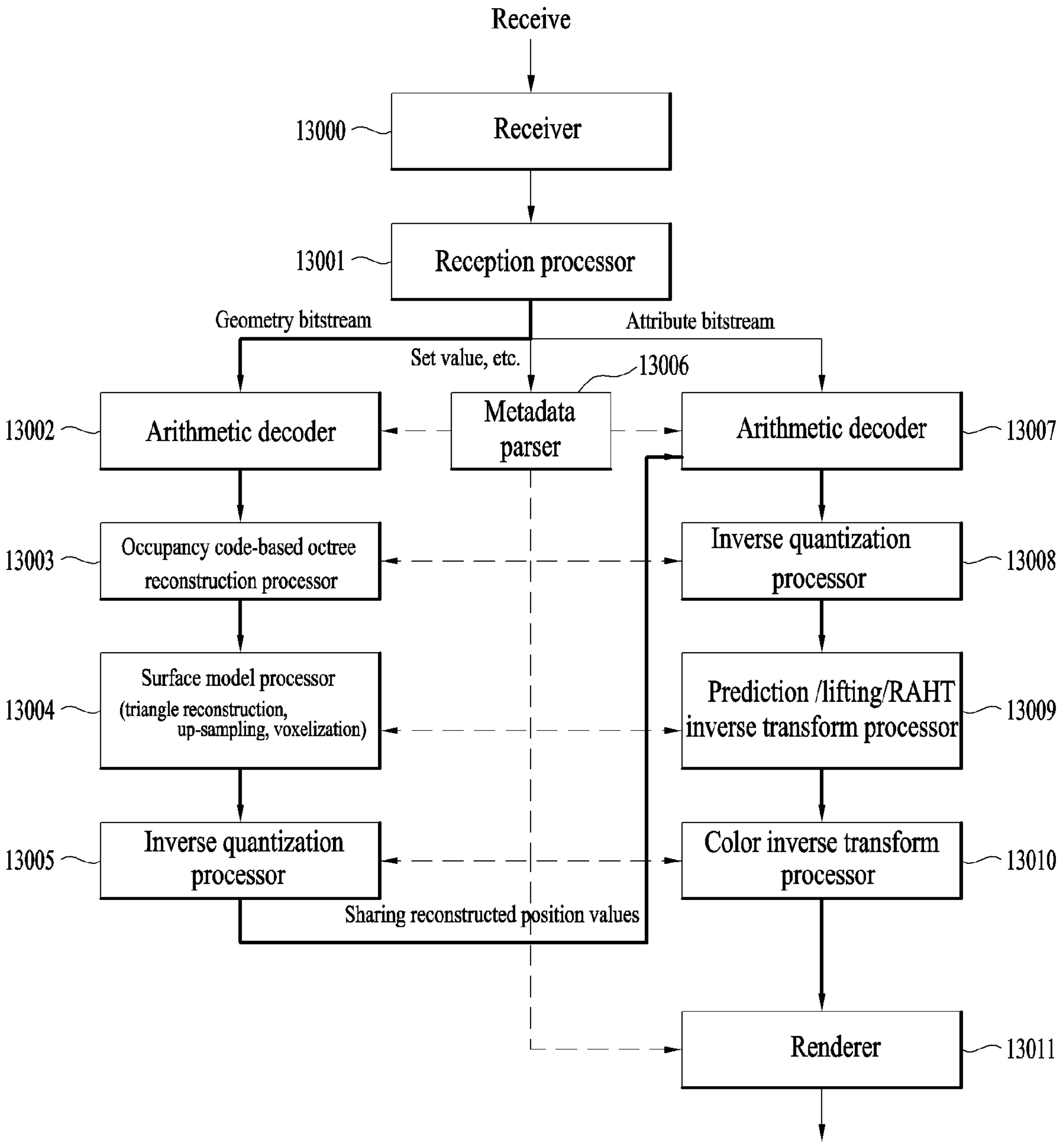
FIG. 13 illustrates a configuration for point cloud video decoding of a reception device according to embodiments.

FIG. 13 illustrates a reception device according to embodiments.

The reception device illustrated in FIG. 13 is an example of the reception device 10004 of FIG. 1 (or the point cloud video decoder of FIGS. 10 and 11). The reception device illustrated in FIG. 13 may perform one or more of the operations and methods the same as or similar to those of the point cloud video decoder described with reference to FIGS. 1 to 11.

The reception device according to the embodiment may include a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform a reverse process of the operation of a corresponding element for encoding according to the embodiments.

The receiver 13000 according to the embodiments receives point cloud data. The receiver 13000 may perform an operation and/or reception method the same as or similar to the operation and/or reception method of the receiver 10005 of FIG. 1. A detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 1305 may perform geometry decoding. The geometry decoding according to embodiments is the same as or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same as or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same as or similar to the operation and/or octree generation method of the octree synthesizer 11001. When the trisoup geometry encoding is applied, the surface model processor 13004 according to the embodiments may perform trisoup geometry decoding and related geometry reconstruction (e.g., triangle reconstruction, up-sampling, voxelization) based on the surface model method. The surface model processor 13004 performs an operation the same as or similar to that of the surface approximation synthesizer 11002 and/or the geometry reconstructor 11003.

The inverse quantization processor 13005 according to the embodiments may inversely quantize the decoded geometry.

The metadata parser 13006 according to the embodiments may parse metadata contained in the received point cloud data, for example, a set value. The metadata parser 13006 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same as or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same as or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same as or similar to the operation and/or inverse quantization method of the inverse quantizer 11006.

The prediction/lifting/RAHT inverse transform processor 13009 according to the embodiments may process the reconstructed geometry and the inversely quantized attributes. The prediction/lifting/RAHT inverse transform processor 13009 performs one or more of operations and/or decoding which are the same as or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same as or similar to the operation and/or inverse transform coding of the color inverse transformer 11010. The renderer 13011 according to the embodiments may render the point cloud data.

Figure 14:
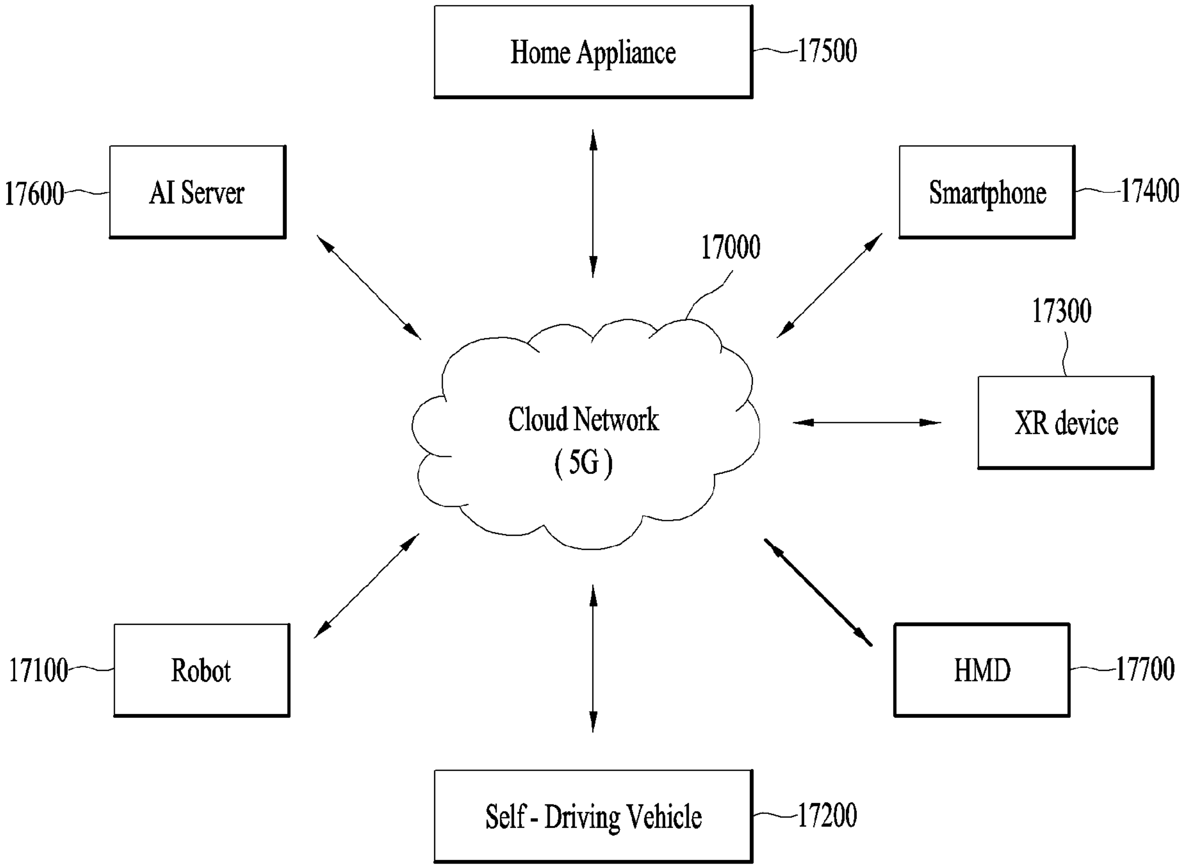
FIG. 14 illustrates an exemplary structure operable in connection with point cloud data methods/devices according to embodiments.

FIG. 14 shows an exemplary structure operatively connectable with a method/device for transmitting and receiving point cloud data according to embodiments.

The structure of FIG. 14 represents a configuration in which at least one of a server 17600, a robot 17100, a self-driving vehicle 17200, an XR device 17300, a smartphone 17400, a home appliance 17500, and/or a head-mount display (HMD) 17700 is connected to a cloud network 17000. The robot 17100, the self-driving vehicle 17200, the XR device 17300, the smartphone 17400, or the home appliance 17500 is referred to as a device. In addition, the XR device 17300 may correspond to a point cloud compressed data (PCC) device according to embodiments or may be operatively connected to the PCC device.

The cloud network 17000 may represent a network that constitutes part of the cloud computing infrastructure or is present in the cloud computing infrastructure. Here, the cloud network 17000 may be configured using a 3G network, 4G or Long Term Evolution (LTE) network, or a 5G network.

The server 17600 may be connected to at least one of the robot 17100, the self-driving vehicle 17200, the XR device 17300, the smartphone 17400, the home appliance 17500, and/or the HMD 17700 over the cloud network 17000 and may assist in at least a part of the processing of the connected devices 17100 to 17700.

The HMD 17700 represents one of the implementation types of the XR device and/or the PCC device according to the embodiments. The HMD type device according to the embodiments includes a communication unit, a control unit, a memory, an I/O unit, a sensor unit, and a power supply unit.

Hereinafter, various embodiments of the devices 17100 to 17500 to which the above-described technology is applied will be described. The devices 17100 to 17500 illustrated in FIG. 14 may be operatively connected/coupled to a point cloud data transmission device and reception according to the above-described embodiments.

<PCC+XR>

The XR/PCC device 17300 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 17300 may analyze 3D point cloud data or image data acquired through various sensors or from an external device and generate position data and attribute data about 3D points. Thereby, the XR/PCC device 17300 may acquire information about the surrounding space or a real object, and render and output an XR object. For example, the XR/PCC device 17300 may match an XR object including auxiliary information about a recognized object with the recognized object and output the matched XR object.

<PCC+Self-Driving+XR>

The self-driving vehicle 17200 may be implemented as a mobile robot, a vehicle, an unmanned aerial vehicle, or the like by applying the PCC technology and the XR technology.

The self-driving vehicle 17200 to which the XR/PCC technology is applied may represent a self-driving vehicle provided with means for providing an XR image, or a self-driving vehicle that is a target of control/interaction in the XR image. In particular, the self-driving vehicle 17200 which is a target of control/interaction in the XR image may be distinguished from the XR device 17300 and may be operatively connected thereto.

The self-driving vehicle 17200 having means for providing an XR/PCC image may acquire sensor information from sensors including a camera, and output the generated XR/PCC image based on the acquired sensor information. For example, the self-driving vehicle 17200 may have an HUD and output an XR/PCC image thereto, thereby providing an occupant with an XR/PCC object corresponding to a real object or an object present on the screen.

When the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap an object on the screen. For example, the self-driving vehicle 17200 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud compression data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

Figure 49:
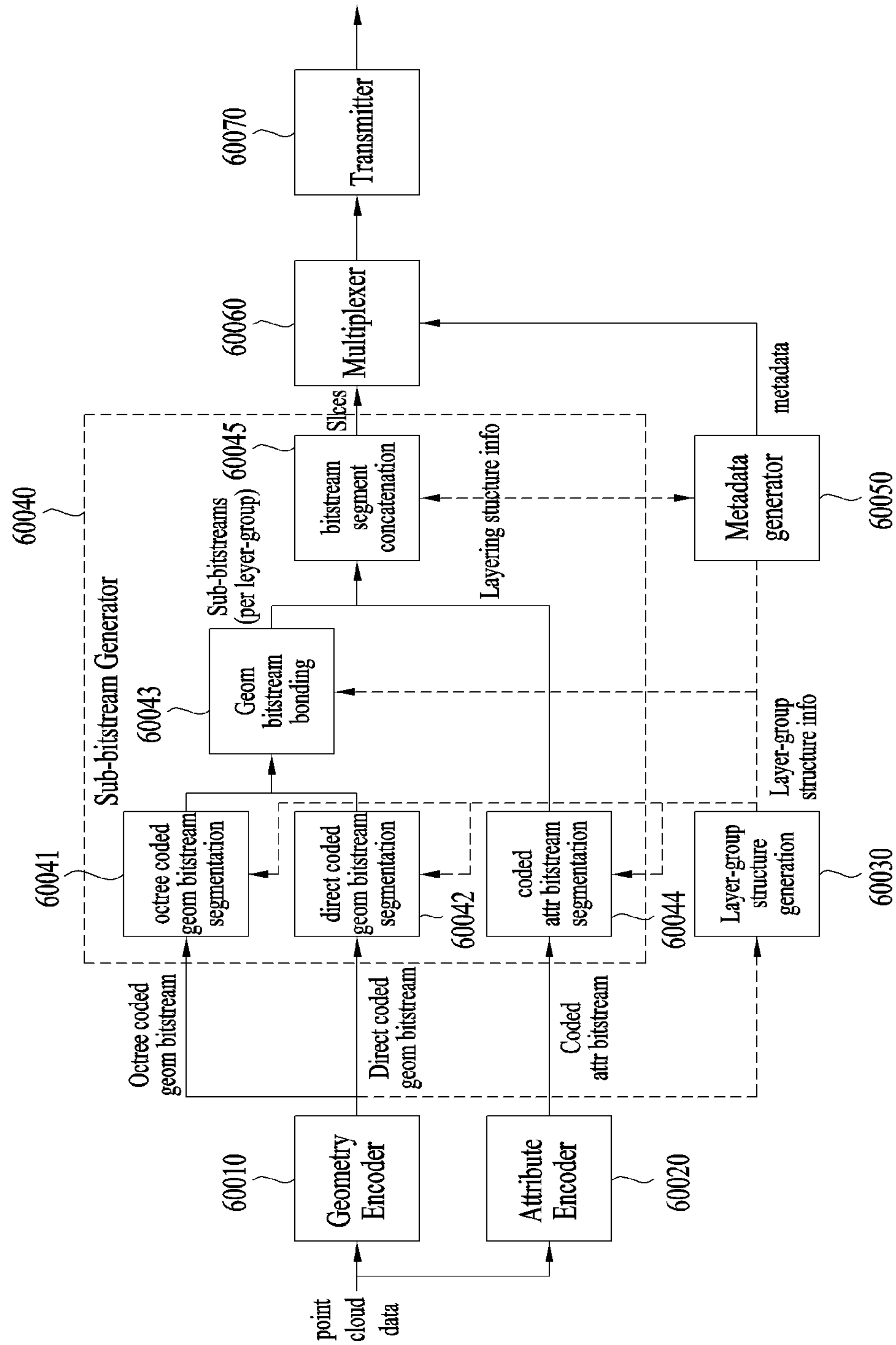
FIG. 49 is a diagram illustrating another example of a point cloud transmission device according to embodiments.

The point cloud data transmission method/device according to the embodiments is construed as a term referring to the transmission device 10000 of FIG. 1, the point cloud video encoder 10002 of FIG. 1, the transmitter 10003 of FIG. 1, the acquisition 20000/encoding 20001/transmission 20002 of FIG. 2, the point cloud video encoder of FIG. 4, the transmission device of FIG. 12, the device of FIG. 14, the transmission method of FIG. 49, and the like.

The point cloud data reception method/device according to the embodiments is construed as a term referring to the reception device 10004, the receiver 10005 of FIG. 1, the point cloud video decoder 10006 of FIG. 1, the transmission 20002/decoding 20003/rendering 20004 of FIG. 2, the decoder of FIG. 10, the point cloud video decoder of FIG. 11, the reception device of FIG. 13, the device of FIG. 14, the reception device of FIG. and the like.

The method/device for transmitting or receiving point cloud data according to the embodiments may be referred to simply as a method/device.

According to embodiments, geometry data, geometry information, and position information constituting point cloud data are to be construed as having the same meaning. Attribute data, attribute information, and attribute information constituting the point cloud data are to be construed as having the same meaning.

The method/device according to the embodiments may process point cloud data in consideration of scalable transmission.

Regarding the method/device according to the embodiments, disclosed herein is a method for efficiently supporting selective decoding of a part of data according to receiver performance or transmission speed in transmitting and receiving point cloud data. In particular, it is proposed in the present disclosure that geometry and attribute data delivered in data units be divided into semantic units such as geometry octree and Level of Detail (LoD), such that necessary information may be selected or unnecessary information may be removed in bitstream units.

According to embodiments, the present disclosure addresses techniques for constructing a data structure composed of a point cloud. Specifically, the present disclosure describes a method for packing and processing of related signaling information for effectively delivering point cloud data configured based on layers, and proposes a method of applying the same to a scalable point cloud compression (PCC) based service. In particular, the present disclosure proposes a method of constructing slice segments to be more suitable for the scalable PCC service and transmitting/receiving the same when a direct compression mode is used for position compression.

Referring to the point cloud data transmission/reception device (which may be referred to simply as an encoder/decoder) according to the embodiments shown in FIGS. 4 and 11, point cloud data is composed of a set of points. Each of the points includes geometry information (or geometry or geometry data) and attribute information (or an attribute or attribute data). The geometry information is three-dimensional position information (xyz) about each point. That is, the position of each point is represented by parameters in a coordinate system representing a three-dimensional space (e.g., parameters (x, y, z) of three axes representing the space, such as the X-axis, Y-axis, and Z-axis). The attribute information represents the color (RGB, YUV, etc.), reflectance, normal vectors, transparency, and the like of the points. In point cloud compression (PCC), octree-based compression is performed to efficiently compress non-uniform distribution in a three-dimensional space, and attribute information is compressed based on the octree-based compression. The point cloud video encoder and the point cloud video decoder shown in FIGS. 4 and 11 may process the operation(s) according to embodiments through respective components.

According to embodiments, the transmission device compresses the geometry information (e.g., position) and attribute information (e.g., color/brightness/reflectance, etc.) about the point cloud data and transmits the compressed information to the reception device. The point cloud data may be configured according to an octree structure that has layers according to the degree of detail or levels of detail (LoDs). Then, scalable point cloud data coding and representation may be performed based the configuration. In this case, only a part of the point cloud data may be decoded or represented according to the performance of the reception device or the transfer rate. However, there is currently no method for removing unnecessary data in advance.

That is, in the case where only a part of the scalable point cloud compression bitstream needs to be transmitted (e.g., only a part of the layers are decoded in scalable decoding), the necessary part cannot be selected and sent. Accordingly, the transmission device is required to re-encode the necessary part after decoding as shown in FIG. 15, or the reception device is required to selectively apply the necessary data after decoding when the entire data is delivered to the reception device.

Figure 15:
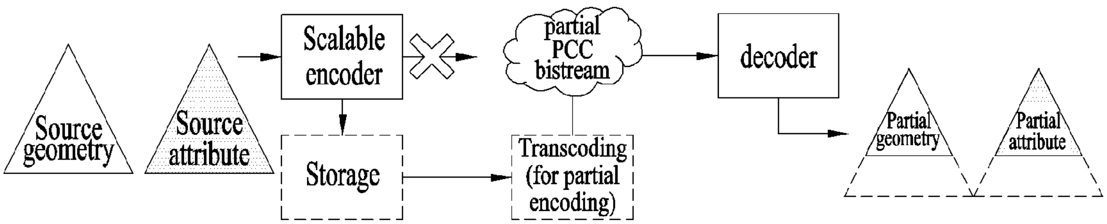
FIGS. 15 and 16 illustrate a process of encoding, transmitting, and decoding point cloud data according to embodiments.
Figure 16:
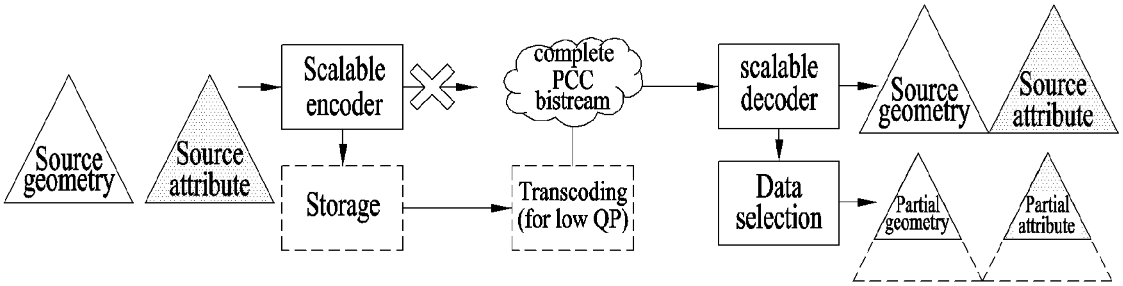

However, in the case of FIG. 15, a delay may occur due to the time for decoding and re-encoding. In the case of FIG. 16, bandwidth efficiency may be degraded due to transmission of unnecessary data to the reception device. Further, when a fixed bandwidth is used, data quality may need to be lowered to transmit data.

Accordingly, the methods/devices according to the embodiments may provide slices such that the point cloud may be divided into regions to be processed.

In particular, in the case of octree-based position compression, entropy-based compression and direct compression may be used together. In this regard, proposed herein is a slice configuration for efficiently utilizing scalability.

Also, regarding the methods/devices according to the embodiments, a slice segmentation structure of point cloud data may be defined, and a scalable layer and slice structure for scalable transmission may be signaled.

The methods/devices according to embodiments may divide and process a bitstream in specific units for efficient bitstream delivery and decoding.

A method/device according to embodiments may enable selective transmission and decoding of layered point cloud data in a bitstream unit.

The unit according to the embodiments may be referred to as an LOD, a layer, a slice, or the like. LOD is the same term as LOD in attribute data coding, but may mean a data unit for a layered structure of a bitstream. The LOD may be a concept corresponding to one depth or a bundle of two or more depths based on the layer structure of point cloud data, for example, depths (levels) of an octree or multiple trees. Similarly, a layer is provided to generate a unit of a sub-bitstream, and is a concept that corresponds to one depth or a bundle of two or more depths, and may correspond to one LOD or two or more LODs. Also, a slice is a unit for configuring a unit of a sub-bitstream, and may correspond to one depth, a part of one depth, or two or more depths. Also, a slice may correspond one LOD, a part of one LOD, or two or more LODs. According to embodiments, the LOD, the layer, and the slice may correspond to each other or one of the LOD, the layer, and the slice may be included in another one. Also, a unit according to embodiments may include an LOD, a layer, a slice, a layer group, or a subgroup, and may be referred to interchangeably. According to embodiments, in an octree structure, a layer, a depth, a level, and a depth level may have the same meaning.

Figure 17:
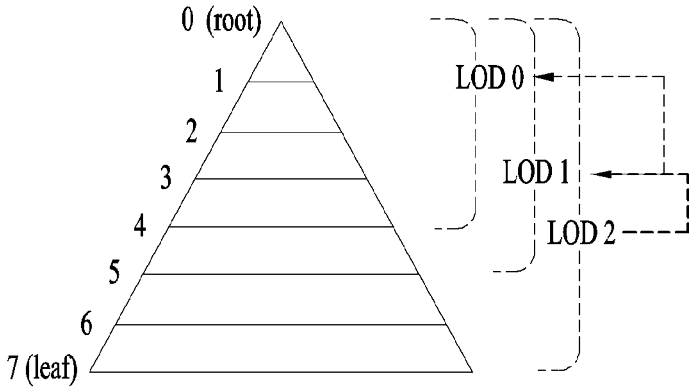
FIG. 17 is a diagram illustrating an example of a layer-based point cloud data configuration according to embodiments.

FIG. 17 is a diagram illustrating an example of a layer-based point cloud data configuration according to embodiments. FIG. 17 illustrating an example of an octree structure in which the depth level of a root node is set to 0 and the depth level of a leaf node is set to 7.

A method/device according to embodiments may configure layer-based point cloud data as shown in FIG. 17 to encode and decode the point cloud data.

Layering of point cloud data according to embodiments may have a layer structure in terms of SNR, spatial resolution, color, temporal frequency, bit depth, or the like depending on the application field, and may construct layers in a direction in which data density increases based on the octree structure or LOD structure.

That is, when the LOD is generated based on the octree structure, the LOD may be defined to increase in a direction in which the detail is increased, that is, in a direction in which the octree depth level is increased. In the present disclosure, a layer may have the same meaning as a level, a depth, and a depth level.

Referring to FIG. 17, for example, in an octree structure having 7 depth levels except for the root node level (or referred to as a root level), LOD 0 is configured to include levels from the root node level to the octree depth level 4, and LOD 1 is configured to include levels from the root node level to octree depth level 5, and LOD 2 is configured to include levels from root node level to octree depth level 7.

Figure 18:
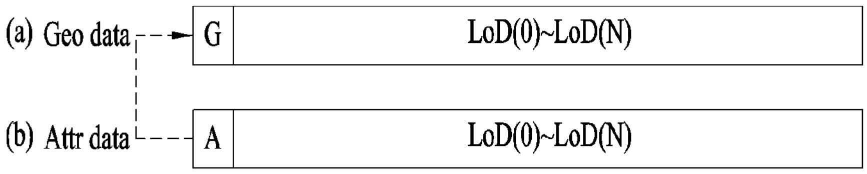
FIG. 18-(*a*) shows a bitstream structure of geometry data according to embodiments, and FIG. 18-(*b*) shows a bitstream structure of attribute data according to embodiments.

FIG. 18-(*a*) shows a bitstream structure of geometry data according to embodiments, and FIG. 18-(*b*) shows a bitstream structure of attribute data according to embodiments.

A method/device according to the embodiments may generate LODs based on the layering of the octree structure as shown in FIG. 17 and configure a geometry bitstream and an attribute bitstream as shown in FIGS. 18-(*a*) and 18-(*b*).

The transmission device according to the embodiments may divide a bitstream acquired through point cloud compression into a geometry bitstream and an attribute bitstream according to data types to transmit the bitstream.

In this case, each bitstream may be composed of slices and transmitted. According to embodiments, the geometry bitstream (e.g. FIG. 18-(*a*)) and the attribute bitstream (e.g. FIG. 18-(*b*)) may each be configured as one slice and delivered regardless of layer information or LoD information. In this case, in order to use only some of the layers or LoDs, an operation of decoding the bitstream, an operation of selecting only the part to be used and removing unnecessary parts, and an operation of re-encoding based on only necessary information should be performed.

The present disclosure proposes a method of dividing a bitstream into layers (or LoDs) to avoid such unnecessary intermediate operations.

Figure 19:
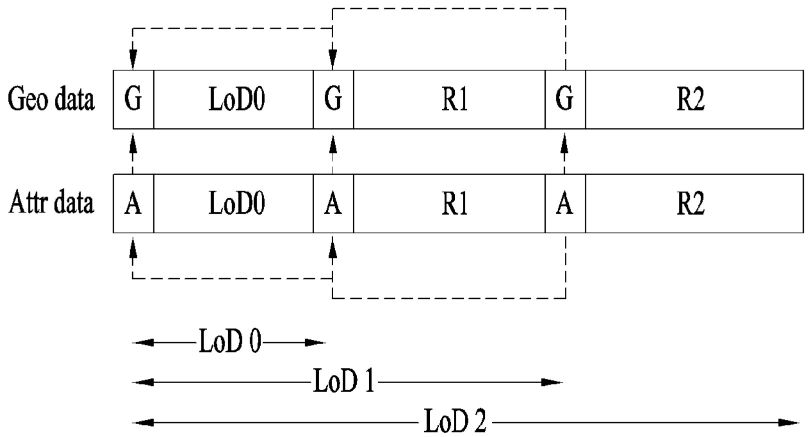
FIG. 19 is a diagram showing an example of a bitstream configuration for delivering a bitstream divided into layers (or LoDs) according to embodiments.

FIG. 19 is a diagram showing an example of a bitstream configuration for delivering a bitstream divided into layers (or LoDs) according to embodiments.

For example, in the case of LoD-based PCC technology, a lower LoD is included in a higher LoD. That is, the higher LoD includes all points of the lower LoD. In addition, when information on points included in the current LoD but not included in the previous LoD, that is, points newly added to each LoD is defined as R (rest or retained), the transmission device may divide the initial LoD information and the information R newly included in each LoD into independent units (e.g. slices) and transmit the same, as shown in FIG. 19.

In other words, a set of points newly added to configure each LoD compared to the previous LoD may be defined as information R. FIG. 19 shows an example in which LoD1 includes LoD0 and information R1, and LoD2 includes LoD1 and information R2.

According to an embodiment, points sampled for one or more octree depth levels may be determined as data belonging to information R. That is, a set of points sampled for one or more octree depth levels (that is, points matched to an occupied node) may be defined as information R. According to another embodiment, points sampled for one octree depth level may be divided into a plurality of pieces of information R according to a predetermined criterion. In this case, various criteria to for dividing one octree depth level into a plurality of pieces of information R may be considered as follows. For example, when one octree depth level is divided into M pieces of information R, the M pieces of information R may be configured such that the data in the information R may have consecutive Morton codes, or may be grouped such that the data in the information R have the same remainder obtained by dividing the Morton code order index by M. Alternatively, M pieces of information R may be configured by grouping data in the same position when grouped as sibling nodes. According to another embodiment, if necessary, some of sampled points of a plurality of octree depth levels may be determined as information R.

In the example of FIG. 19, a geometry bitstream and an attribute bitstream are each divided into three slices according to embodiments. Each slice includes a header and a payload (also called a data unit) containing and actual data (e.g., geometry data, attribute data). The header may contain information on a corresponding slice. In addition, the header may further contain reference information related to a previous slice, a previous LoD, or a previous layer for LoD configuration.

For example, referring to FIG. 19, the geometry bitstream is divided into a slice carrying geometry data belonging to LoD0, a slice carrying geometry data belonging to information R1, and a slice carrying geometry data belonging to information R2. The attribute bitstream is divided into a slice carrying attribute data belonging to LoD0, a slice carrying attribute data belonging to information R1, and a slice carrying attribute data belonging to information R2.

The reception method/device according to the embodiments may receive a bitstream divided into LODs or layers, and may efficiently decode only data to be used without a complicated intermediate process.

In this regard, various embodiments may be applied to transmit the bitstream.

For example, the geometry bitstream and the attribute bitstream may be delivered respectively. Alternatively, the geometry bitstream and the attribute bitstream may be multiplexed into one bitstream to be delivered.

Also, when each bitstream contains LoD0 and one or more pieces of information R, the order of delivery of LoD0 and the one or more pieces of information R may be different.

In the example of FIG. 19, the geometry bitstream and the attribute bitstream are delivered, respectively. In this case, LoD0 including the geometry bitstream and two pieces of information R (R1, R2) are delivered sequentially, and LoD0 including the attribute bitstream and two pieces of information R (R1, R2) are delivered sequentially.

Figure 20:
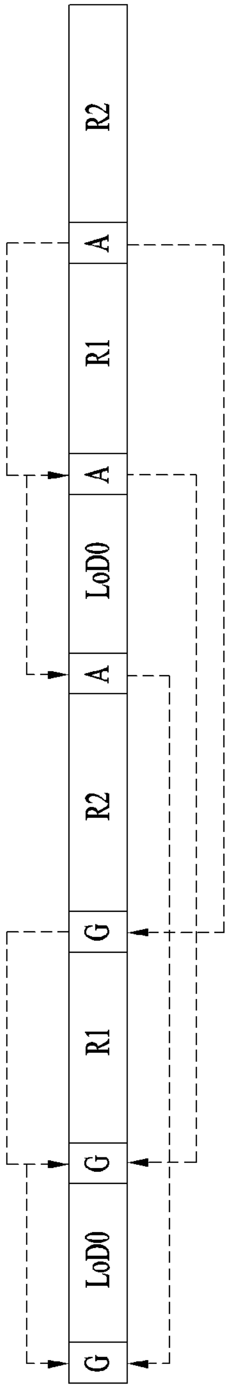
FIG. 20 illustrates an example of a bitstream sorting method used when a geometry bitstream and an attribute bitstream are multiplexed into one bitstream according to embodiments.

FIG. 20 illustrates an example of a bitstream sorting method used when a geometry bitstream and an attribute bitstream are multiplexed into one bitstream according to embodiments.

The transmission method/device according to embodiments may serially transmit geometry data and attribute data as shown in FIG. 20 in transmitting a bitstream. In this operation, depending on the type of data, the entire geometry data (or referred to as geometry information) may be transmitted first, and then attribute data (or referred to as attribute information) may be transmitted. In this case, the geometry data may be quickly reconstructed based on the transmitted bitstream information.

Referring to FIG. 20, for example, layers (LODs) containing the geometry data may be positioned first in the bitstream, and layers (LODs) containing the attribute data may be positioned after the geometry layers. Since the attribute data is dependent on the geometry data, the layers (LODs) containing the geometry data may be positioned before the layers (LODs) containing the attribute data. FIG. 20 shows an example in which LoD0 containing geometry data and two pieces of information R (R1, R2) are sequentially delivered, and then LoD0 containing attribute data and two pieces of information R (R1, R2) are sequentially delivered. In this regard, the positions may be changed in various ways according to embodiments. In addition, reference may be made between the geometry headers, and also may be made between the attribute headers and the geometry headers.

Figure 21:
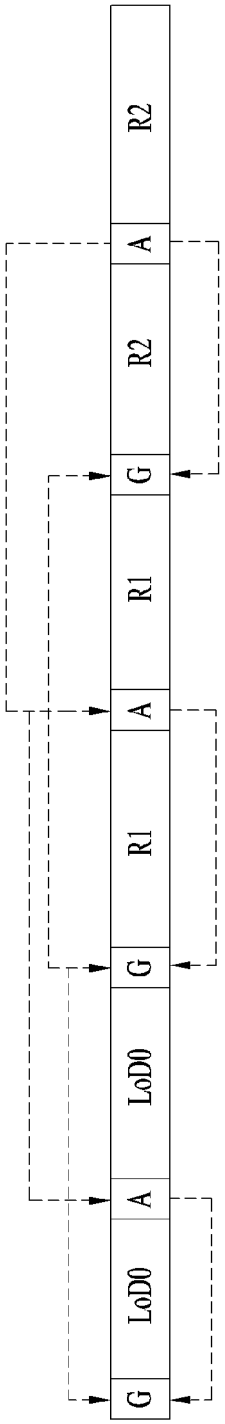
FIG. 21 illustrates another example of the bitstream sorting method used when a geometry bitstream and an attribute bitstream are multiplexed into one bitstream according to embodiments.

FIG. 21 illustrates another example of the bitstream sorting method used when a geometry bitstream and an attribute bitstream are multiplexed into one bitstream according to embodiments.

In transmitting a bitstream, the transmission method/device according to embodiments may serially transmit geometry data and attribute data as shown in FIG. 21. In this case, bitstreams constituting the same layer containing geometry data and attribute data may be bundled and transmitted. In this case, when a compression technique for parallel decoding of geometry and attributes is used, the decoding execution time may be shortened. In this regard, information that needs to be processed first (low LoD and geometry should precede attributes) may be positioned first.

FIG. 21 show an example of transmitting a sequence of LoD0 containing geometry data, LoD0 containing attribute data, information R1 containing geometry data, information R1 containing attribute data, information R2 containing geometry data, and information R2 containing attribute data. In this case, the positions may be changed in various ways according to embodiments. In addition, reference may be made between the geometry headers and between the attribute headers and the geometry headers.

The transmission/reception method/device according to the embodiments may efficiently select a layer (or LoD) desired in the application field at a bitstream level when transmitting and receiving a bitstream. In grouping and transmitting geometry according to the bitstream sorting method according to the embodiments as shown in FIG. 20, there may be an empty part in the middle after selecting the bitstream level. In this case, the bitstream may need to be re-positioned.

Figure 22:
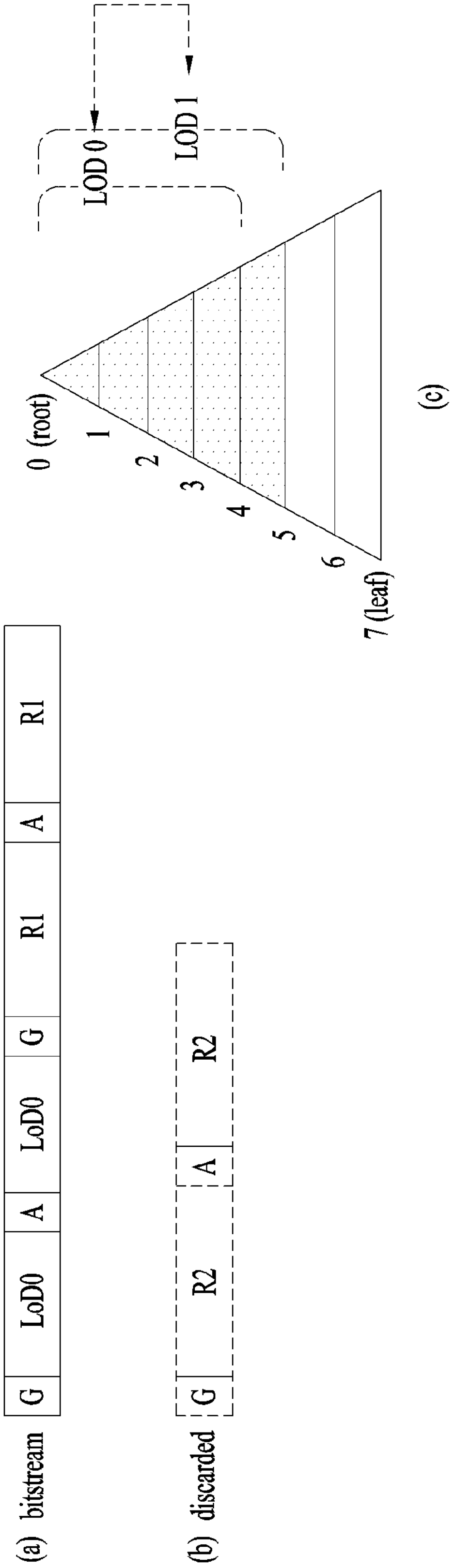
FIGS. 22-(*a*) to 22-(*c*) are diagrams illustrating an example of symmetric geometry-attribute selection according to embodiments.

By bundling and transmitting the geometry data and attribute data according to layers as shown in FIG. 21, necessary information may be selectively delivered and/or unnecessary information may be selectively removed according to an application field, as shown in FIG. 22-(*a*) to 22-(*c*) or 23-(*a*) to 23-(*c*).

FIGS. 22-(*a*) to 22-(*c*) are diagrams illustrating an example of symmetric geometry-attribute selection according to embodiments.

For example, referring to FIGS. 22-(*a*) to 22-(*c*), when a part of the bitstream needs to be selected according to embodiments, the transmission device selects and transmits data only up to LoD1 (i.e., LoD0+R1), and information R2 corresponding to the upper layer (i.e., the new part of LoD2) is removed from the bitstream and not transmitted. In the case of symmetric geometry-attribute selection, geometry data and attribute data of the same layer are simultaneously selected and transmitted, or simultaneously selected and removed.

FIGS. 22-(*a*) to 22-(*c*) are diagrams illustrating an example of symmetric geometry-attribute selection according to embodiments. In the case of asymmetric geometry-attribute selection, only one of the geometry data and the attribute data of the same layer is selected and transmitted or removed.

Figure 23:
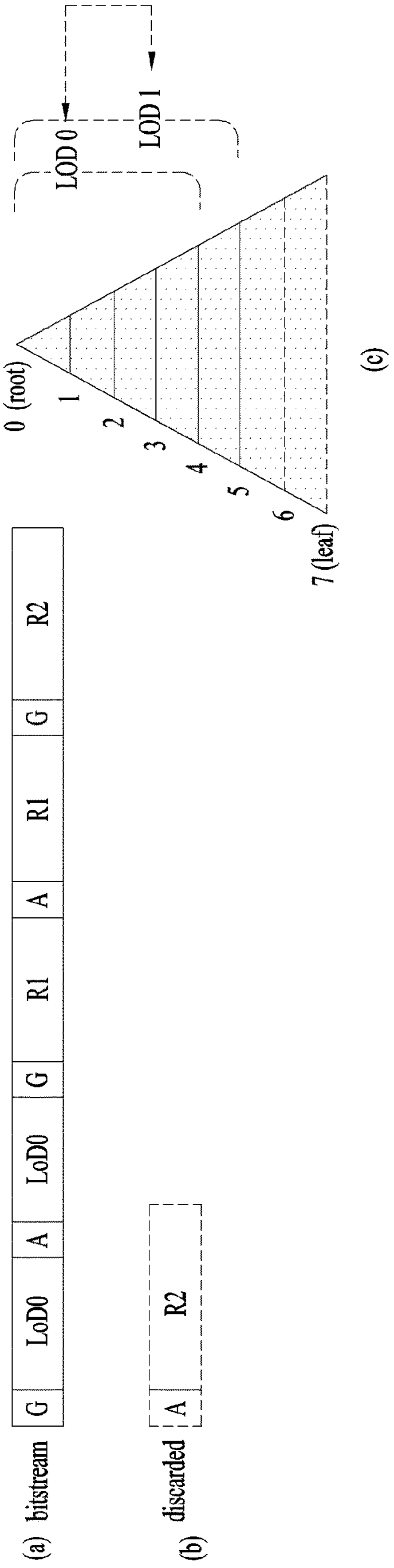
FIGS. 23-(*a*) to 23-(*c*) are diagrams illustrating an example of asymmetric geometry-attribute selection according to embodiments.

For example, referring to FIGS. 23-(*a*) to 23-(*c*), when a part of the bitstream needs to be selected according to embodiments, the transmission device selects and transmits LoD1 (LoD0+R1) containing geometry data and attribute data, LoD1 (LoD0+R1) containing attribute data, and R2 containing geometry data, and removes R2 containing attribute data from the bitstream so as not to be transmitted. That is, for the attribute data, data other than the data of the upper layer (R2) is selected and transmitted. For the geometry data, data of all layers (from level 0 (root level) to level 7 (leaf level) of the octree structure is transmitted.

When a part of a bitstream needs to be selected according to embodiments, a part of the bitstream may be selected by the symmetric geometry-attribute selection method of FIGS. 22-(*a*) to 22-(*c*), the asymmetric geometry-attribute selection method of FIGS. 23-(*a*) to 23-(*c*), or the combination of the symmetric geometry-attribute selection method and the asymmetric geometry-attribute selection method.

The segmentation of a bitstream, selection of a part of the bitstream, and the like described above are intended to support scalability of point cloud data.

Referring to FIG. 17, when point cloud data is expressed in an octree structure and classified by LOD (or layer), scalable encoding/decoding (scalability) may be supported.

The scalability function according to embodiments may include slice-level scalability and/or octree-level scalability.

LoD according to embodiments may be used as a unit for indicating a set of one or more octree layers. Also, LoD may mean a bundle of octree layers to be configured on a slice-by-slice basis.

LOD according to embodiments may be used in a broad sense, such as a unit for dividing data in detail by extending the meaning of LOD in attribute encoding/decoding.

That is, spatial scalability by an actual octree layer (or scalable attribute layer) may be provided for each octree layer. However, if scalability is configured in a slice level before bitstream parsing, it may be selected in LoD units.

For example, referring to FIG. 17, in an octree structure, the root level to level 4 correspond to LoD0, and the root level to level 5 correspond to LoD1. Also, the root level to level 8 (i.e., leaf level) correspond to LoD2.

In other words, in the example of FIG. 17, when scalability is used in units of slices, the provided scalable operation corresponds to three steps of LoD0, LoD1, and LoD2, and a scalable operation that may be provided in the decoding operation by the octree structure corresponds to 8 steps from the root level to the leaf level.

According to embodiments, when LoD0 to LoD2 are composed of respective slices, the transcoder (see FIG. 15) of the receiver or transmitter may select only LoD0, select LoD0 and LoD1, or select LoD0, LoD1, and LoD2 for scalable processing.

For example, when only LoD0 is selected, the maximum octree level is 4, and one scalable layer may be selected from among octree layers 0 to 4 in the decoding operation. In this case, the reception device may consider a node size obtainable through the maximum octree level (or depth) as a leaf node, and may transmit the node size as signaling information.

For example, when LoD0 and LoD1 are selected, layer 5 may be added. Thus, the maximum octree level may be 5, and one scalable layer may be selected from among octree layers 0 to 5 during the decoding operation. In this case, the reception device may consider a node size obtainable through the maximum octree level (or depth) as a leaf node, and may transmit the node size as signaling information. According to embodiments, an octree depth, an octree layer, and an octree level may be units into which data is divided in detail.

For example, when LoD0, LoD1, and LoD2 are selected, layers 6 and 7 may be added. Thus, the maximum octree level may be 7, and one scalable layer may be selected from among octree layers 0 to 7 during the decoding operation. In this case, the reception device may consider a node size obtainable through the maximum octree level (or depth) as a leaf node, and may transmit the node size as signaling information.

Figure 24:
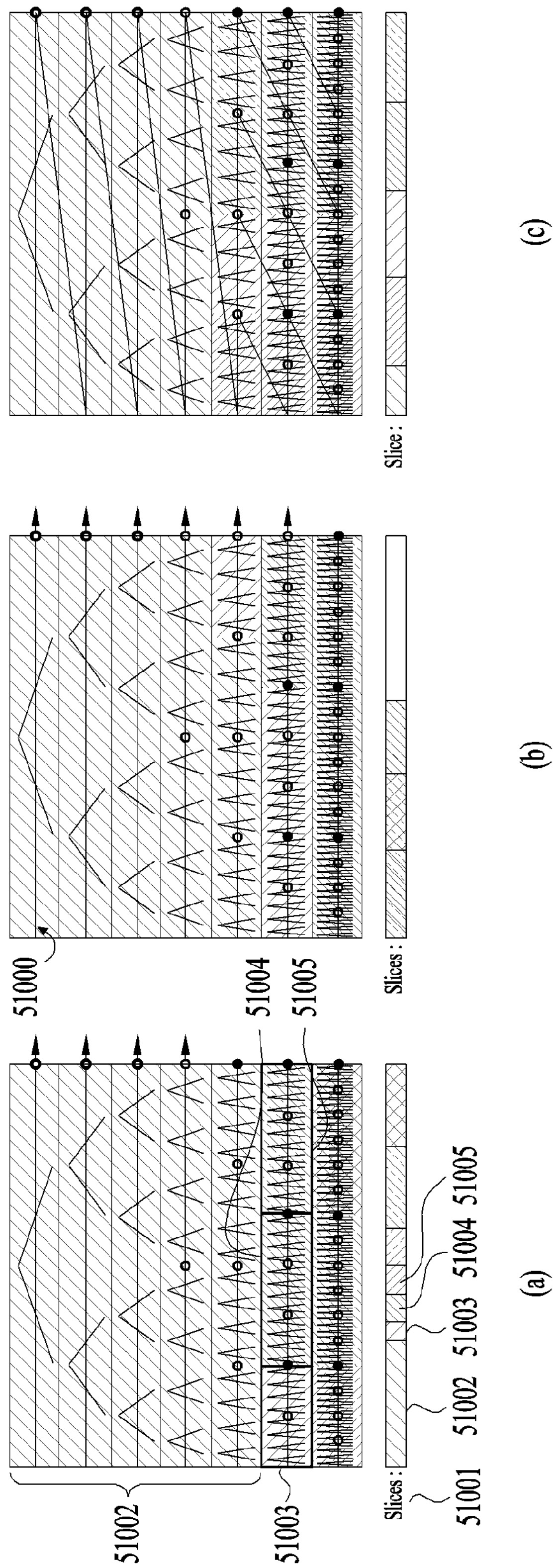
FIGS. 24-(*a*) to 24-(*c*) illustrate examples of methods of configuring slices including point cloud data according to embodiments.

FIGS. 24-(*a*) to 24-(*c*) illustrate examples of methods of configuring slices including point cloud data according to embodiments.

The transmission method/device/encoder according to the embodiments may configure a G-PCC bitstream by segmenting the bitstream in a slice structure. A data unit for detailed data representation may be a slice.

For example, one or more octree layers may be matched to a slice.

The transmission method/device according to the embodiments, for example, the encoder, may configure a bitstream based on slices 51001 by scanning nodes (points) included in an octree in the direction of a scan order 51000. A slice may include nodes of one or more levels in the octree structure, may include only nodes of a specific level, or may include only some nodes of a specific level. Alternatively, it may include only some nodes of one or more levels.

FIG. 24-(*a*) shows an exemplary octree structure composed of 7 slices. In this example, a slice 51002 may include nodes of level 0 to level 4, and a slice 51003 may include some nodes of level 5. A slice 51004 may include some nodes of level 5, and a slice 51005 may include some other nodes of level 5. That is, in FIG. 24-(*a*), level 5 is divided into three slices. Similarly, in FIG. 24-(*a*), level 6 (i.e., the leaf level) is also divided into three slices. In other words, a slice may be composed of some nodes of a specific level.

FIG. 24-(*b*) shows an exemplary octree structure composed of four slices. In this example, a slice includes the nodes of level 0 to level 3 and some nodes of level 4, and another slice includes the remaining nodes of level 4 and some nodes of level 5. In addition, another slice includes the remaining nodes of level 5 and some nodes of level 6, and the other slice includes the remaining nodes of level 6.

FIG. 24-(*c*) shows an exemplary octree structure composed of five slices. A slice is composed of the nodes of level 0 to level 3, and four slices are composed of the nodes of level 4 to level 6. That is, a slice is composed of some nodes of level 4, some nodes of level 5, and some nodes of level 6.

In other words, as shown in FIGS. 24-(*b*) and 24-(*c*), when multiple octree layers are matched to a slice, only some nodes of each of the layers may be included in the slice. When multiple slices constitute a geometry/attribute frame in this way, information necessary for the reception device to configure layers may be transmitted to the reception device through signaling information. For example, the signaling information may include information about layers included in each slice and information about nodes included in each layer.

The encoder and the device corresponding to the encoder according to the embodiments may encode the point cloud data, and generate and transmit a bitstream containing the encoded data and signaling information (or parameter information) about the point cloud data.

Furthermore, in generating a bitstream, the bitstream may be generated based on the bitstream structure (e.g., see FIGS. 18 to 24, etc.) according to the embodiments. Accordingly, the reception device, the decoder, a corresponding device, or the like according to the embodiments may receive and parse the bitstream configured to be suitable for selective decoding of some data, thereby decoding and efficiently providing only a part of the point cloud data (see FIG. 16).

Next, scalable transmission of point cloud data will be described.

The point cloud data transmission method/device according to the embodiments may scalably transmit a bitstream containing point cloud data, and the point cloud data reception method/device according to the embodiments may scalably receive the bitstream and decode the same.

When the bitstream having the structure illustrated in FIGS. 15 to 24 is used for scalable transmission, signaling information for selecting a slice required by the reception device may be transmitted to the reception device. The scalable transmission may not mean transmitting or decoding the entire bitstream, but may mean transmitting or decoding only a part of the bitstream. Accordingly, low-resolution point cloud data may be provided.

When the scalable transmission is applied to an octree-based geometry bitstream according to embodiments, point cloud data may be required to be configured using information only up to a specific octree layer for the bitstream of each octree layer (FIG. 17) from a root node to a leaf node.

To this end, a target octree layer should not have a dependency on lower octree layer information. This may be a constraint applied to geometry/attribute coding in common.

In addition, in scalable transmission, a scalable structure allowing the transmission/reception device to select a scalable layer needs to be transmitted to the reception device. Considering the octree structure according to the embodiments, all octree layers may support scalable transmission, or scalable transmission may be allowed only for a specific octree layer and lower layers. For example, when some of the octree layers are included, signaling information may be delivered to the reception device to indicate a scalable layer in which a slice is included. Thus, the reception device may determine whether the slice is necessary/unnecessary in the bitstream step. In the example of FIG. 24-(*a*), level 0 (i.e., root level) to level 4 51002 may constitute one scalable layer without supporting scalable transmission, and the lower octree layers may be matched to scalable layers in a one-to-one correspondence manner. In general, scalability may be supported for a part corresponding to the leaf node. As shown in FIG. 24-(*c*), when multiple octree layers are included in a slice, it may be defined that one scalable layer shall be configured for the layers.

In this case, scalable transmission and scalable decoding may be used separately depending on the purpose. According to embodiments, the scalable transmission may be used in order for the transmitting/reception device to select information up to a specific layer without operation of the decoder. According to embodiments, scalable decoding may be used to select a specific layer during coding. That is, the scalable transmission may support selection of necessary information without involving the decoder in a compressed state (i.e., in the bitstream stage), such that the transmission or reception device may determine a specific layer. On the other hand, in the case of scalable decoding, encoding/decoding may be supported for information only up to a necessary part in the encoding/decoding process. Therefore, scalable decoding may be used in an operation such as scalable representation.

In this case, the layer configuration for scalable transmission may be different from the layer configuration for scalable decoding. For example, the lower three octree layers including the leaf node may constitute one layer in terms of scalable transmission. On the other hand, in terms of scalable decoding, when all layer information is included, scalable decoding may be enabled for each of the leaf node layers, leaf node layer-1 and leaf node layer-2.

The slice structure for layer configuration and the signaling method for scalable transmission described above will be described in more detail later.

As described above, the reception device may receive a bitstream based on scalable transmission and determine a scalable bitstream structure based on the signaling information (or referred to as parameter information) contained in the bitstream.

In addition, a geometry scalable layer may be estimated, and a geometry slice may be identified based on a geometry slice id. Also, a geometry slice may be selected and decoded based on the slice id.

When aligned_slice_structure_enabled_flag included in the bitstream is equal to 1, the attribute slice ID corresponding to the geometry slice may be checked, and an attribute slice may be accessed based on slice_id_offset. In addition, an attribute slice may be selected based on the slice_id, and the decoder may decode the selected attribute slice.

When aligned_slice_structure_enabled_flag is not equal to 1, an attribute scalable layer may be estimated. Also, an attribute slice may be identified based on the attribute slice id, and an attribute slice may be selected based on the slice id.

The transmission device and the reception device according to the embodiments have the following effects.

Point cloud compressed data may be divided according to a specific criterion and transmitted. In addition, when layered coding is used, point cloud compressed data may be divided and transmitted according to layers. Accordingly, the storage and transmission efficiency of the transmission device may increase, and the decoding efficiency of the reception device may increase.

According to the present disclosure, a bitstream may be delivered using a layer group and a subgroup, and slice segmentation may be further performed.

Figure 25:
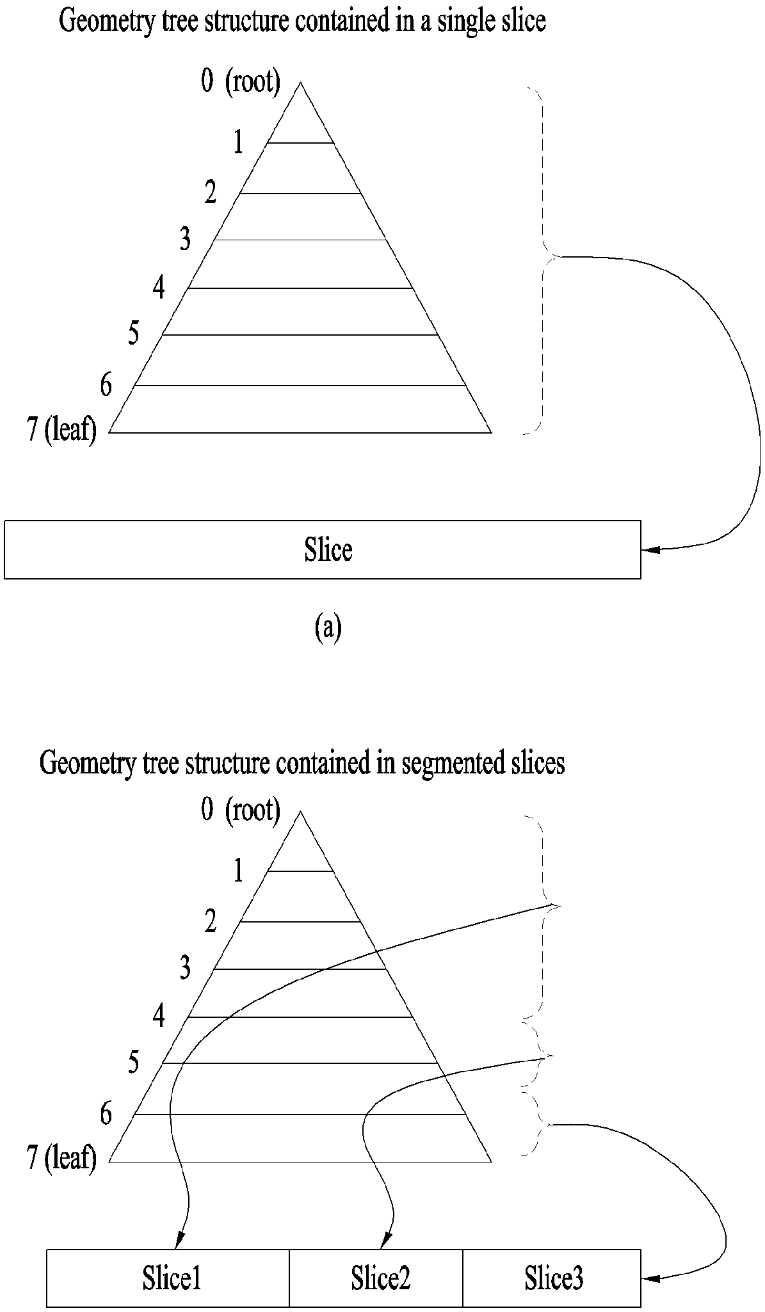
FIGS. 25-(*a*) is a diagram showing an example of a geometry tree structure included in a single slice according to embodiments, and FIG. 25-(*b*) is a diagram showing an example of a geometry tree structure included in segmented slices.

FIGS. 25-(*a*) is a diagram showing an example of a geometry tree structure contained in a single slice according to embodiments, and FIG. 25-(*b*) is a diagram showing an example of a geometry tree structure contained in segmented slices.

A method/device according to embodiments may configure one or more slices to deliver point cloud data, as shown in FIGS. 25-(*a*) and 25-(*b*).

That is, according to the G-PCC technology, the entire coded bitstream may be included in a single slice as shown in FIG. 25-(*a*). Also, in the case of multiple slices as shown in FIG. 25-(*b*), each slice may include sub-bitstreams. The order of slices may be the same as the order of sub-bitstreams. In other words, the bitstream may be accumulated in the width-first order of the geometry tree, and each slice may be matched to a group of tree layers as shown in FIG. 25-(*b*). Also, the segmented slices may inherit the layering structure of the G-PCC bitstream.

Also, the following slices may not affect previous slices, just as a higher layer does not affect lower layers in the geometry tree.

The segmented slices according to the embodiments are efficient in terms of error robustness, efficient transmission, support for a region of interest, and the like.

1) Error Resilience

Compared to the single slice structure, segmented slices may be more robust to errors. When a slice contains the entire bitstream of a frame, data loss may affect the entire frame data. On the other hand, when the bitstream is segmented into multiple slices, at least one slice that is not affected by the loss even when at least one slice is lost may be decoded.

2) Scalable Transmission

The present disclosure may consider a case where a plurality of decoders having different capabilities may be supported.

When coded point cloud data (i.e., a point cloud compression (PCC) bitstream) is included in a single slice, the LOD of the coded point cloud data may be determined prior to encoding. Accordingly, a plurality of pre-encoded bitstreams having different resolutions of point cloud data may be transmitted independently. This may be inefficient in terms of large bandwidth or storage space.

When coded point cloud data (i.e., a point cloud compression (PCC) bitstream) is included in segmented slices, a single bitstream may support decoders of different levels. From the decoder perspective, the reception device may select target layers and may deliver the partially selected bitstream to the decoder. Similarly, by using a single bitstream without partitioning the entire bitstream, a partial bitstream may be efficiently generated by the transmission device.

3) Region-Based Spatial Scalability

Regarding the G-PCC requirement according to embodiments, region-based spatial scalability may be defined as follows. That is, a compressed bitstream may be composed of one or more layers. Thus, a specific region of interest may have a higher density with additional layers, and layers may be predicted from lower layers.

To support this requirement, it is necessary to support region-wise different detailed representation. For example, in VR/AR applications, it is desirable to represent far objects with lower precision and to represent nearer objects with higher accuracy. Also, the decoder may increase the resolution of the region of interest at the request. This operation may be implemented using the scalable structure of G-PCC, such as the geometry octree and scalable attribute coding scheme.

According to embodiments, decoders should access the entire bitstream based on the current slice structure including the entire geometry or attributes. This may result in inefficiency in terms of bandwidth, memory, and decoder. On the other hand, when the bitstream is segmented into multiple slices, and each slice includes sub-bitstreams according to scalable layers, the decoder according to the embodiments may select slices as needed before efficiently parsing the bitstream.

Figure 26:
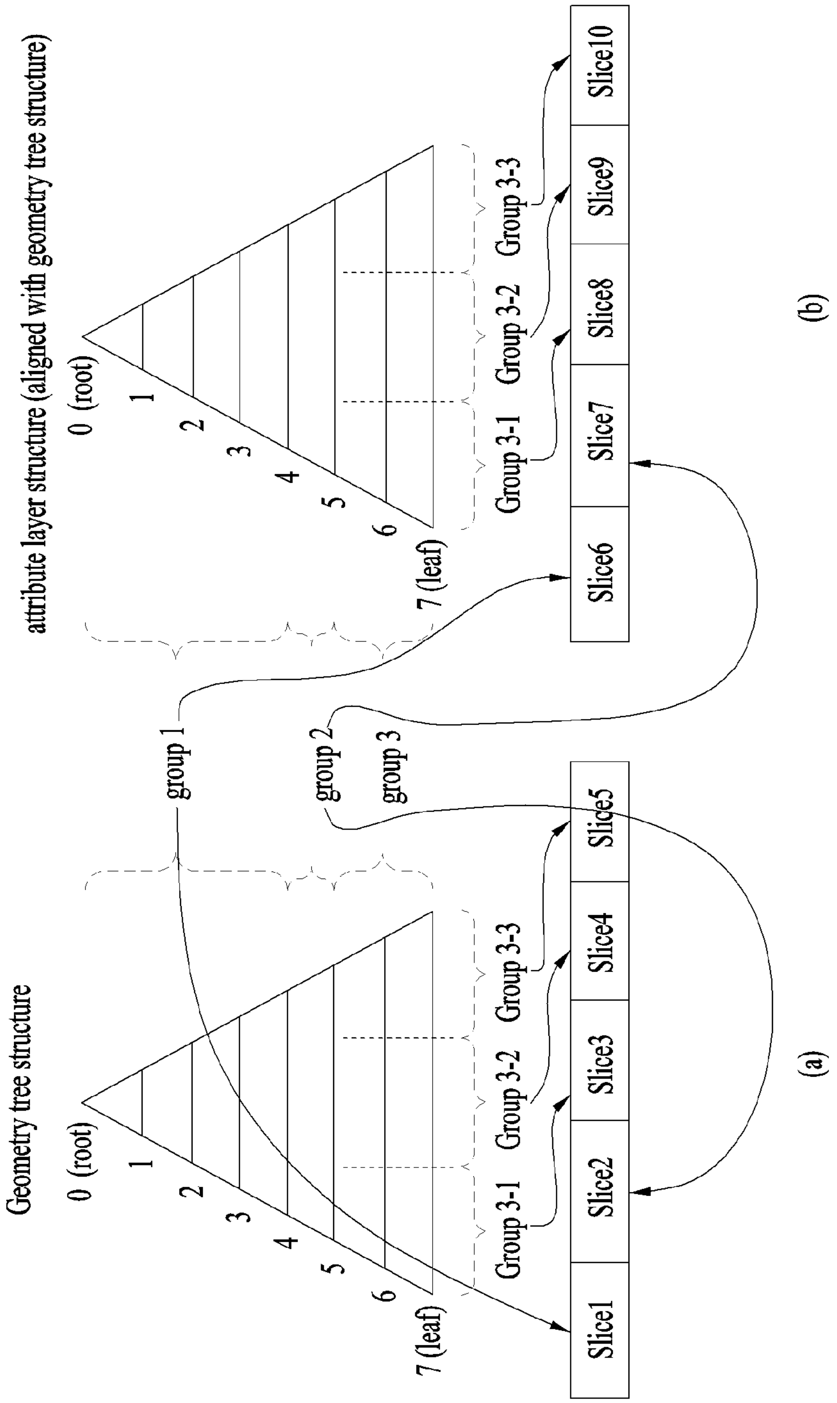
FIG. 26-(*a*) is a diagram showing an example of a geometry tree structure contained in a single slice according to embodiments, and FIG. 26-(*b*) is a diagram showing an example of a geometry tree structure contained in segmented slices.

FIG. 26-(*a*) is a diagram showing an example of a geometry tree structure and slice segments according to embodiments, and FIG. 26-(*b*) is a diagram showing an example of an attribute tree structure and slice segments according to embodiments. In particular, FIG. 26-(*b*) shows an example of an attribute tree structure aligned with the geometry tree structure of FIG. 26-(*a*).

A method/device according to embodiments may generate a slice layer group using a layer structure of point cloud data as shown in FIGS. 26-(*a*) and 26-(*b*).

The method/device according to the embodiments may apply segmentation of a geometry bitstream and an attribute bitstream included in different slices. In addition, in terms of tree depth, a coding tree structure of geometry and attribute coding and each slice included in the partial tree information may be used.

For an example, referring to FIG. 26-(*a*), there are 8 layers in an octree, and 5 slices are used to contain sub-bitstreams of one or more layers. According to embodiments, a group represents a group of geometry tree layers. For example, group 1 includes layers 0 to 4, group 2 includes layer 5, and group 3 includes layers 6 and 7.

In addition, a specific group may be divided into one or more subgroups. For example, referring to FIG. 26-(*a*), group 3 is divided into three subgroups (group 3-1, group 3-2, and group 3-3). In this case, parent and child pairs are present in each subgroup. That is, group 3-1 to group 3-3 are subgroups of group 3. In the layer group structure of the geometry coding tree as shown in FIG. 26-(*a*), slice 1 is used to contain a geometry sub-bitstream belonging to group 1, and slice 2 is used to contain a geometry sub-bitstream belonging to group 2. Also, slice 3 is used to contain a geometry sub-bitstream belonging to subgroup 3-1, slice 4 is used to contain a geometry sub-bitstream belonging to subgroup 3-2, and slice 5 is used to contain a geometry sub-bitstream belonging to subgroup 3-3.

In one environment, when scalable attribute coding is used and the attribute tree structure is the same as the geometry tree structure, the same octree-slice mapping may be used to generate attribute slice segments as shown in FIG. 26-(*b*). That is, in the aligned layer group structure of the attribute coding tree as shown in FIG. 26-(*b*), slice 6 is used to contain an attribute sub-bitstream belonging to group 1, and slice 7 is used to contain an attribute sub-bitstream belonging to group 2. Slice 8 is used to contain an attribute sub-bitstream belonging to subgroup 3-1, slice 9 is used to contain an attribute sub-bitstream belonging to subgroup 3-2, and slice 10 is used to contain an attribute sub-bitstream belonging to subgroup 3-3.

In the present disclosure, a layer group is referred to as a group and represents a group of layer structure units occurring in G-PCC coding, such as an octree layer and a LoD layer.

A subgroup according to the embodiments may be represented as a set of neighbor nodes based on position information for one layer group. Alternatively, a bundle may be configured based on the lowest layer (which may be a layer closest to the root, and may be layer 6 in the case of group 3 in FIG. 26). A subgroup may be configured as a bundle of nodes neighboring each other by Morton code order, as a bundle of distance-based neighbor nodes, or as a bundle of nodes neighboring each other according to coding order. Additionally, nodes in a parent-child relationship may be specified to be present in the same subgroup.

When a subgroup is defined, a boundary occurs in the middle of a layer, and signaling information (e.g., sps_entropy_continuation_enabled_flag, gsh_entropy_continuation_flag, etc.) is used to indicate whether continuity is maintained at the boundary. That is, the signaling information may be used to indicate whether entropy is used continuously, and ref_slice_id may be provided. Thereby, continuity with the previous slice may be continuously maintained.

Figure 27:
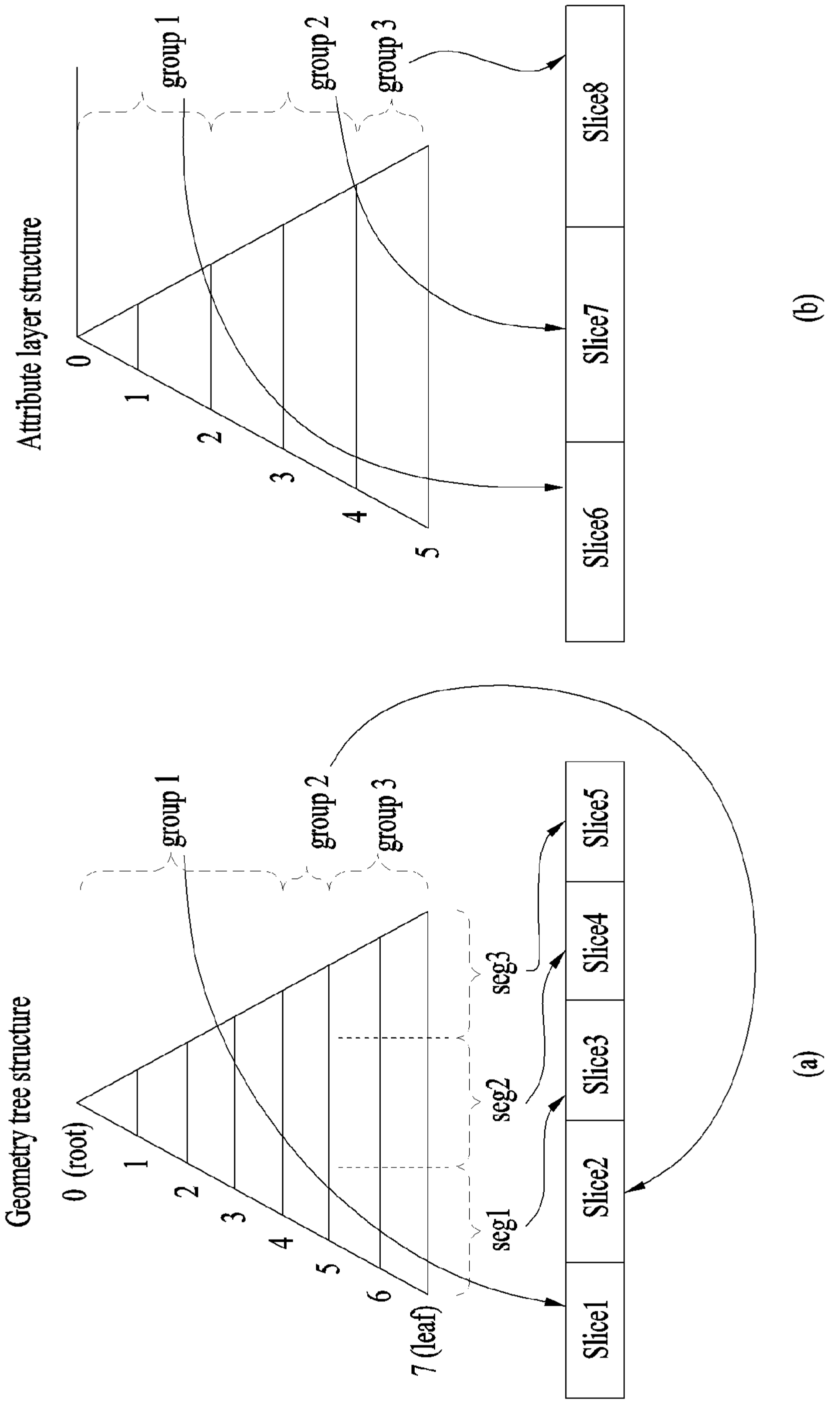
FIG. 27-(*a*) is a diagram showing another example of a geometry tree structure contained in a single slice according to embodiments, and FIG. 27-(*b*) is a diagram showing another example of a geometry tree structure contained in segmented slices.

FIG. 27-(*a*) is a diagram showing another example of a geometry tree structure and slice segments according to embodiments, and FIG. 27-(*b*) is a diagram showing another example of an attribute tree structure and slice segments according to embodiments. In particular, the layer group structure of the attribute coding tree (or referred to as an attribute tree) of FIG. 27-(*b*) is independent of the geometry layer group structure of the geometry coding tree (or referred to as a geometry tree) of FIG. 27-(*a*). That is, the attribute coding layers of the attribute coding tree is different from the geometry coding layers of the geometry coding tree. In other words, FIGS. 27-(*a*) and 27-(*b*) show a layer group structure of a geometry coding tree (or referred to as a geometry tree) and an independent layer group structure of an attribute coding tree (or referred to as an attribute tree) according to embodiments.

A method/device according to embodiments may generate a geometry coding tree based on a geometry bitstream and an attribute coding tree based on an attribute bitstream as shown in FIGS. 27-(*a*) and 27-(*b*). In this case, the attribute coding layers of the attribute coding tree may have a structure different from that of the geometry coding layers of the geometry coding tree. Referring to FIG. 27-(*b*), the groups in the attribute tree structure may be defined independently of the groups in the geometry tree structure.

For example, referring to FIG. 27-(*a*), for scalable geometry coding, there are 8 layers in an octree, and 5 slices are used to contain a geometry sub-bitstream of one or more layers. According to the embodiments, a group represents a group of geometry tree layers. For example, group 1 includes layers 0 to 4, group 2 includes layer 5, and group 3 includes layers 6 and 7. Also, a specific group may be divided into one or more subgroups. For example, referring to FIG. 27-(*a*), group 3 is divided into three subgroups (seg1, seg2, and seg3). In this case, parent and child pairs are present in each subgroup. In the layer group structure of the geometry coding tree as shown in FIG. 27-(*a*), slice 1 is used to contain a geometry sub-bitstream belonging to group 1, and slice 2 is used to contain a geometry sub-bitstream belonging to group 2. Also, slice 3 is used to contain a geometry sub-bitstream belonging to subgroup 1 (seg1), slice 4 is used to contain a geometry sub-bitstream belonging to subgroup 2 (seg2), and slice 5 is used to contain a geometry sub-bitstream belonging to subgroup 3 (seg3).

For example, referring to FIG. 27-(*b*), for scalable attribute coding, there are 6 layers in an octree, and 3 slices are used to contain attribute sub-bitstreams of one or more layers. According to the embodiments, a group represents a group of attribute tree layers. For example, group 1 includes layers 0 to 2, group 2 includes layers 3 and 4, and group 3 includes layer 6. In the layer group structure of the attribute coding tree as shown in FIG. 27-(*b*), slice 6 is used to contain an attribute sub-bitstream belonging to group 1, slice 7 is used to contain an attribute sub-bitstream belonging to group 2, and slice 8 is used to contain an attribute sub-bitstream belonging to group 3.

The present disclosure proposes segmentation of slices paired with geometry and attribute layer structures for efficient use of the G-PCC layering structure.

According to embodiments, for geometry slice segments, each slice segment may contain coded data from one layer group. Here, in one embodiment, the layer group may be defined as a group of consecutive tree layers, the start and end depths of the tree layers may be specific numbers in the tree depth, and the start depth may be less than the end depth.

According to embodiments, for attribute slice segments, each slice segment may contain coded data from one layer group. Here, the layers (or referred to as tree layers) may be tree depths (or referred to as levels) or LODs according to an attribute coding scheme.

In one embodiment, the order of coded data in slice segments may be the same as the order of coded data in a single slice.

According to embodiments, signaling information related to a layer group structure may be included in at least one of parameter sets. The parameter sets according to the embodiments may include a sequence parameter set, a geometry parameter set, an attribute parameter set, or a tile parameter set.

In one embodiment, a description of the layer group structure corresponding to the geometry tree layers is required. To this end, the geometry parameter set may include information on the number of groups (num_layer_groups_minus1), group identifier information (layer_group_id), information on the number of tree depth(s) in the group (num_tree_depth), and information on the number of subgroup(s) in the group (num_subgroups). According to embodiments, the signaling information related to the layer group structure may include at least one of num_layer_groups_minus1, layer_group_id, num_tree_depth, or num_subgroups.

num_layer_groups_minus1 plus 1 specifies the number of layer groups where the layer group represents a group of consecutive tree layers that are part of the geometry coding tree structure.

layer_group_id specifies the layer group identifier of the i-th layer group.

num_tree_depth specifies the number of tree depth(s) contained in the i-th layer group.

num_subgroups specifies the number of subgroups included in the i-th layer group.

In one embodiment, a description of the layer group structure corresponding to the attribute tree layers is required. To this end, the attribute parameter set may include information on the number of groups (num_layer_groups_minus1), group identifier information (layer_group_id), information on the number of tree depth(s) in a group (num_tree_depth_minus1), and information on the number of subgroup(s) in a group (num_subgroups_minus1). That is, num_layer_groups_minus1, layer_group_id, num_tree_depth_minus1, and num_subgroups_minus1 are defined in the attribute parameter set to describe the layer group structure. In addition, indication information indicating whether the attribute slice structure is aligned with the geometry slice structure (aligned_layer_group_structure_flag) is required, and the attribute parameter set may further include this indication information (aligned_layer_group_structure_flag). According to embodiments, the signaling information related to the layer group structure may include at least one of num_layer_groups_minus1, layer_group_id, num_tree_depth_minus1, num_subgroups_minus1, or aligned_layer_group_structure_flag.

aligned_layer_group_structure_flag equal to 1 specifies that the layer group and subgroup structure of the attribute slices is identical to the geometry layer group and subgroup structure. aligned_layer_group_structure_flag equal to 0 specifies that the layer group and subgroup structure of the attribute slices is not identical to the geometry layer group and subgroup structure.

According to embodiments, when aligned_layer_group_structure_flag is equal to 1, the attribute parameter set includes geometry parameter set identification information (geom_parameter_set_id). When aligned_layer_group_structure_flag is equal to 0, the attribute parameter set includes information on the number of groups (num_layer_groups_minus1), group identifier information (layer_group_id), information on the number of tree depth(s) in a group (num_tree_depth_minus1), and information on the number of subgroup(s) in a group (num_subgroups_minus1).

geom_parameter_set_id specifies the geometry parameter set identifier that contains information on the layer group and subgroup structure that is aligned with the attribute layer group structure.

num_layer_groups_minus1 plus 1 specifies the number of layer groups where the layer group represents a group of consecutive tree layers that are part of the attribute coding tree structure.

layer_group_id specifies the layer group identifier of the i-th layer group.

num_tree_depth_minus1 plus 1 specifies the number of tree depth(s) contained in the i-th layer group.

num_subgroups_minus1 plus 1 specifies the number of subgroups included in the i-th layer group.

According to embodiments, signaling information related to the layer group structure may be included in at least one of a geometry slice header and an attribute slice header. According to embodiments, the geometry slice header has the same meaning as a geometry data unit header, and the attribute slice header has the same meaning as an attribute data unit header.

In one embodiment, the geometry slice header includes group identification information (layer_group_id) and/or subgroup identification information (subgroup_id) for identification of groups and subgroups of each slice.

layer_group_id specifies a layer group identifier for identifying a group of a corresponding slice.

subgroup_id specifies a subgroup identifier for identifying a subgroup in a layer group identified by layer_group_id.

In one embodiment, when the attribute layer structure is not aligned with the geometry slice structure (or geometry group), layer_group_id and/or subgroup_id are included to identify groups and subgroups of each slice.

layer_group_id specifies a layer group identifier for identifying a group of a corresponding slice.

subgroup_id specifies a subgroup identifier for identifying a subgroup in a layer group identified by layer_group_id.

In the present disclosure, layer_group_id and subgroup_id may be used to indicate the order of slices and may be used to sort the slices in bitstream order.

In the present disclosure, for octree-based position compression, compression efficiency may be increased based on the correlation between nodes when the point density is high.

Figure 28:
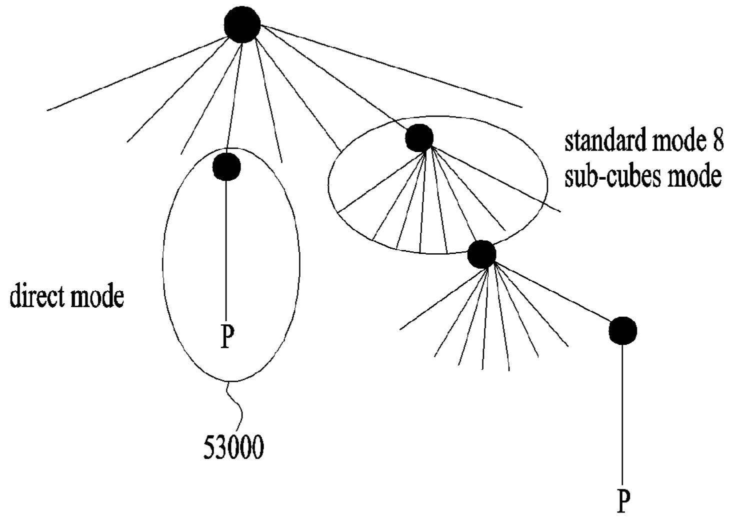
FIG. 28 illustrates an example of an octree and a direct mode according to embodiments.

However, when the point density is low, the compression efficiency is lowered compared to the complicated operation because the correlation between nodes is lowered as the depth increases. To address this issue, direct compression of directly compressing the position of a point when the correlation between nodes is low may be used. FIG. 28 illustrates an example of combining tree coding and direct coding modes according to embodiments. That is, when octree-based compression is performed, the positions of points present at similar positions may be represented in a bundle, and therefore the number of required bits may be reduced. However, as shown in FIG. 28, when there is no sibling node among the descendent nodes of an occupied node (53000), the octree-based compression may not have a significant effect. Accordingly, in this case, by performing direct coding on the node (i.e., point) 53000 in a direct mode, coding efficiency and compression speed may be improved.

That is, referring to the octree structure, a maximum of 8 descendent nodes may be provided based on the current point (node). The 8 descendent nodes may include an occupied node and/or unoccupied nodes.

If there are no descendent nodes and/or sibling nodes based on the current point, it is highly likely that similar neighbor points are not present. Accordingly, when a residual is generated by generating a predicted value between nodes (points), the residual may become large, the accuracy may be lowered, or latency may occur. In this case, the position value of the point may be transmitted by performing direct coding on the point (e.g., 53000 in FIG. 28).

As a method to determine whether the direct coding is performed according to embodiments, the method/device according to the embodiments may determine use of the direct coding based on a correlation with neighbor nodes as follows. That is, the direct compression method may operate when the following specific conditions are satisfied.

1) Condition for parent-based eligibility: Only the current node is an occupied child from the perspective of the parent node of the current node (point), and there is at most one occupied child (i.e., occupied sibling of the parent) (i.e., there are 2 occupied children) from the perspective of the parent (grand-parent) of the parent.
2) Condition for 6N eligibility: From the perspective of the parent node, only the current node is an occupied child, and 6 neighbors (nodes contacting face to face) are unoccupied.

For example, in this case, it may be determined that direct coding is available. In this case, only when the number of included points is less than or equal to a threshold, the inferred direct coding mode (IDCM) may be applied. When the IDCM is executed, information indicating that the IDCM is executed, the number of points, and information indicating the XYZ values of the point positions (that is, the portion corresponding to the remaining depths that are not octree-coded) may be included in at least one of the parameter sets and delivered to the reception device.

Figure 29:
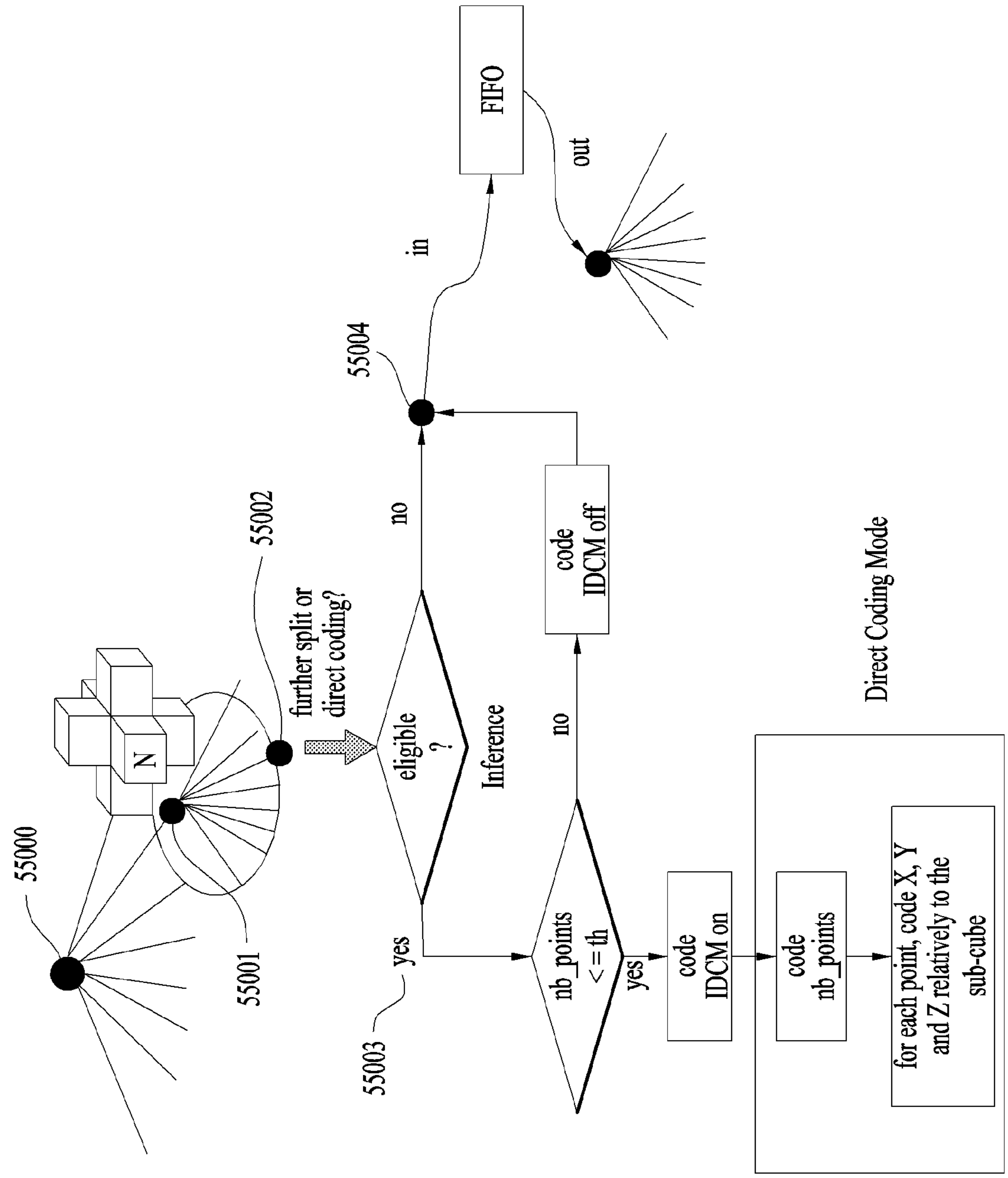
FIG. 29 is a flowchart illustrating direct coding according to embodiments.

FIG. 29 is a flowchart illustrating the overview of the IDCM according to embodiments.

The direct compression operation according to the embodiments may be performed through the transmission device 10000 of FIG. 1, the point cloud video encoder 10002 of FIG. 1, the encoding of FIG. 2, the point cloud video encoder of FIG. 4, the transmission device of FIG. 12, the device of FIG. 14, the point cloud data transmission device of FIG. 49, or one or more processors or integrated circuits configured to communicate with one or more memories corresponding thereto. The one or more memories may store programs for processing/controlling the operations according to the embodiments. Each component of the point cloud transmission device/method according to the embodiments may be implemented with hardware, software, processor, and/or a combination thereof. The one or more processors may control various operations described herein. The processor may be referred to as a controller or the like. The operations according to the embodiments may be performed by firmware, software, and/or a combination thereof. The firmware, software, and/or a combination thereof may be stored in a processor or a memory.

Figure 50:
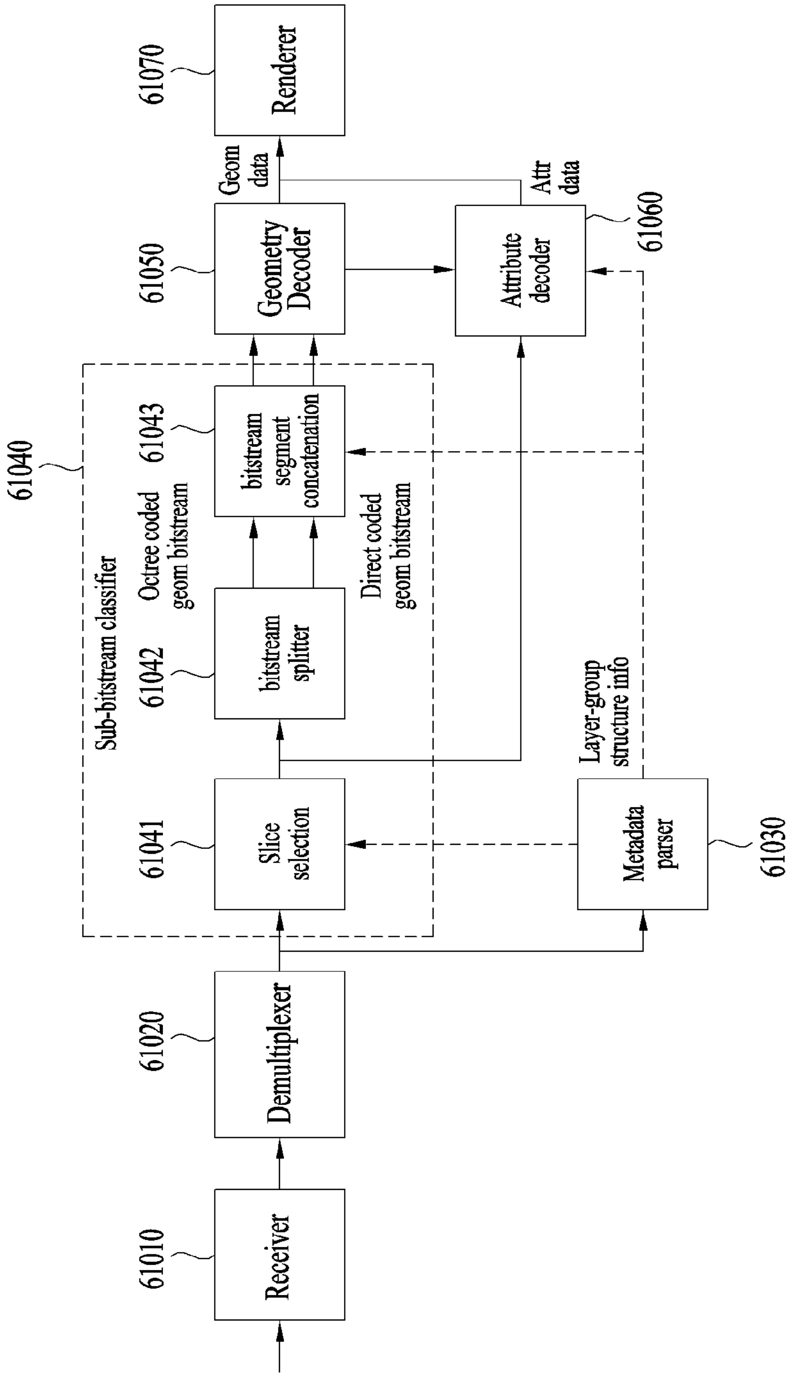
FIG. 50 is a block diagram illustrating another example of a point cloud reception device according to embodiments.

The direct decompression operation according to the embodiments may be performed through the reception device 10004 of FIG. 1, the point cloud video decoder 10006 of FIG. 1, the decoding of FIG. 2, the decoder of FIG. 10, the decoder of FIG. 11, the reception device of FIG. 13, the device of FIG. 14, the point cloud data reception device of FIG. 50, or one or more processors or integrated circuits configured to communicate with one or more memories corresponding thereto. The one or more memories may store programs for processing/controlling the operations according to the embodiments. Each component of the point cloud reception device/method according to the embodiments may be implemented with hardware, software, a processor, and/or a combination thereof. The one or more processors may control various operations described herein. The processor may be referred to as a controller or the like. The operations according to the embodiments may be performed by firmware, software, and/or a combination thereof. The firmware, software, and/or a combination thereof may be stored in a processor or a memory.

Referring to FIG. 29 as an example, a parent node 55000 may have up to 8 children according to the distribution of points, and a specific child 55001 may further have a child 55002. In this case, the child 55001 is the parent node of the child 55002. In addition, it may be determined whether to further perform octree splitting and predictive coding or direct mode coding at the child 55002.

When it is determined that direct mode coding is available (55003), it is checked whether the number of neighbor nodes (neighbor points) for the point 55002 is less than or equal to a threshold(th). When the number of neighbor nodes (neighbor points) for the point 55002 is less than or equal to the threshold(th), the direct mode may be enabled. In addition, x, y, and z coordinate information about the position of each of the one or more points may be direct-coded. According to embodiments, the position values may be represented based on a sub-cube for the octree.

In another embodiment, when the number of neighbor nodes (neighbor points) for the point 55002 exceeds the threshold th, the compression efficiency of prediction coding may be higher than that of direct coding, and thus the direct mode may be disabled and the node may be further split to generate an octree. That is, when it is determined that the direct mode coding is not available (55004), the octree may be further split into octree-based sub-cubes based on the point.

As described above, when direct compression is performed, the x, y, and z position information about the current depth and lower depths is directly transmitted to the reception device. In this case, since independent position information is compressed, the compression efficiency may not be high even when arithmetic entropy compression is used.

Figure 30:
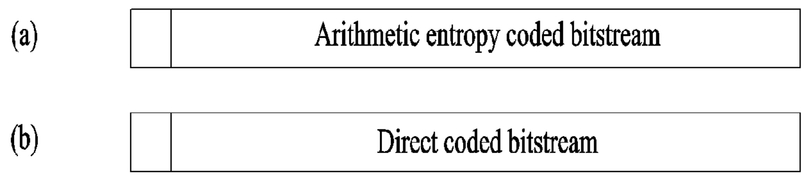
FIG. 30-(*a*) is a diagram showing an example of an arithmetic entropy coded (AEC) bitstream, and FIG. 30-(*b*) is a diagram showing an example of a direct coded (DC) bitstream.

Therefore, in this case, the transmission device/method may perform direct compression (or referred to as coding) on the x, y, and z values. In this case, the direct coded bitstream (FIG. 30-(*b*)) may be transmitted independently of an arithmetic entropy coded bitstream (FIG. 30-(*a*)). FIG. 30-(*a*) is a diagram showing an example of an arithmetic entropy coded (AEC) bitstream, and FIG. 30-(*b*) is a diagram showing an example of a direct coded (DC) bitstream.

When the geometry tree structure is divided into layer group(s) and/or subgroup(s) for scalable transmission, slices may be configured by dividing the AEC bitstream according to each layer group and/or subgroup. In one embodiment, when multiple slices are configured, each slice includes a part of the AEC bitstream, that is, an AEC sub-bitstream. In addition, a separate slice may be configured for the DC bitstream. In this case, the type of a bitstream included in each slice may be divided into an AEC bitstream and a DC bitstream. Accordingly, when geometry partial decoding is performed, the reception device may select a slice including a required AEC bitstream, and select information on a DC point of a required depth in a slice including a DC bitstream.

In the present disclosure, for simplicity, a slice including an AEC bitstream is referred to as an AEC slice, and a slice including a DC bitstream is referred to as a DC slice.

Figure 31:
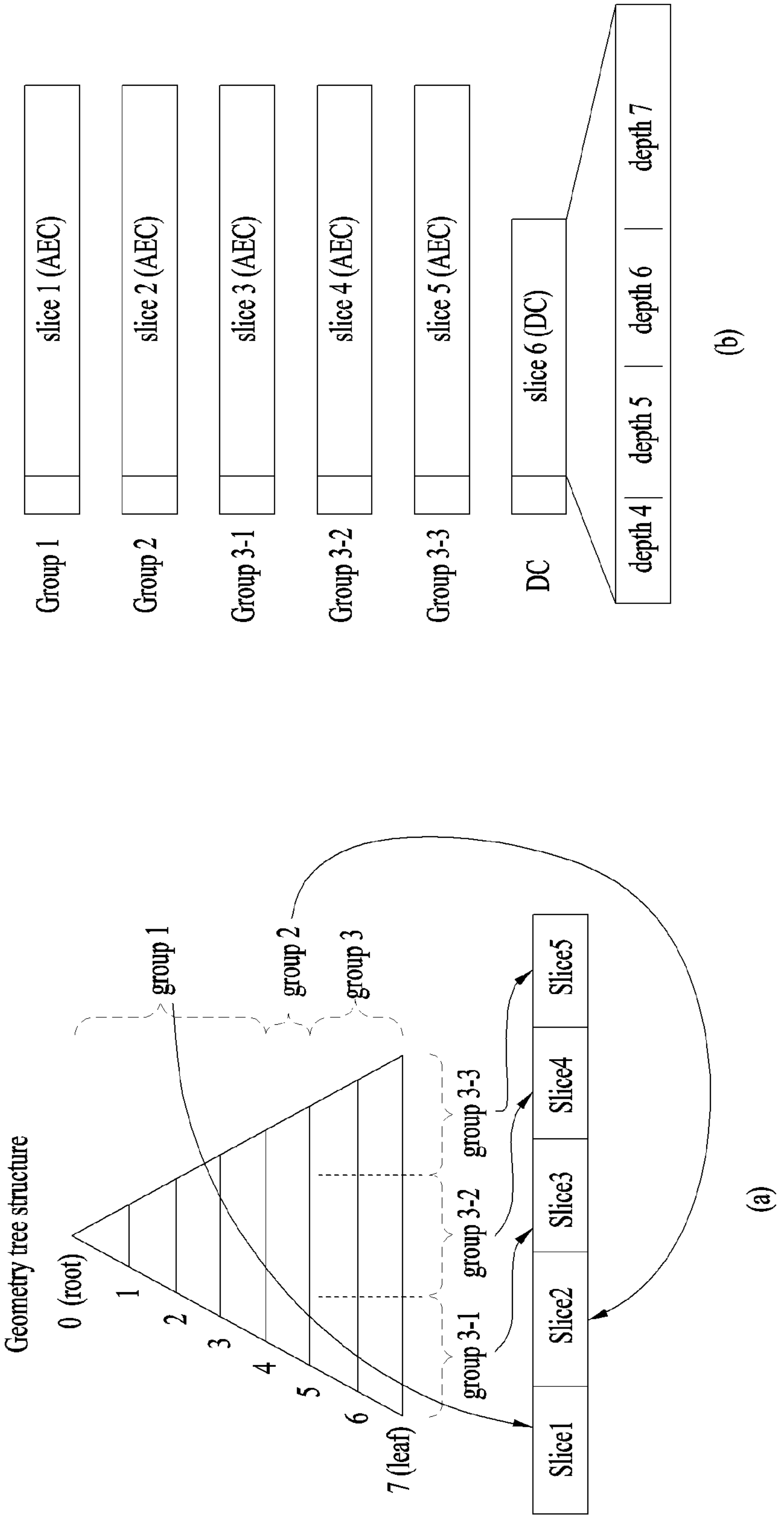
FIG. 31-(*a*) is a diagram showing another example of a geometry tree structure and slice segments according to embodiments, and FIG. 31-(*b*) is a diagram showing an example of a plurality of AEC slices and one DC slice according to embodiments.

FIG. 31-(*a*) is a diagram showing another example of a geometry tree structure and slice segments according to embodiments, and FIG. 31-(*b*) is a diagram showing an example of a plurality of AEC slices and one DC slice according to embodiments. That is, the DC bitstream is carried in one slice.

FIG. 31(*a*) illustrates a case where position compression is performed based on 7 octree depths. In this case, the geometry tree structure (i.e., the octree structure) includes 3 groups and is divided into 5 layer groups (e.g., one of the 3 groups is divided into 3 subgroups), and the AEC bitstreams of the 5 layer groups are included in 5 slices (e.g., slice 1 to slice 5), respectively. In this case, when direct coding is used, the DC bitstream may be transmitted in a separate slice (e.g., slice 6). According to embodiments, DC bitstreams included in slice 6 may be sequentially transmitted according to the octree depth. Referring to FIG. 31-(*b*), for example, a DC bitstream of depth 4, a DC bitstream of depth 5, a DC bitstream of depth 6, and a DC bitstream of depth 7 are included slice 6 in this order. This example corresponds to a case where direct coding is performed starting at depth 4.

When the reception device uses only information about depths up to octree depth (i.e., group 2), the reception device may select slices 1 and 2 to reconstruct the AEC bitstream corresponding to octree depth 5 through an AEC decoder. Additionally, the reception device may select slice 6, and reselect DC bitstreams corresponding to depths 4 and in slice 6 to reconstruct the bitstreams through a DC decoder. That is, the reception device may independently reconstruct the positions of direct-coded points through the DC decoder.

In this case, the DC decoder may select and use only necessary information for a corresponding layer from the x, y, and z position information.

In the example below, the octree depth A is an octree depth at which direct coding is performed, and the octree depth B is an octree depth after the octree depth A and may be a value obtained by subtracting the octree depth A from the full octree depth N. That is, when it is defined that octree depth B=octree depth (N-A), the position of the DC compressed leaf node may be defined as a DC position at the AEC occupied node position before DC as shown in Equation 5 below. That is, when direct coding is performed, if a preset condition is satisfied while performing coding toward the leaf node by octree coding, direct coding is performed. In this example, when the depth at which direct coding starts is depth B, the final node position is obtained by concatenating the position of the previous depth (e.g., depth A, octree-coded depth) with respect to depth B to the direct coded position. In other words, it is an equation for finding the position when decoding is fully performed.

$$\text{Leaf node position } (x \text{ or } y \text{ or } z) = \text{occupied node position (from AEC bitstream of upper layer) at octree depth } A \ll \text{octree depth } B + DC \text{ position after octree depth } A \qquad \text{[Equation 5]}$$

In Equation 5, "occupied node position at octree depth A<<octree depth B" means that the "occupied node position at octree depth A" should be bit-shifted to the left by "octree depth B."

In addition, when octree depth C is an octree depth targeted in partial decoding (where octree depth C<Full octree depth N, and octree depth C>octree depth A), if partial geometry decoding is performed, the position of the point/node may be defined as in Equation 6 below.

$$\text{Partially decoded node position } (x \text{ or } y \text{ or } z) \text{ at octree depth } C = \text{occupied node position (from } AEC\text{) at octree depth } A \ll \text{octree depth } (C-A) + DC \text{ position after octree depth } A \gg \text{octree depth } (B-(C-A)) \qquad \text{[Equation 6]}$$

Equation 6 is an application of Equation 5. That is, the position changes when partial decoding is performed, and this equation is used to obtain the position changed at this time.

For example, a DC position is added after an octree-decoded position. In this case, a node (or depth) lost by partial decoding is taken into consideration in this equation. Considering the depth lost due to partial decoding, the positions of depths excluding this part are shifted and concatenated.

Figure 32:
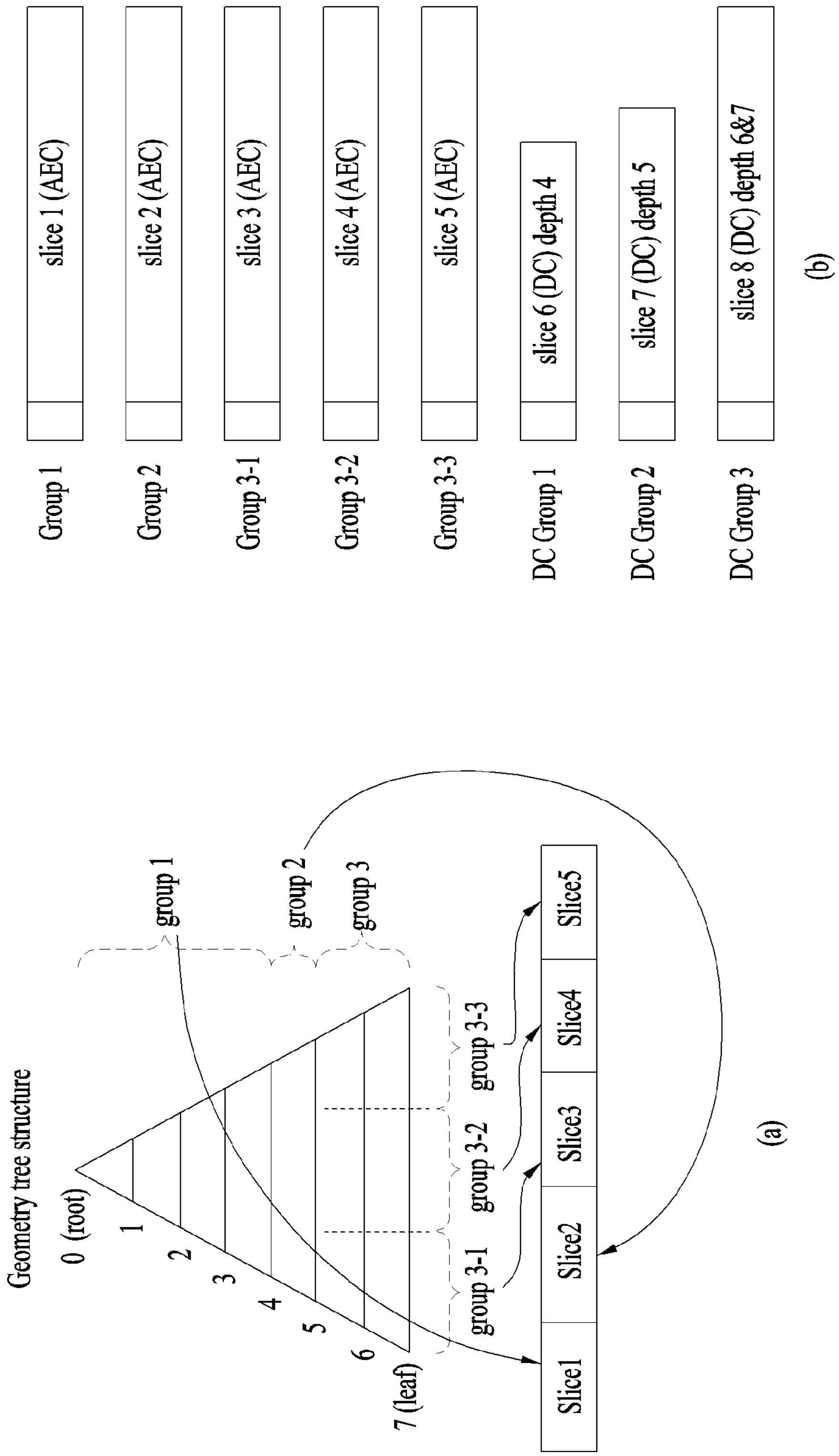
FIG. 32-(*a*) is a diagram showing another example of a geometry tree structure and slice segments according to embodiments, and FIG. 32-(*b*) is a diagram showing another example of AEC slices and DC slices according to embodiments.

FIG. 32-(*a*) is a diagram showing another example of a geometry tree structure and slice segments according to embodiments, and FIG. 32-(*b*) is a diagram showing another example of AEC slices and DC slices according to embodiments.

That is, FIGS. 32-(*a*) and 32-(*b*) illustrate another method for transmitting a DC bitstream. In this example, a DC bitstream is divided by octree depths and each divided DC bitstream is transmitted through each slice. That is, as many slices for DC as the number of divided DC bitstreams are segmented.

FIGS. 32-(*a*) and 32-(*b*) illustrate that a DC bitstream is divided into three DC groups. The DC groups may be divided according to layer groups. For example, when the geometry tree structure is divided into three layer groups (group1, group2, and group3), the DC bitstream is also divided into three DC groups (DC group1, DC group2, and DC group3). Referring to FIGS. 32-(*a*) and 32-(*b*), subgroups are not applied to the DC bitstream. However, in an application field, subgroups may also be divided in the same manner. In this case, DC group 3 may be further divided into three DC groups, that is, DC group 3-1, DC group 3-2, and DC group 3-3 (i.e., three DC subgroups). According to embodiments, the DC bitstreams of the three DC groups (DC group 1, DC group2, and DC group3) are transmitted in three slices (slice 6 to slice 8), respectively. FIG. 32-(*b*) shows an example in which a DC bitstream of depth 4 (i.e., DC group 1) is included in slice 6, a DC bitstream of depth 5 (i.e., DC group 2) is included in slice 7, and a DC bitstream of depths 6 and 7 (i.e., DC group 3) is included in slice 8.

Alternatively, the criterion for dividing the DC bitstream into groups and the criterion for dividing the AEC bitstream into groups may be separately applied according to the application field.

When the reception device decodes only information up to octree depth 5, it may select slices 1 and 2 and perform AEC decoding (i.e., reconstruction) on the AEC bitstreams included in slices 1 and 2 through the AEC decoder, and may select slices 6 and 7 and perform DC decoding (i.e., reconstruction) on the DC bitstreams included in slice 6, 7 through the DC decoder.

In this case, in order to allow the reception device to select a DC slice according to the octree depth, layer-group or octree depth information about a bitstream included in each DC slice may be transmitted to the reception device.

Figure 33:
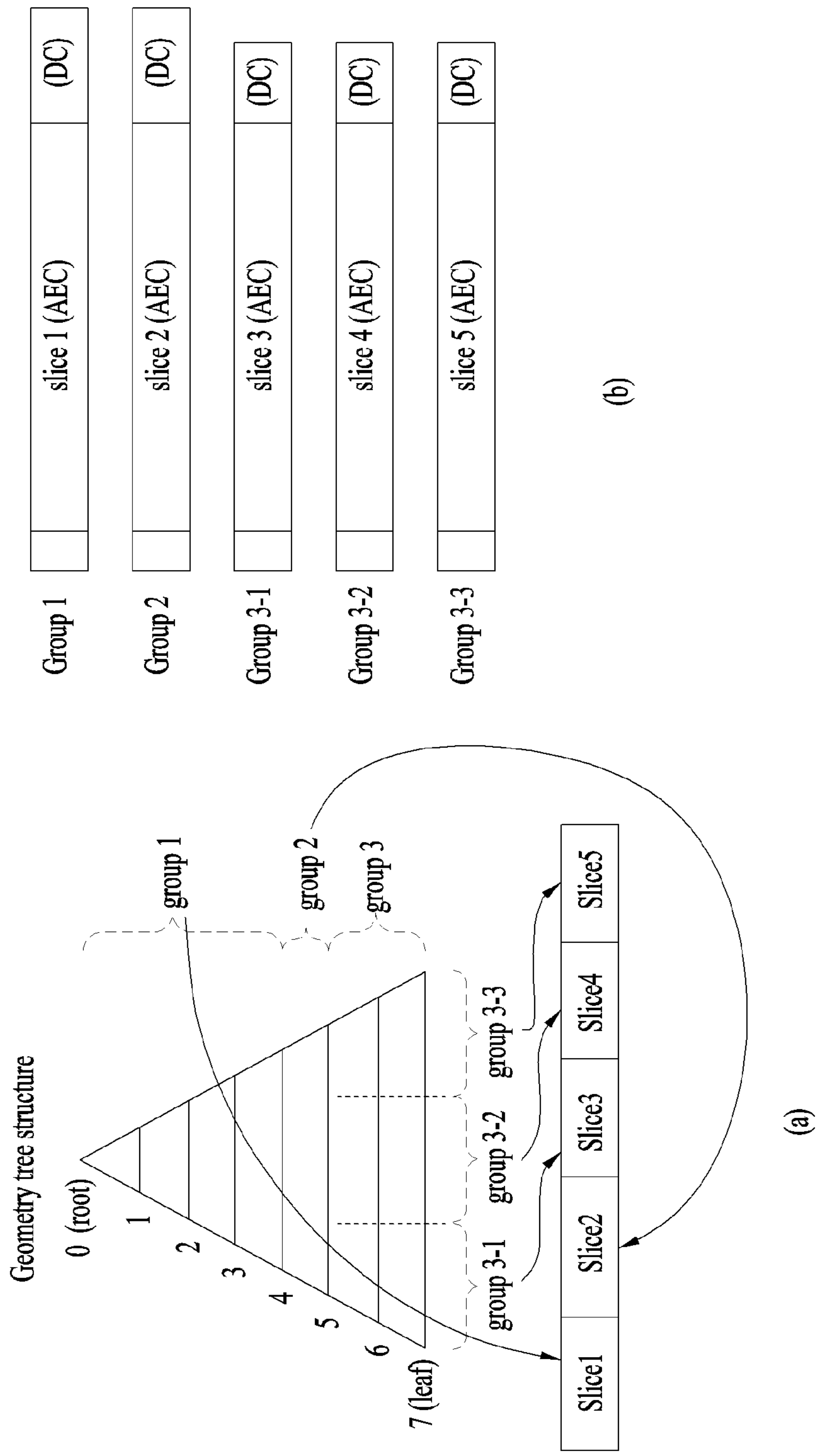
FIG. 33-(*a*) is a diagram showing another example of a geometry tree structure and slice segments according to embodiments, and FIG. 33-(*b*) is a diagram showing another example of AEC slices and DC slices according to embodiments.

FIG. 33-(*a*) is a diagram showing another example of a geometry tree structure and slice segments according to embodiments, and FIG. 33-(*b*) is a diagram showing another example of AEC slices and DC slices according to embodiments.

That is, FIGS. 33-(*a*) and 33-(*b*) illustrate another method for transmitting a DC bitstream. In the illustrated example, an AEC bitstream and a DC bitstream matched to each other according to an octree depth are transmitted together through the same slice. In this case, in an embodiment, the criterion for dividing the AEC bitstream is the same as the criterion for dividing the DC bitstream. For example, the same layer-group partitioning method is used to divide the AEC bitstream and the DC bitstream.

When the reception device uses only information up to octree depth 5, slices 1 and 2 are selected. Slices 1 and 2 include an AEC bitstream and a DC bitstream belonging to group 1. Therefore, when slices 1 and 2 are selected, AEC decoding may be performed on the AEC bitstream included in slices 1 and 2 through the AEC decoder, and DC decoding may be performed on the DC bitstream through the DC decoder. In other words, in the case where the reception device uses octree depths only up to octree depth 5, slices 1 and 2 only need to be selected based on the layer-group information regardless of the AEC/DC bitstream type. Accordingly, the slice selection process may be operated more efficiently.

While a method of including different geometry coding bitstreams in one slice is described in the present disclosure, the method may be used even in an application field where different attribute coding bitstreams are included in one slice, or a geometry coding bitstream and an attribute bitstream are included in one slice. In this case, different types of bitstreams may have different layer-groups. Alternatively, different types of bitstreams may have the same layer-group structure. In this case, they may be efficiently used in application fields such as scalable transmission and spatial scalability.

Figure 34:
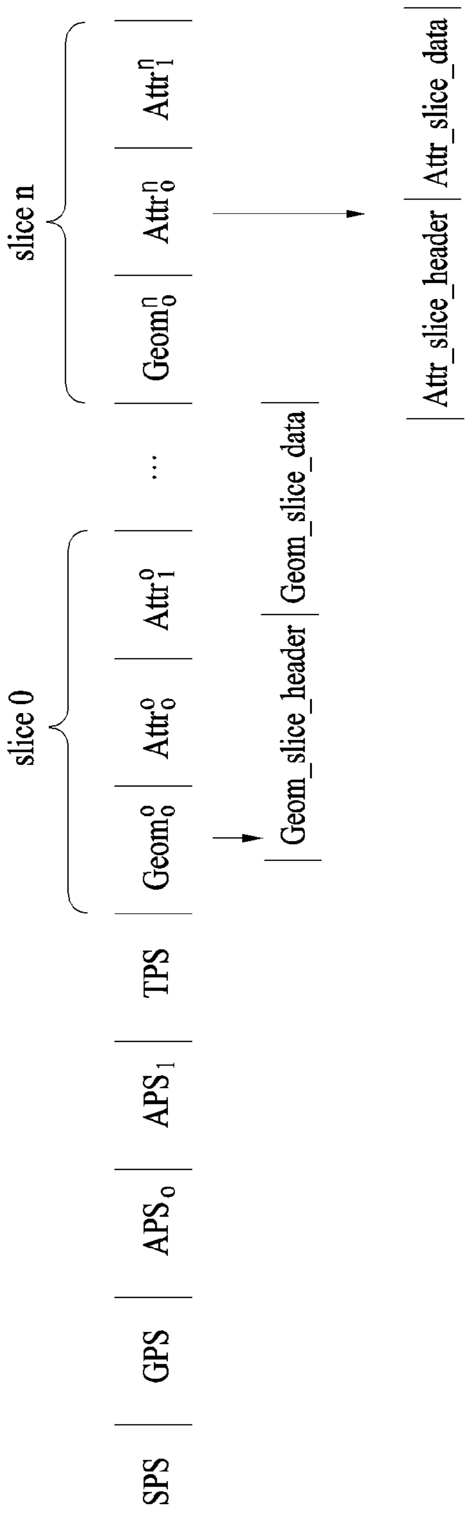
FIG. 34 is a diagram showing an exemplary bitstream structure of point cloud data for transmission/reception according to embodiments.

FIG. 34 illustrates an example of a bitstream structure of point cloud data for transmission/reception according to embodiments. According to embodiments, a bitstream output from any one of the point cloud video encoders of FIGS. 1, 2, 4, 12, and 49 may have the form of FIG. 34.

According to embodiments, the bitstream of the point cloud data provides a tile or a slice so that the point cloud data may be divided and processed according to a region. Each region of the bitstream according to the embodiments may have different importance. Accordingly, when the point cloud data is divided into tiles, a different filter (encoding method) and a different filter unit may be applied to each tile. In addition, when the point cloud data is divided into slices, a different filter and a different filter unit may be applied to each slice.

When dividing point cloud data into regions and compressing the point cloud data, the transmission device and the reception device according to the embodiments may transmit and receive the bitstream with a high-level syntax structure to selectively transmit attribute information in the divided regions.

The transmission device according to embodiments transmits the point cloud data according to the structure of the bitstream as illustrated in FIG. 34, so that different encoding operations may be applied according to importance and an encoding method with good quality may be used in an important region. In addition, efficient encoding and transmission according to the characteristics of the point cloud data may be supported and attribute values according to the demand of a user may be provided.

The reception device according to the embodiments receives the point cloud data according to the structure of the bitstream as illustrated in FIG. 34, so that a different filtering (decoding method) may be applied to each region (region divided into tiles or slices) according to the processing capability of the reception device, instead of using a complicated decoding (filtering) method for the entire point cloud data. Accordingly, better picture quality in a region important to the user may be provided and appropriate system latency may be ensured.

When a geometry bitstream, an attribute bitstream, and/or a signaling bitstream (or signaling information) according to the embodiments are composed of one bitstream (or G-PCC bitstream) as illustrated in FIG. 34, the bitstream may include one or more sub-bitstreams. The bitstream according to the embodiments includes an SPS for sequence level signaling, a GPS for signaling of geometry information coding, one or more APS s ($APS_0$ and $APS_1$) for signaling of attribute information coding, a tile inventory (also referred to as a TPS) for tile level signaling, and one or more slices (slice 0 to slice n). That is, the bitstream of the point cloud data according to the embodiments may include one or more tiles, and each tile may be a slice group including one or more slices (slice 0 to slice n). The tile inventory (i.e., TPS) according to the embodiments may include information about each tile (e.g., coordinate value information and height/size information of a tile bounding box) for one or more tiles. Each slice may include one geometry bitstream Geom0 and/or one or more attribute bitstreams Attr0 and Attr1. For example, slice 0 may include one geometry bitstream $Geom0^0$ and one or more attribute bitstreams $Attr0^0$ and $Attr1^0$.

The geometry bitstream within each slice may include a geometry slice header (geom_slice_header) and geometry slice data (geom_slice_data). According to embodiments, the geometry bitstream within each slice may also be referred to as a geometry data unit, the geometry slice header may also be referred to as a geometry data unit header, and the geometry slice data may also be referred to as geometry data unit data.

Each attribute bitstream in each slice may include an attribute slice header (attr_slice_header) and attribute slice data (attr_slice_data). According to embodiments, the attribute slice header in each slice may also be referred to as an attribute data unit, the attribute slice header may also be referred to as an attribute data unit header, and the attribute slice data may also be referred to as attribute data unit data.

According to embodiments, parameters required for encoding and/or decoding of point cloud data may be newly defined in parameter sets (e.g., SPS, GPS, APS, and TPS (or referred to as a tile inventory), etc.) of the point cloud data and/or the header of the corresponding slice. For example, they may be added to the GPS in encoding and/or decoding of geometry information, and may be added to the tile and/or slice header in tile-based encoding and/or decoding.

According to embodiments, information on segmented (separated) slices and/or information related to direct coding may be signaled in at least one of the SPS, the GPS, the APS, the TPS, or an SEI message. Also, the information on segmented (separated) slices and/or the information related to direct coding may be signaled in at least one of the geometry slice header (or referred to as a geometry data unit header) or the attribute slice header (or referred to as an attribute data unit header).

According to embodiments, the information on segmented (separated) slices and/or the information related to direct coding may be defined in a corresponding position or a separate position depending on an application or system such that the range and method to be applied may be used differently. A field, which is a term used in syntaxes that will be described later in the present disclosure, may have the same meaning as a parameter or a syntax element.

That is, the signal (i.e., the information on segmented (separated) slices and/or the information related to direct coding) may have different meanings depending on the position where the signal is transmitted. If the signal is defined in the SPS, it may be equally applied to the entire sequence. If the signal is defined in the GPS, this may indicate that the signal is used for position reconstruction. If the signal is defined in the APS, this may indicate that the signal is applied to attribute reconstruction. If the signal is defined in the TPS, this may indicate that the signal is applied only to points within a tile. If the signal is delivered in a slice, this may indicate that the signal is applied only to the slice. In addition, when the fields (or referred to as syntax elements) are applicable to multiple point cloud data streams as well as the current point cloud data stream, they may be carried in a superordinate parameter set.

According to embodiments, parameters (which may be referred to as metadata, signaling information, or the like) may be generated by the metadata processor (or metadata generator), signaling processor, or processor of the transmission device, and transmitted to the reception device so as to be used in the decoding/reconstruction process. For example, the parameters generated and transmitted by the transmission device may be acquired by the metadata parser of the reception device.

In this embodiment, it has been described that information is defined independently of the coding technique. However, in other embodiments, the information may be defined in connection with the coding technique. In order to support regionally different scalability, the information may be defined in the tile parameter set. Alternatively, a network abstract layer (NAL) unit may be defined and relevant information (e.g., information about segmented (separated) slices and/or information related to direct coding) for selecting a layer, such as layer_id, may be delivered, such that a bitstream may be selected even at a system level.

FIG. 35 shows an embodiment of a syntax structure of a sequence parameter set (SPS) (seq_parameter_set( )) according to the present disclosure. The SPS may contain sequence information about a point cloud data bitstream.

The SPS according to the embodiments may include a main_profile_compatibility_flag field, a unique_point_positions_constraint_flag field, a level_idc field, an sps_seq_parameter_set_id field, an sps_bounding_box_present_flag field, an sps_source_scale_factor_numerator_minus1 field, an sps_source_scale_factor_denominator_minus1 field, an sps_num_attribute_sets field, log2_max_frame_idx field, an axis_coding_order field, an sps_bypass_stream_enabled_flag field, and an sps_extension_flag field.

The main_profile_compatibility_flag field may indicate whether the bitstream conforms to the main profile. For example, main_profile_compatibility_flag equal to 1 may indicate that the bitstream conforms to the main profile. For example, main_profile_compatibility_flag equal to 0 may indicate that the bitstream conforms to a profile other than the main profile.

When unique_point_positions_constraint_flag is equal to 1, in each point cloud frame that is referred to by the current SPS, all output points may have unique positions. When unique_point_positions_constraint_flag is equal to 0, in any point cloud frame that is referred to by the current SPS, two or more output points may have the same position. For example, even when all points are unique in the respective slices, slices in a frame and other points may overlap. In this case, unique_point_positions_constraint_flag is set to 0.

level_idc indicates a level to which the bitstream conforms.

sps_seq_parameter_set_id provides an identifier for the SPS for reference by other syntax elements.

The sps_bounding_box_present_flag field indicates whether a bounding box is present in the SPS. For example, sps_bounding_box_present_flag equal to 1 indicates that the bounding box is present in the SPS, and sps_bounding_box_present_flag equal to 0 indicates that the size of the bounding box is undefined.

According to embodiments, when sps_bounding_box_present_flag is equal to 1, the SPS may further include an sps_bounding_box_offset_x field, an sps_bounding_box_offset_y field, an sps_bounding_box_offset_z field, an sps_bounding_box_offset_log 2_scale field, an sps_bounding_box_size_width field, an sps_bounding_box_size_height field, and an sps_bounding_box_size_depth field.

sps_bounding_box_offset_x indicates the x offset of the source bounding box in Cartesian coordinates. When the x offset of the source bounding box is not present, the value of sps_bounding_box_offset_x is 0.

sps_bounding_box_offset_y indicates the y offset of the source bounding box in Cartesian coordinates. When the y offset of the source bounding box is not present, the value of sps_bounding_box_offset_y is 0.

sps_bounding_box_offset_z indicates the z offset of the source bounding box in Cartesian coordinates. When the z offset of the source bounding box is not present, the value of sps_bounding_box_offset_z is 0.

sps_bounding_box_offset_log 2_scale indicates a scale factor for scaling quantized x, y, and z source bounding box offsets.

sps_bounding_box_size_width indicates the width of the source bounding box in Cartesian coordinates. When the width of the source bounding box is not present, the value of sps_bounding_box_size_width may be 1.

sps_bounding_box_size_height indicates the height of the source bounding box in Cartesian coordinates. When the height of the source bounding box is not present, the value of sps_bounding_box_size_height may be 1.

sps_bounding_box_size_depth indicates the depth of the source bounding box in Cartesian coordinates. When the depth of the source bounding box is not present, the value of sps_bounding_box_size_depth may be 1.

sps_source_scale_factor_numerator_minus1 plus 1 indicates the scale factor numerator of the source point cloud.

sps_source_scale_factor_denominator_minus1 plus 1 indicates the scale factor denominator of the source point cloud.

sps_num_attribute_sets indicates the number of coded attributes in the bitstream.

The SPS according to the embodiments includes an iteration statement repeated as many times as the value of the sps_num_attribute_sets field. In an embodiment, i is initialized to 0, and is incremented by 1 each time the iteration statement is executed. The iteration statement is repeated until the value of i reaches the value of the sps_num_attribute_sets field. The iteration statement may include an attribute_dimension_minus1[i] field and an attribute_instance_id[i] field. attribute_dimension_minus1 [i] plus 1 indicates the number of components of the i-th attribute.

The attribute_instance_id[i] field specifies the instance ID of the i-th attribute.

According to embodiments, when the value of the attribute_dimension_minus1[i] field is greater than 1, the iteration statement may further include an attribute_secondary_bitdepth_minus1[i] field, an attribute_cicp_colour_primaries[i] field, an attribute_cicp_transfer_characteristics[i] field, an attribute_cicp_matrix_coeffs[i] field, and an attribute_cicp_video_full_range_flag[i] field.

attribute_secondary_bitdepth_minus1[i] plus 1 specifies the bitdepth for the secondary component of the i-th attribute signal(s).

attribute_cicp_colour_primaries[i] indicates the chromaticity coordinates of the color attribute source primaries of the i-th attribute.

attribute_cicp_transfer_characteristics[i] either indicates the reference opto-electronic transfer characteristic function of the color attribute as a function of a source input linear optical intensity with a nominal real-valued range of 0 to 1 or indicates the inverse of the reference electro-optical transfer characteristic function as a function of an output linear optical intensity attribute_cicp_matrix_coeffs[i] describes the matrix coefficients used in deriving luma and chroma signals from the green, blue, and red, or Y, Z, and X primaries of the i-th attribute. attribute_cicp_video_full_range_flag[i] specifies the black level and range of the luma and chroma signals as derived from E'Y, E'PB, and E'PR or E'R, E'G, and E'B real-valued component signals of the i-th attribute.

The known_attribute_label_flag[i] field indicates whether a know_attribute_label[i] field or an attribute_label_four_bytes[i] field is signaled for the i-th attribute. For example, when known_attribute_label_flag[i] equal to 0 indicates the known_attribute_label[i] field is signaled for the i-th attribute. known_attribute_label_flag[i] equal to 1 indicates that the attribute_label_four_bytes[i] field is signaled for the i-th attribute.

known_attribute_label[i] specifies the type of the i-th attribute. For example, known_attribute_label[i] equal to 0 may specify that the i-th attribute is color. known_attribute_label[i] equal to 1 may specify that the i-th attribute is reflectance. known_attribute_label[i] equal to 2 may specify that the i-th attribute is frame index. Also, known_attribute_label[i] equal to 4 specifies that the i-th attribute is transparency. known_attribute_label[i] equal to 5 specifies that the i-th attribute is normals.

attribute_label_four_bytes[i] indicates the known attribute type with a 4-byte code.

According to embodiments, attribute_label_four_bytes[i] equal to 0 may indicate that the i-th attribute is color. attribute_label_four_bytes[i] equal to 1 may indicate that the i-th attribute is reflectance. attribute_label_four_bytes[i] equal to 2 may indicate that the i-th attribute is a frame index. attribute_label_four_bytes[i] equal to 4 may indicate that the i-th attribute is transparency. attribute_label_four_bytes[i] equal to 5 may indicate that the i-th attribute is normals.

log 2_max_frame_idx indicates the number of bits used to signal a syntax variable frame_idx.

axis_coding_order specifies the correspondence between the X, Y, and Z output axis labels and the three position components in the reconstructed point cloud RecPic [pointidx] [axis] with and axis=0 . . . 2.

sps_bypass_stream_enabled_flag equal to 1 specifies that the bypass coding mode may be used in reading the bitstream. As another example, sps_bypass_stream_enabled_flag equal to 0 specifies that the bypass coding mode is not used in reading the bitstream.

sps_extension_flag indicates whether the sps_extension_data syntax structure is present in the SPS syntax structure. For example, sps_extension_present_flag equal to 1 indicates that the sps_extension_data syntax structure is present in the SPS syntax structure. sps_extension_present_flag equal to 0 indicates that this syntax structure is not present.

When the value of the sps_extension_flag field is 1, the SPS according to the embodiments may further include an sps_extension_data_flag field.

sps_extension_data_flag may have any value.

FIG. 36 shows another embodiment of a syntax structure of sequency_parameter_set( ) (SPS) according to embodiments.

The SPS of FIG. 36 may further include a scalable_transmission_enable_flag field. scalable_transmission_enable_flag indicates whether a bitstream configuration is established to be suitable for scalable transmission. For example, scalable_transmission_enable_flag equal to 1 indicates that the bitstream configuration is established to be suitable for scalable transmission. That is, it may indicate that the geometry tree structure and/or attribute tree structure is composed of multiple slices, and thus information may be selected at the bitstream stage, that information about segmented (separated) slices and/or information related to direct coding (e.g., scalable layer configuration information) is transmitted through the GPS, APS, TPS, slice header, SEI message, or the like to allow the transmission device or the reception device to perform slice selection, and that geometry and/or attributes are compressed to enable partial decoding. That is, when the value of scalable_transmission_enable_flag is 1, the reception device or the transcoder of the reception device may identify that geometry and/or attribute scalable transmission is available, based on the value According to embodiments, the scalable_transmission_enable_flag field of FIG. 36 may be included in any position in the SPS of FIG. 35.

FIG. 37 shows an embodiment of a syntax structure of the GPS (geometry_parameter_set( )) according to the present disclosure. The GPS may include information on a method of encoding geometry information of point cloud data included in one or more slices.

According to embodiments, the GPS may include a gps_geom_parameter_set_id field, a gps_seq_parameter_set_id field, gps_box_present_flag field, a unique_geometry_points_flag field, a geometry_planar_mode_flag field, a geometry_angular_mode_flag field, a neighbour_context_restriction_flag field, a inferred_direct_coding_mode_enabled_flag field, a bitwise_occupancy_coding_flag field, an adjacent_child_contextualization_enabled_flag field, a log 2_neighbour_avail_boundary field, a log 2_intra_pred_max_node_size field, a log 2_trisoup_node_size field, a geom_scaling_enabled_flag field, a gps_implicit_geom_partition_flag field, and a gps_extension_flag field.

The gps_geom_parameter_set_id field provides an identifier for the GPS for reference by other syntax elements.

The gps_seq_parameter_set_id field specifies the value of sps_seq_parameter_set_id for the active SPS.

The gps_box_present_flag field specifies whether additional bounding box information is provided in a geometry slice header that references the current GPS. For example, the gps_box_present_flag field equal to 1 may specify that additional bounding box information is provided in a geometry slice header that references the current GPS. Accordingly, when the gps_box_present_flag field is equal to 1, the GPS may further include a gps_gsh_box_log 2_scale_present_flag field.

The gps_gsh_box_log 2_scale_present_flag field specifies whether the gps_gsh_box_log 2_scale field is signaled in each geometry slice header that references the current GPS. For example, the gps_gsh_box_log 2_scale_present_flag field equal to 1 may specify that the gps_gsh_box_log 2_scale field is signaled in each geometry slice header that references the current GPS. As another example, the gps_gsh_box_log 2_scale_present_flag field equal to 0 may specify that the gps_gsh_box_log 2_scale field is not signaled in each geometry slice header and a common scale for all slices is signaled in the gps_gsh_box_log 2_scale field of the current GPS.

When the gps_gsh_box_log 2_scale_present_flag field is equal to 0, the GPS may further include a gps_gsh_box_log 2_scale field.

The gps_gsh_box_log 2_scale field indicates the common scale factor of the bounding box origin for all slices that refer to the current GPS.

unique_geometry_points_flag indicates whether all output points have unique positions in one slice in all slices currently referring to GPS. For example, unique_geometry_points_flag equal to 1 indicates that in all slices that refer to the current GPS, all output points have unique positions within a slice. unique_geometry_points_flag field equal to 0 indicates that in all slices that refer to the current GPS, the two or more of the output points may have same positions within a slice.

The geometry_planar_mode_flag field indicates whether the planar coding mode is activated. For example, geometry_planar_mode_flag equal to 1 indicates that the planar coding mode is active. geometry_planar_mode_flag equal to 0 indicates that the planar coding mode is not active.

When the value of the geometry_planar_mode_flag field is 1, that is, TRUE, the GPS may further include a geom_planar_mode_th_idcm field, a geom_planar_mode_th[1] field, and a geom_planar_mode_th[2] field.

The geom_planar_mode_th_idcm field may specify the value of the threshold of activation for the direct coding mode.

geom_planar_mode_th[i] specifies, for i in the range of 0 . . . 2, specifies the value of the threshold of activation for planar coding mode along the i-th most probable direction for the planar coding mode to be efficient.

geometry_angular_mode_flag indicates whether the angular coding mode is active. For example, geometry_angular_mode_flag field equal to 1 may indicate that the angular coding mode is active. geometry_angular_mode_flag field equal to 0 may indicate that the angular coding mode is not active.

When the value of the geometry_angular_mode_flag field is 1, that is, TRUE, the GPS may further include an lidar_head_position[0] field, a lidar_head_position[1] field, a lidar_head_position[2] field, a number_lasers field, a planar_buffer_disabled field, an implicit_qtbt_angular_max_node_min_dim_log 2_to_split_z field, and an implicit_qtbt_angular_max_diff to_split_z field.

The lidar_head_position [0] field, lidar_head_position [1] field, and lidar_head_position[2] field may specify the (X, Y, Z) coordinates of the lidar head in the coordinate system with the internal axes.

number_lasers specifies the number of lasers used for the angular coding mode.

The GPS according to the embodiments includes an iteration statement that is repeated as many times as the value of the number_lasers field. In an embodiment, i is initialized to 0, and is incremented by 1 each time the iteration statement is executed. The iteration statement is repeated until the value of i reaches the value of the number_lasers field. This iteration statement may include a laser_angle[i] field and a laser_correction[i] field.

laser_angle[i] specifies the tangent of the elevation angle of the i-th laser relative to the horizontal plane defined by the 0-th and the 1st internal axes.

laser_correction[i] specifies the correction, along the second internal axis, of the i-th laser position relative to the lidar_head_position[2].

planar_buffer_disabled equal to 1 indicates that tracking the closest nodes using a buffer is not used in process of coding the planar mode flag and the plane position in the planar mode. planar_buffer_disabled equal to 0 indicates that tracking the closest nodes using a buffer is used.

implicit_qtbt_angular_max_node_min_dim_log 2_to_split_z specifies the log 2 value of a node size below which horizontal split of nodes is preferred over vertical split.

implicit_qtbt_angular_max_diff to_split_z specifies the log 2 value of the maximum vertical over horizontal node size ratio allowed to a node.

neighbour_context_restriction_flag equal to 0 indicates that geometry node occupancy of the current node is coded with the contexts determined from neighbouring nodes which is located inside the parent node of the current node.

neighbour_context_restriction_flag equal to 1 indicates that geometry node occupancy of the current node is coded with the contexts determined from neighbouring nodes which is located inside or outside the parent node of the current node.

The inferred_direct_coding_mode_enabled_flag field indicates whether the direct_mode_flag field is present in the geometry node syntax. For example, the inferred_direct_coding_mode_enabled_flag field equal to 1 indicates that the direct_mode_flag field may be present in the geometry node syntax. For example, the inferred_direct_coding_mode_enabled_flag field equal to 0 indicates that the direct_mode_flag field is not present in the geometry node syntax.

The bitwise_occupancy_coding_flag field indicates whether geometry node occupancy is encoded using bitwise contextualization of the syntax element occupancy map. For example, the bitwise_occupancy_coding_flag field equal to 1 indicates that geometry node occupancy is encoded using bitwise contextualisation of the syntax element occupancy_map. For example, the bitwise_occupancy_coding_flag field equal to 0 indicates that geometry node occupancy is encoded using the dictionary encoded syntax element occupancy_byte.

The adjacent_child_contextualization_enabled_flag field indicates whether the adjacent children of neighboring octree nodes are used for bitwise occupancy contextualization. For example, the adjacent_child_contextualization_enabled_flag field equal to 1 indicates that the adjacent children of neighboring octree nodes are used for bitwise occupancy contextualization. For example, adjacent_child_contextualization_enabled_flag equal to 0 indicates that the children of neighbouring octree nodes are not used for the occupancy contextualization.

The log 2_neighbour_avail_boundary field specifies the value of the variable NeighbAvailBoundary that is used in the decoding process. For example, when the neighbour_context_restriction_flag field is equal to 1, NeighbAvailabilityMask may be set equal to 1. For example, when the neighbour_context_restriction_flag field is equal to 0, NeighbAvailabilityMask may be set equal to 1<<log 2_neighbour_avail_boundary.

The log 2=mtra_pred_max_node_size field specifies the octree node size eligible for occupancy intra prediction.

The log 2_trisoup_node_size field specifies the variable TrisoupNodeSize as the size of the triangle nodes.

geom_scaling_enabled_flag indicates specifies whether a scaling process for geometry positions is applied during the geometry slice decoding process. For example, geom_scaling_enabled_flag equal to 1 specifies that a scaling process for geometry positions is applied during the geometry slice decoding process. geom_scaling_enabled_flag equal to 0 specifies that geometry positions do not require scaling.

geom_base_qp indicates the base value of the geometry position quantization parameter.

gps_implicit_geom_partition_flag indicates whether the implicit geometry partition is enabled for the sequence or slice. For example, equal to 1 specifies that the implicit geometry partition is enabled for the sequence or slice. gps_implicit_geom_partition_flag equal to 0 specifies that the implicit geometry partition is disabled for the sequence or slice. When gps_implicit_geom_partition_flag is equal to 1, the following two fields, that is, a gps_max_num_implicit_qtbt_before_ot field and a gps_min_size_implicit_qtbt field, are signaled.

gps_max_num_implicit_qtbt_before_ot specifies the maximal number of implicit QT and BT partitions before OT partitions. Then, the variable K is initialized by gps_max_num_implicit_qtbt_before_ot as follows.

K=gps_max_num_implicit_qtbt_before_ot.

gps_min_size_implicit_qtbt specifies the minimal size of implicit QT and BT partitions. Then, the variable M is initialized by gps_min_size_implicit_qtbt as follows.

M=gps_min_size_implicit_qtbt gps_extension_flag indicates whether a gps_extension_data syntax structure is present in the GPS syntax structure. For example, gps_extension_flag equal to 1 indicates that the gps_extension_data syntax structure is present in the GPS syntax. For example, gps_extension_flag equal to 0 indicates that the gps_extension_data syntax structure is not present in the GPS syntax.

When gps_extension_flag is equal to 1, the GPS according to the embodiments may further include a gps_extension_data_flag field.

gps_extension_data_flag may have any value. Its presence and value do not affect decoder conformance to profiles.

According to embodiments, the GPS may further include a geom_tree_type field. For example, geom_tree_type equal to 0 indicates that the position information (or geometry) is coded using an octree. geom_tree_type equal to 1 indicates that the position information (or geometry) is coded using a predictive tree.

FIG. 38 shows an embodiment of a syntax structure of a geometry parameter set (GPS) containing information about a segmented (separated) slice and/or information related to direct coding according to embodiments.

According to embodiments, when the value of the scalable_transmission_enable_flag field included in the SPS is 1, the GPS may include a geom_scalable_transmission_enable_flag field.

In one embodiment, geom_scalable_transmission_enable_flag equal to 1 indicates that the geometry is compressed to enable scalable transmission.

For example, it may indicate that the geometry is composed of octree-based layers or that slice partitioning (see FIG. 24, etc.) is performed in consideration of scalable transmission.

For example, geom_scalable_transmission_enable_flag equal to 1 may indicate that octree-based geometry coding is used, and QTBT is disabled, or the geometry is coded in a form such as an octree by performing coding in order of BT (Binary-tree)-QT (Quad-tree)-OT (Octree).

When geom_scalable_transmission_enable_flag is equal to 1, the GPS may further include a num_scalable_layer field.

num_scalable_layers may indicate the number of layers supporting scalable transmission. A layer according to the embodiments may mean an LOD.

According to embodiments, the GPS includes a loop iterated as many times as the value of the num_scalable_layers field. In an embodiment, i is initialized to 0, and is incremented by 1 each time the loop is executed. The loop is iterated until the value of i reaches the value of the num_scalable_layers field. The loop may include a scalable_layer_id[i] field and a num_slices_in_scalable_layerlil field.

The scalable_layer_id[i] field may specify an identifier of the i-th scalable layer. That is, it specifies an indicator of a scalable layer constituting scalable transmission. According to embodiments, when a scalable layer is composed of multiple slices, common information may be transmitted through the scalable_layer_id field in a parameter set, and other individual information may be transmitted through a data unit header according to slices.

According to embodiments, when geom_tree_type is equal to 0, that is, when position information (i.e., geometry) is coded using an octree, the GPS may further include a num_octree_layers_in_scalable_layer[i] field, a tree_depth_start[i] field, a tree_depth_end[i] field, a node_size[i] field, and a num_nodes[i] field.

num_octree_layers_in_scalable_layer[i] may indicate the number of octree layers included in or corresponding to the i-th scalable layer constituting scalable transmission. When the scalable layer is not configured based on the octree, num_octree_layers_in_scalable_layer[i] may refer to a corresponding layer.

tree_depth_start[i] may indicate a starting octree depth (relatively closest to the root) among the octree layers included in or corresponding to the i-th scalable layer constituting scalable transmission.

tree_depth_end[i] may indicate the last octree depth (relatively closest to the leaf) among the octree layers included in or corresponding to the i-th scalable layer constituting scalable transmission.

node_size[i] may indicate the node size of the output point cloud data when the i-th scalable layer is reconstructed through scalable transmission. For example, node_size[i] equal to 1 may indicate the leaf node. Although the embodiments assume that the XYZ node size is constant, any node size may be indicated by signaling the size in the XYZ direction or each direction in transformation coordinates such as (r (radius), phi, theta).

num_slices_in_scalable_layer[i] may indicate the number of slices belonging to the i-th scalable layer.

According to embodiments, the GPS may include a loop that is iterated as many times as the value of the num_slices_in_scalable_layer[i] field. In an embodiment, j is initialized to 0, and is incremented by 1 each time the loop is executed. The loop is iterated until the value of j reaches the value of the num_slices_in_scalable_layer[i] field. The loop may include a sub_group_id[i][j] field, a num_nodes_in_subgroup[i][j] field, a bitstream_type[i][j] field, and a slice_id[i][j] field.

The sub_group_id[i][j] field specifies an identifier of a subgroup included in the j-th slice belonging to the i-th scalable layer. That is, the sub_group_id[i][j] field specifies an indicator of a subgroup in the layer group indicated by the layer_group_id field. The range of subgroup_id is 0 to num_subgroups_minus1[layer_group_id], where subgroup_id indicates the order of slices in the same layer_group_id.

num_nodes_in_subgroup[i][j] indicates the number of nodes related to the j-th slice belonging to the i-th scalable layer. That is, num_nodes_in_subgroup[i][j] indicates the number of nodes included in the geometry data unit. According to embodiments, the sum of all num_nodes in a geometry data unit specifies the total number of nodes in the geometry data unit.

bitstream_type[i][j] indicates the type of a bitstream included in the j-th slice belonging to the i-th scalable layer. According to embodiments, bitstream_type may indicate the type of a bitstream included in a slice. bitstream_type equal to 0 may indicate that the bitstream is an arithmetic entropy coding (AEC) bitstream. bitstream_type equal to 1 may indicate that the bitstream is a direct coding (DC) bitstream. bitstream_type equal to 2 may indicate that both an AEC bitstream and a DC bitstream are present in the slice.

slice_id[i][j] specifies an identifier for identifying the j-th slice belonging to the i-th scalable layer. That is, slice_id[i][j] may specify an indicator for distinguishing a slice or a data unit, and may deliver an indicator for a data unit (or referred to as a slice) belonging to a slice layer.

According to embodiments, the information on the segmented (separated) slices and/or information related to direct coding of FIG. 38 may be included in any position in the GPS of FIG. 37.

FIG. 39 shows an embodiment of a syntax structure of the attribute parameter set (APS) (attribute_parameter_set( )) according to the present disclosure. The APS according to the embodiments may contain information on a method of encoding attribute information about point cloud data contained in one or more slices.

The APS according to the embodiments may include an aps_attr_parameter_set_id field, an aps_seq_parameter_set_id field, an attr_coding_type field, an aps_attr_initial_qp field, an aps_attr_chroma_qp_offset field, an aps_slice_qp_delta_present_flag field, and an aps_extension_flag field.

The aps_attr_parameter_set_id field provides an identifier for the APS for reference by other syntax elements.

The aps_seq_parameter_set_id field specifies the value of sps_seq_parameter_set_id for the active SPS.

The attr_coding_type field indicates the coding type for the attribute.

According to embodiments, the attr_coding_type field equal to 0 may indicate predicting weight lifting as the coding type. The attr_coding_type field equal to 1 may indicate RAHT as the coding type. The attr_coding_type field equal to 2 may indicate fix weight lifting.

The aps_attr_initial_qp field specifies the initial value of the variable SliceQp for each slice referring to the APS.

The aps_attr_chroma_qp_offset field specifies the offsets to the initial quantization parameter signaled by the syntax aps_attr_initial_qp.

The aps_slice_qp_delta_present_flag field specifies whether the ash_attr_qp_delta_luma and ash_attr_qp_delta_chroma syntax elements are present in the attribute slice header (ASH). For example, the aps_slice_qp_delta_present_flag field equal to 1 specifies that the ash_attr_qp_delta_luma and ash_attr_qp_delta_chroma syntax elements are present in the ASH. For example, the aps_slice_qp_delta_present_flag field specifies that the ash_attr_qp_delta_luma and ash_attr_qp_delta_chroma syntax elements are not present in the ASH.

When the value of the attr_coding_type field is 0 or 2, that is, the coding type is predicting weight lifting or fix weight lifting, the APS according to the embodiments may further include a lifting_num_pred_nearest_neighbours_minus1 field, a lifting_search_range_minus1 field, and a lifting_neighbour_bias[k] field.

lifting_num_pred_nearest_neighbours plus 1 specifies the maximum number of nearest neighbors to be used for prediction. According to embodiments, the value of NumPredNearestNeighbours is set equal to lifting_num_pred_nearest_neighbours.

lifting_search_range_minus1 plus 1 specifies the search range used to determine nearest neighbours to be used for prediction and to build distance-based levels of detail (LODs). The variable LiftingSearchRange for specifying the search range may be obtained by adding 1 to the value of the lifting_search_range_minus1 field (LiftingSearchRange=lifting_search_range_minus1+1).

The lifting_neighbour_bias[k] field specifies a bias used to weight the k-th components in the calculation of the Euclidean distance between two points as part of the nearest neighbor derivation process.

When the value of the attr_coding_type field is 2, that is, when the coding type indicates fix weight lifting, the APS according to the embodiments may further include a lifting_scalability_enabled_flag field.

The lifting_scalability_enabled_flag field specifies whether the attribute decoding process allows the pruned octree decode result for the input geometry points. For example, the lifting_scalability_enabled_flag field equal to 1 specifies that the attribute decoding process allows the pruned octree decode result for the input geometry points. The lifting_scalability_enabled_flag field equal to 0 specifies that that the attribute decoding process requires the complete octree decode result for the input geometry points.

According to embodiments, when the value of the lifting_scalability_enabled_flag field is FALSE, the APS may further include a lifting_num_detail_levels_minus1 field.

The lifting_num_detail_levels_minus1 field specifies the number of levels of detail for the attribute coding. The variable LevelDetailCount for specifying the number of LODs may be obtained by adding 1 to the value of the lifting_num_detail_levels_minus1 field. (LevelDetailCount=lifting_num_detail_levels_minus1+1).

According to embodiments, when the value of the lifting_num_detail_levels_minus1 field is greater than 1, the APS may further include a lifting_lod_regular_sampling_enabled_flag field.

The lifting_lod_regular_sampling_enabled_flag field specifies whether levels of detail (LODs) are built by a regular sampling strategy. For example, the lifting_lod_regular_sampling_enabled_flag equal to 1 specifies that levels of detail (LOD) are built by using a regular sampling strategy. The lifting_lod_regular_sampling_enabled_flag equal to 0 specifies that a distance-based sampling strategy is used instead.

According to embodiments, when the value of the lifting_scalability_enabled_flag field is FALSE, the APS may further include an iteration statement iterated as many times as the value of the lifting_num_detail_levels_minus1 field. In an embodiment, the index (idx) is initialized to 0 and incremented by 1 every time the iteration statement is executed, and the iteration statement is iterated until the index (idx) is greater than the value of the lifting_num_detail_levels_minus1 field. This iteration statement may include a lifting_sampling_period_minus2 [idx] field when the value of the lifting_lod_decimation_enabled_flag field is TRUE (e.g., 1), and may include a lifting_sampling_distance_squared_scale_minus1 [idx] field when the value of the lifting_lod_regular_sampling_enabled_flag field is FALSE (e.g., 0). Also, when the value of idx is not 0 (idx !=0), a lifting_sampling_distance_squared_offset [idx] field may be further included.

lifting_sampling_period_minus2 [idx] plus 2 specifies the sampling period for the level of detail idx.

lifting_sampling_distance_squared_scale_minus1 [idx] plus 1 specifies the scale factor for the derivation of the square of the sampling distance for the level of detail idx.

The lifting_sampling_distance_squared_offset [idx] field specifies the offset of the derivation of the square of the sampling distance for the level of detail idx.

When the value of the attr_coding_type field is 0, that is, when the coding type is predicting weight lifting, the APS according to the embodiments may further include a lifting_adaptive_prediction_threshold field, a lifting_intra_lod_prediction_num_layers field, a lifting_max_num_direct_predictors field, and an inter_component_prediction_enabled_flag field.

The lifting_adaptive_prediction_threshold field specifies the threshold to enable adaptive prediction. According to embodiments, a variable AdaptivePredictionThreshold for specifying a threshold for switching an adaptive predictor selection mode is set equal to the value of the lifting_adaptive_prediction_threshold field (AdaptivePredictionThreshold=lifting_adaptive_prediction_threshold).

The lifting_intra_lod_prediction_num_layers field specifies the number of LOD layers where decoded points in the same LOD layer could be referred to generate a prediction value of a target point. For example, the lifting_intra_lod_prediction_num_layers field equal to LevelDetailCount indicates that target point could refer to decoded points in the same LOD layer for all LOD layers. For example, the lifting_intra_lod_prediction_num_layers field equal to 0 indicates that target point could not refer to decoded points in the same LoD layer for any LoD layers. The lifting_max_num_direct_predictors field specifies the maximum number of predictors to be used for direct prediction. The value of the lifting_max_num_direct_predictors field shall be in the range of 0 to LevelDetailCount.

The inter_component_prediction_enabled_flag field specifies whether the primary component of a multi component attribute is used to predict the reconstructed value of non-primary components. For example, if the inter_component_prediction_enabled_flag field equal to 1 specifies that the primary component of a multi component attribute is used to predict the reconstructed value of non-primary components. The inter_component_prediction_enabled_flag field equal to 0 specifies that all attribute components are reconstructed independently.

According to the embodiments, when the value of the attr_coding_type field is 1, that is, when the attribute coding type is RAHT, the APS may further include a raht_prediction_enabled_flag field.

The raht_prediction_enabled_flag field specifies whether the transform weight prediction from the neighbor points is enabled in the RAHT decoding process. For example, the raht_prediction_enabled_flag field equal to 1 specifies the transform weight prediction from the neighbor points is enabled in the RAHT decoding process. raht_prediction_enabled_flag equal to 0 specifies that the transform weight prediction is disabled in the RAHT decoding process.

According to embodiments, when the value of the raht_prediction_enabled_flag field is TRUE, the APS may further include a raht_prediction_threshold0 field and a raht_prediction_threshold1 field.

The raht_prediction_threshold0 field specifies a threshold to terminate the transform weight prediction from neighbour points.

The raht_prediction_threshold1 field specifies a threshold to skip the transform weight prediction from neighbour points.

The aps_extension_flag field specifies whether the aps_extension_data_flag syntax structure is present in the APS syntax structure. For example, aps_extension_flag equal to 1 indicates that the aps_extension_data syntax structure is present in the APS syntax structure. For example, aps_extension_flag equal to 0 indicates that the aps_extension_data syntax structure is not present in the APS syntax structure.

When the value of the aps_extension_flag field is 1, the APS according to the embodiments may further include an aps_extension_data_flag field.

The aps_extension_data_flag field may have any value. Its presence and value do not affect decoder conformance to profiles.

The APS according to the embodiments may further include information related to LoD-based attribute compression.

FIG. 40 shows an embodiment of a syntax structure of attribute_parameter_set( ) (APS) containing information about a segmented (separated) slice and/or information related to direct coding according to embodiments.

According to embodiments, when the value of the scalable_transmission_enable_flag field included in the SPS is 1, the APS may include an attr_scalable_transmission_enable_flag field.

In one embodiment, attr_scalable_transmission_enable_flag equal to 1 indicates that the attribute is compressed to enable scalable transmission. For example, attr_scalable_transmission_enable_flag equal to 1 may indicate that predi-lifting coding or scalable RAHS (e.g., Haar-based RAHT) is performed using scalable LOD generation.

When the value of the attr_scalable_transmission_enable_flag field is 1, the APS may further include an aligned_slice_structure_enabled_flag field.

aligned_slice_structure_enabled_flag equal to 1 may indicate that the attribute scalable layer structure and/or slice configuration match the geometry scalable layer structure and/or slice configuration. In this case, information on the attribute scalable layer structure and/or slice configuration may be identified from information on the geometry scalable layer structure and/or slice configuration. That is, the geometry layer/slice structure is the same as the attribute layer/slice structure.

According to embodiments, when the value of the aligned_slice_structure_enabled_flag field is 1, the APS may include a num_scalable_layers field.

num_scalable_layers may indicate the number of layers supporting scalable transmission. A layer according to the embodiments may mean an LOD.

According to embodiments, the APS includes a loop iterated as many times as the value of the num_scalable_layers field. In an embodiment, i is initialized to 0, and is incremented by 1 each time the loop is executed. The loop is iterated until the value of i reaches the value of the num_scalable_layers field. The loop may include a num_slices_in_scalable_layerlil field.

num_slices_in_scalable_layerlil may indicate the number of slices belonging to the i-th scalable layer.

According to embodiments, the APS may include a loop that is iterated as many times as the value of the num_slices_in_scalable_layerlil field. In an embodiment, j is initialized to 0, and is incremented by 1 each time the loop is executed. The loop is iterated until the value of j reaches the value of the num_slices_in_scalable_layerlil field. The loop may include a slice_id_offsets[i][j] field.

The slice_id_offsets[i][j] field indicates the offset of the j-th slice belonging to the i-th scalable layer. That is, it may indicate an offset for obtaining an attribute slice or data unit based on a geometry slice id. According to embodiments, when aligned_slice_structure_enabled_flag is equal to 1, that is, when the attribute slice structure matches the geometry slice structure, the attribute slice id may be obtained based on the geometry slice id as follows.

Slice_id(attr)=slice_id(geom)+slice_id_offset

In this case, values provided in the geometry parameter set may be used for variables for configuring the attribute slice structure, for example, a num_scalable_layers field, a scalable_layer_id field, a tree_depth_start field, a tree_depth_end field, a node_size field, a num_nodes field, and a num_slices_in_scalable_layer field.

According to embodiments, when aligned_slice_structure_enabled_flag is equal to 0, that is, when the attribute slice structure does not match the geometry slice structure, the APS may include the num_scalable_layers field.

num_scalable_layers may indicate the number of layers supporting scalable transmission.

According to embodiments, the APS includes a loop iterated as many times as the value of the num_scalable_layers field. In an embodiment, i is initialized to 0, and is incremented by 1 each time the loop is executed. The loop is iterated until the value of i reaches the value of the num_scalable_layers field. The loop may include a num_slices_in_scalable_layer[i] field. The loop may further include a scalable_layer_id[i] field, a corresponding_geom_scalable_layer[i] field, a num_octree_layers=m_scalable_layer[i] field, a tree_depth_start[i] field, a tree_depth_end[i] field, a node_size[i] field, a num_nodes[i] field, and a num_slices_in_scalable_layer[i] field.

scalable_layer_id[i] may specify an identifier of the i-th scalable layer. That is, it specifies an indicator of a scalable layer constituting scalable transmission. According to embodiments, when a scalable layer is composed of multiple slices, common information may be transmitted through the scalable_layer_id field in a parameter set, and other individual information may be transmitted through a data unit header according to slices.

corresponding_geom_scalable_layer[i] may indicate a geometry scalable layer corresponding to an attribute scalable layer structure in relation to the i-th scalable layer.

num_octree_layers_in_scalable_layer[i] may indicate a tree depth including nodes belonging to a data unit (or slice) in relation to the i-th scalable layer.

tree_depth_start[i] may indicate a starting octree depth (relatively closest to the root) among the octree layers included in or corresponding to the i-th scalable layer constituting scalable transmission. tree_depth_end[i] may indicate the last octree depth (relatively closest to the leaf) among the octree layers included in or corresponding to the i-th scalable layer constituting scalable transmission.

node_size[i] may indicate the node size of the output point cloud data when the i-th scalable layer is reconstructed through scalable transmission. For example, node_size[i] equal to 1 may indicate the leaf node. Although the embodiments assume that the XYZ node size is constant, any node size may be indicated by signaling the size in the XYZ direction or each direction in transformation coordinates such as (r (radius), phi, theta).

num_nodes[i] may indicate the number of nodes belonging to tree_depth among the nodes belonging to the corresponding data unit (or slice).

num_slices_in_scalable_layer[i] may indicate the number of slices belonging to the i-th scalable layer.

According to embodiments, the APS may include a loop that is iterated as many times as the value of the num_slices_in_scalable_layer[i] field. In an embodiment, j is initialized to 0, and is incremented by 1 each time the loop is executed. The loop is iterated until the value of j reaches the value of the num_slices_in_scalable_layer[i] field. The loop may include a slice_id[i][j] field.

slice_id[i][j] specifies an identifier for identifying the j-th slice belonging to the i-th scalable layer. That is, slice_id[i][j] may specify an indicator for distinguishing a slice or a data unit, and may deliver an indicator for a data unit (or referred to as a slice) belonging to a slice layer.

According to embodiments, the information on segmented (separated) slices and/or information related to direct coding in FIG. 40 may be included at any position in the APS of FIG. 39.

FIG. 41 is a diagram illustrating an embodiment of a syntax structure of a geometry slice bitstream( ) according to the present disclosure.

A geometry slice bitstream (geometry_slice_bitstream ( )) according to embodiments may include a geometry slice header (geometry_slice_header( )) and geometry slice data (geometry_slice_data( )). According to embodiments, the geometry slice bitstream is also referred to as a geometry data unit, the geometry slice header is also referred to as a geometry data unit header, and the geometry slice data is also referred to as geometry data unit data.

FIG. 42 shows an embodiment of a syntax structure of a geometry slice header (geometry_slice_header( )) according to the present disclosure.

A bitstream transmitted by the transmission device (or a bitstream received by the reception device) according to the embodiments may contain one or more slices. Each slice may include a geometry slice and an attribute slice. The geometry slice includes a geometry slice header (GSH). The attribute slice includes an attribute slice header (ASH).

The geometry slice header (geometry_slice_header( )) according to the embodiments may include a gsh_geometry_parameter_set_id field, a gsh_tile_id field, gsh_slice_id field, a frame_idx field, a gsh_num_points field, and a byte_alignment( )) field.

When the value of the gps_box_present_flag field included in the GPS is TRUE (e.g., 1), and the value of the gps_gsh_box_log 2_scale_present_flag field is TRUE (e.g., 1), the geometry slice header (geometry_slice_header( )) according to the embodiments may further include a gsh_box_log 2_scale field, a gsh_box_origin_x field, a gsh_box_origin_y field, and a gsh_box_origin_z field.

gsh_geometry_parameter_set_id specifies the value of the gps_geom_parameter_set_id of the active GPS.

The gsh_tile_id field specifies the value of the tile id that is referenced by the GSH.

The gsh_slice_id field specifies ID of the slice for reference by other syntax elements.

The frame_idx field indicates log 2_max_frame_idx+1 least significant bits of a conceptual frame number counter. Consecutive slices with differing values of frame_idx form parts of different output point cloud frames. Consecutive slices with identical values of frame_idx without an intervening frame boundary marker data unit form parts of the same output point cloud frame.

The gsh_num_points field indicates the maximum number of coded points in a slice. According to embodiments, it is a requirement of bitstream conformance that gsh_num_points is greater than or equal to the number of decoded points in the slice.

The gsh_box_log 2_scale field specifies the scaling factor of the bounding box origin for the slice.

The gsh_box_origin_x field specifies the x value of the bounding box origin scaled by the value of the gsh_box_log 2_scale field.

The gsh_box_origin_y field specifies the y value of the bounding box origin scaled by the value of the gsh_box_log 2_scale field.

The gsh_box_origin_z field specifies the z value of the bounding box origin scaled by the value of the gsh_box_log 2_scale field.

Here, the variables slice_origin_x, slice_origin_y, and slice_origin_z may be derived as follows.

When gps_gsh_box_log 2_scale_present_flag is equal to 0, originScale is set to gsh_box_log 2_scale.

When gps_gsh_box_log 2_scale_present_flag is equal to 1, originScale is set to gps_gsh_box_log 2_scale.

When gps_box_present_flag is equal to 0, the values of the variables slice_origin_x, slice_origin_y, and slice_origin_z are inferred to be 0.

When gps_box_present_flag is equal to 1, the following equations will be applied to the variables slice_origin_x, slice_origin_y, and slice_origin_z.

slice_origin_x=gsh_box_origin_x<<originScale slice_origin_y=gsh_box_origin_y<<originScale slice_origin_z=gsh_box_origin_z<<originScale When the value of the gps_implicit_geom_partition_flag field is TRUE (i.e., 0), the geometry slice header ((geometry_slice_header( )) may further include a gsh_log 2_max_nodesize_x field, a gsh_log 2_max_nodesize_y_minus_x field, and a gsh_log 2_max_nodesize_z_minus_y field. When the value of the gps_implicit_geom_partition_flag field is FALSE (i.e., 1), the geometry slice header may further include a gsh_log 2_max_nodesize field.

The gsh_log 2_max_nodesize_x field specifies the bounding box size in the x dimension, i.e., MaxNodesizeXLog 2 that is used in the decoding process as follows.

MaxNodeSizeXLog2=gsh_log 2_max_nodesize_x

MaxNodeSizeX=1<<MaxNodeSizeXLog 2

The gsh_log 2_max_nodesize_y_minus_x field specifies the bounding box size in the y dimension, i.e., MaxNodesizeYLog 2 that is used in the decoding process as follows.

MaxNodeSizeYLog2=gsh_log 2_max_nodesize_y_minus_x MaxNodeSizeXLog 2.

MaxNodeSizeY=1<<MaxNodeSizeYLog 2.

The gsh_log 2_max_nodesize_z_minus_y field specifies the bounding box size in the z dimension, i.e., MaxNodesizeZLog 2 that is used in the decoding process as follows.

MaxNodeSizeZLog2=gsh_log 2_max_nodesize_z_minus_y MaxNodeSizeYLog 2

MaxNodeSizeZ=1<<MaxNodeSizeZLog 2

When the value of the gps_implicit_geom_partition_flag field is 1, gsh_log 2_max_nodesize is obtained as follows.

gsh_log 2_max_nodesize=max{MaxNodeS izeXLog 2, MaxNodeSizeYLog 2, MaxNodeSizeZLog 2}

The gsh_log 2_max_nodesize field specifies the size of the root geometry octree node when gps_implicit_geom_partition_flag is equal to 0.

Here, the variables MaxNodeSize and MaxGeometryOctreeDepth are derived as follows.

MaxNodeSize=1<<gsh_log 2_max_nodesize

MaxGeometryOctreeDepth=gsh_log 2_max_nodesize-log 2_trisoup_node_size

When the value of the geom_scaling_enabled_flag field is TRUE, the geometry slice header (geometry_slice_header( )) according to the embodiments may further include a geom_slice_qp_offset field and a geom_octree_qp_offsets_enabled_flag field.

The geom_slice_qp_offset field specifies an offset to the base geometry quantization parameter geom_base_qp.

The geom_octree_qp_offsets_enabled_flag field specifies whether the geom_octree_qp_ofsets_depth field is present in the geometry slice header. For example, geom_octree_qp_offsets_enabled_flag equal to 1 specifies that the geom_octree_qp_ofsets_depth field is present in the geometry slice header. geom_octree_qp_offsets_enabled_flag equal to 0 specifies that the geom_octree_qp_ofsets_depth field is not present.

The geom_octree_qp_offsets_depth field specifies the depth of the geometry octree.

FIG. 43 shows an embodiment of a syntax structure of a geometry data unit header (or referred to as a geometry slice header) for information on segmented (separated) slices and/or information related to direct coding according to embodiments.

The geometry data unit header according to the embodiments may include a slice_id field and a bitstream_type field.

slice_id specifies an identifier for identifying a data unit (i.e., a slice). That is, slice_id specifies an indicator for distinguishing a slice or a data unit, and may deliver an indicator for a data unit (or called a slice) belonging to a slice layer.

bitstream_type indicates the type of a bitstream included in a slice. According to embodiments, bitstream_type may indicate the type of a bitstream included in the slice. bitstream_type equal to 0 may indicate that the bitstream is an arithmetic entropy coding (AEC) bitstream. bitstream_type equal to 1 may indicate that the bitstream is a direct coding (DC) bitstream. bitstream_type equal to 2 may indicate that an AEC bitstream and a DC bitstream are present together in the slice.

According to embodiments, when geom_scalable_transmission_enable_flag is equal to 1, the geometry data unit header may further include a scalable_layer_id field, a num_tree_depth_in_data_unit field, and a bitstream_type field.

scalable_layer_id may specify an identifier of a scalable layer related to a data unit (i.e., slice). That is, it specifies an indicator for a scalable layer constituting scalable transmission. According to embodiments, when a scalable layer is composed of multiple slices, common information may be carried in the scalable_layer_id field in a parameter set, and other individual information may be carried in the data unit header of FIG. 43 according to slices.

When multiple subgroups are present in the scalable layer corresponding to scalable_layer_id, the geometry data unit header may further include a sub_group_id field.

sub_group_id specifies an identifier of a subgroup belonging to the scalable layer specified by scalable_layer_id. That is, sub_group_id specifies an indicator of a subgroup in the layer group indicated by layer_group_id. The range of subgroup_id is 0 to num_subgroups_minus1 [layer_group_id], wherein subgroup_id indicates the order of slices in the same layer_group_id.

num_tree_depth_in_data_unit may indicate the number of tree depths including nodes belonging to a data unit (i.e., a slice).

According to embodiments, the geometry data unit header includes a loop iterated as many times as the value of num_tree_depth_in_data_unit. In an embodiment, i is initialized to 0, and is incremented by 1 each time the loop is executed. The loop is iterated until the value of i reaches the value of num_tree_depth_in_data_unit. This loop may include a tree_depth[i] field, a num_nodes field, and a num_nodes_in_subgroup1[i][sub_group_id] field.

tree_depth[i] may indicate the i-th tree depth. That is, tree_depth may indicate a tree depth.

num_nodes[i] may indicate the number of nodes included in the i-th tree depth. That is, num_nodes[i] may indicate the number of nodes belonging to the i-th tree depth (tree_depth) among the nodes belonging to a data unit.

num_nodes_in_subgroup[i][sub_group_id] indicates the number of nodes related to a data unit (i.e., a slice). That is, num_nodes_in_subgroup[i] indicates the number of nodes included in a subgroup indicated by sub_group=id. According to embodiments, the sum of all num_nodes in a geometry data unit specifies the total number of nodes in the geometry data unit.

According to embodiments, when bitstream_type is equal to 2, that is, an AEC bitstream and a DC bitstream are present together in the slice, the geometry data unit header may further include a dc_bitstream_offset field, a dc_bitstream_length field, and a dc_backward_enabled_flag field.

According to embodiments, dc_bitstream_offset and dc_bitstream_length may indicate the start/end positions of the DC bitstream and the total length of the DC bitstream in the slice. That is, when bitstream_type is equal to 2, an AEC bitstream and a DC bitstream may be present together in one slice. In this case, the start/end positions of the DC bitstream and the total length of the DC bitstream may be indicated.

dc_backward_enabled_flag equal to 1 may indicate that the DC bitstream is included in reverse order in the slice including both the AEC bitstream and the DC bitstream. In this case, the end of the bitstream of the slice may be the start of the DC bitstream, and dc_bitstream_offset may be the end of the DC bitstream. dc_backward_enabled_flag equal to 0 indicates that the DC bitstream is included in the same direction as the AEC bitstream in the slice including both the AEC bitstream and the DC bitstream. In this case, it may be seen that the DC bitstream starts from dc_bitstream_offset and ends at the end of the entire bitstream (i.e., dc_bitstream_offset+dc_bitstream_length).

According to embodiments, the geometry data unit header may further include a ref_slice_id field.

The ref_slice_id field may be used to indicate a slice that must precede the current slice for decoding of the current slice (see, for example, the headers of FIGS. 19 to 21).

According to embodiments, the information on the segmented (separated) slices and/or information related to direct coding of FIG. 43 may be included at any position in the geometry slice header (i.e., the geometry data unit header) of FIG. 42.

FIG. 44 is a diagram illustrating an embodiment of a syntax structure of geometry slice data (geometry_slice_data( )) according to the present disclosure. The geometry slice data (geometry_slice_data( )) according to embodiments may transmit a geometry bitstream belonging to a corresponding slice (or data unit).

The geometry_slice_data( ) according to the embodiments may include a first iteration statement repeated as many times as by the value of MaxGeometryOctreeDepth. In an embodiment, the depth is initialized to 0 and is incremented by 1 each time the iteration statement is executed, and the first iteration statement is repeated until the depth becomes equal to MaxGeometryOctreeDepth. The first iteration statement may include a second loop statement repeated as many times as the value of NumNodesAtDepth. In an embodiment, nodeidx is initialized to 0 and is incremented by 1 each time the iteration statement is executed. The second iteration statement is repeated until nodeidx becomes equal to NumNodesAtDepth. The second iteration statement may include xN=NodeX[depth][nodeIdx], yN=NodeY[depth][nodeIdx], zN=NodeZ[depth] [nodeIdx], and geometry_node(depth, nodeIdx, xN, yN, zN). MaxGeometryOctreeDepth indicates the maximum value of the geometry octree depth, and NumNodesAtDepth[depth] indicates the number of nodes to be decoded at the corresponding depth. The variables NodeX[depth][nodeIdx], NodeY [depth][nodeIdx], and NodeZ[depth] [nodeIdx] indicate the x, y, z coordinates of the idx-th node in decoding order at a given depth. The geometry bitstream of the node of the depth is transmitted through geometry_node(depth, nodeIdx, xN, yN, zN).

The geometry slice data (geometry_slice_data( ) according to the embodiments may further include geometry_trisoup_data( ) when the value of the log 2_trisoup_node_size field is greater than 0. That is, when the size of the triangle nodes is greater than 0, a geometry bitstream subjected to trisoup geometry encoding is transmitted through geometry_trisoup_data( ).

FIG. 45 shows an embodiment of a syntax structure of attribute_slice_bitstream( ) according to the present disclosure.

The attribute slice bitstream (attribute_slice_bitstream ( )) according to the embodiments may include an attribute slice header (attribute_slice_header( )) and attribute slice data (attribute_slice_data( )). According to the embodiments, the attribute slice bitstream may be referred to as an attribute data unit, the attribute slice header may be referred to as an attribute data unit header, and the attribute slice data may be referred to as an attribute data unit data.

FIG. 46 shows an embodiment of a syntax structure of an attribute slice header (attribute_slice_header( )) according to the present disclosure.

The attribute slice header (attribute_slice_header( )) according to the embodiments may include an ash_attr_parameter_set_id field, an ash_attr_sps_attr_idx field, an ash_attr_geom_slice_id field, an ash_attr_layer_qp_delta_present_flag field, and an ash_attr_region_qp_delta_present_flag field.

When the value of the aps_slice_qp_delta_present_flag field of the APS is TRUE (e.g., 1), the attribute slice header (attribute_slice_header( )) according to the embodiments may further include a ash_attr_qp_delta_luma field. When the value of the attribute_dimension_minus1 [ash_attr_sps_attr_idx] field is greater than 0, the attribute slice header may further include an ash_attr_qp_delta_chroma field.

The ash_attr_parameter_set_id field specifies the value of the aps_attr_parameter_set_id field of the current active APS.

The ash_attr_sps_attr_idx field specifies an attribute set in the current active SPS.

The ash_attr_geom_slice_id field specifies the value of the gsh_slice_id field of the current geometry slice header.

The ash_attr_qp_delta_luma field specifies a luma delta quantization parameter qp derived from the initial slice qp in the active attribute parameter set.

The ash_attr_qp_delta_chroma field specifies the chroma delta qp derived from the initial slice qp in the active attribute parameter set.

The variables InitialSliceQpY and InitialSliceQpC are derived as follows.

InitialSliceQpY=aps_attrattr_initial_qp+ash_attr_qp_delta_luma

InitialSliceQpC=aps_attrattr_initial_qp+aps_attr_chroma_qp_offset+ash_attr_qp_delta_chroma The ash_attr_layer_qp_delta_present_flag field specifies whether the ash_attr_layer_qp_delta_luma field and the ash_attr_layer_qp_delta_chroma field are present in the ASH for each layer. For example, when the value of the ash_attr_layer_qp_delta_present_flag field is 1, it indicates that the ash_attr_layer_qp_delta_luma field and the ash_attr_layer_qp_delta_chroma field are present in the ASH. When the value is 0, it indicates that the fields are not present.

When the value of the ash_attr_layer_qp_delta_present_flag field is TRUE, the ASH may further include an ash_attr_num_layer_qp_minus1 field.

ash_attr_num_layer_qp_minus1 plus 1 indicates the number of layers through which the ash_attr_qp_delta_luma field and the ash_attr_qp_delta_chroma field are signaled. When the ash_attr_num_layer_qp field is not signaled, the value of the ash_attr_num_layer_qp field will be 0. According to embodiments, NumLayerQp specifying the number of layers may be obtained by adding 1 to the value of the ash_attr_num_layer_qp_minus1 field (NumLayerQp=ash_attr_num_layer_qp_minus1+1).

According to embodiments, when the value of the ash_attr_layer_qp_delta_present_flag field is TRUE, the geometry slice header may include a loop iterated as many times as the value of NumLayerQp. In this case, in an embodiment, i may be initialized to 0 and incremented by 1 every time the loop is executed, and the loop is iterated until the value of i reaches the value of NumLayerQp. This loop contains an ash_attr_layer_qp_delta_luma[i] field. Also, when the value of the attribute_dimension_minus1[ash_attr_sps_attr_idx] field is greater than 0, the loop may further include an ash_attr_layer_qp_delta_chroma[i] field.

The ash_attr_layer_qp_delta_luma field indicates a luma delta quantization parameter qp from InitialSliceQpY in each layer.

The ash_attr_layer_qp_delta_chroma field indicates a chroma delta quantization parameter qp from InitialSliceQpC in each layer.

The variables SliceQpY[i] and SliceQpC[i] with i=0, . . . , NumLayerQPNumQPLayer−1 are derived as follows.

```
for ( i = 0; i < NumLayerQPNumQPLayer; i++) {
SliceQpY[i] = InitialSliceQpY + ash_attr_layer_qp_delta_luma[i]
SliceQpC[i] = InitialSliceQpC + ash_attr_layer_qp_delta_chroma[i]
}
```

ash_attr_region_qp_delta_present_flag equal to 1 indicates that ash_attr_region_qp_delta, region bounding box origin, and size are present in the current the attribute slice header (attribute_slice_header( )) according to the embodiments. ash_attr_region_qp_delta_present_flag equal to 0 indicates that the ash_attr_region_qp_delta, region bounding box origin, and size are not present in the current attribute slice header.

That is, when the value of the ash_attr_layer_qp_delta_present_flag field is 1, the attribute slice header may further include an ash_attr_qp_region_box_origin_x field, an ash_attr_qp_region_box_origin_y field, an ash_attr_qp_region_box_origin_z field, an ash_attr_qp_region_box_width field, an ash_attr_qp_region_box_height field, an ash_attr_qp_region_box_depth field, and an ash_attr_region_qp_delta field.

The ash_attr_qp_region_box_origin_x field indicates the x offset of the region bounding box relative to slice_origin_x.

The ash_attr_qp_region_box_origin_y field indicates the y offset of the region bounding box relative to slice_origin_y.

The ash_attr_qp_region_box_origin_z field indicates the z offset of the region bounding box relative to slice_origin_z.

The ash_attr_qp_region_box_size_width field indicates the width of the region bounding box.

The ash_attr_qp_region_box_size_height field indicates the height of the region bounding box.

The ash_attr_qp_region_box_size_depth field indicates the depth of the region bounding box.

The ash_attr_region_qp_delta field indicates delta qp from SliceQpY[i] and SliceQpC[i] of a region specified by the ash_attr_qp_region_box field.

According to embodiments, the variable RegionboxDeltaQp specifying a region box delta quantization parameter is set equal to the value of the ash_attr_region_qp_delta field (RegionboxDeltaQp=ash_attr_region_qp_delta).

FIG. 43 shows an embodiment of a syntax structure of an attribute data unit header (or referred to as an attribute slice header) for information on segmented (separated) slices and/or information related to direct coding according to embodiments.

The attribute data unit header according to the embodiments may include a slice_id field and a ref_slice_id field.

slice_id specifies an identifier for identifying a data unit (i.e., a slice). That is, slice_id specifies an indicator for distinguishing a slice or a data unit, and may deliver an indicator for a data unit (or called a slice) belonging to a slice layer.

The ref_slice_id field may be used to indicate a slice that must precede the current slice for decoding of the current slice (see, for example, the headers of FIGS. 19 to 21).

According to embodiments, when attr_scalable_transmission_enable_flag field included in the APS is equal to 1 and aligned_slice_structure_enabled_flag is equal to 1, the attribute data unit header may further include an aligned_geom_data_unit_id field. When aligned_slice_structure_enabled_flag is equal to 0, the attribute data unit header may further include a scalable_layer_id field and a num_tree_depth_in_data_unit field.

When the attribute data unit conforms to the scalable transmission layer structure/slice structure of the geometry data unit, the aligned_geom_data_unit_id field may carry a corresponding geometry data unit id.

scalable_layer_id may specify an identifier of a scalable layer related to a slice (or data unit). That is, it specifies an indicator for a scalable layer constituting scalable transmission. According to embodiments, when a scalable layer is composed of multiple slices, common information may be carried in the scalable_layer_id field in a parameter set, and other individual information may be carried in the data unit header of FIG. 47 according to slices.

num_tree_depth_in_data_unit may indicate the number of tree depths including nodes belonging to a data unit (i.e., a slice).

According to embodiments, the attribute data unit header includes a loop iterated as many times as the value of num_tree_depth_in_data_unit. In an embodiment, i is initialized to 0, and is incremented by 1 each time the loop is executed. The loop is iterated until the value of i reaches the value of num_tree_depth_in_data_unit. This loop may include a tree_depth[i] field and a num_nodes[i] field.

tree_depth[i] may indicate the i-th tree depth. That is, tree_depth may indicate a tree depth.

num_nodes[i] may indicate the number of nodes included in the i-th tree depth. That is, num_nodes[i] may indicate the number of nodes belonging to the i-th tree depth (tree_depth) among the nodes belonging to a data unit.

According to embodiments, the information on the segmented (separated) slices and/or information related to direct coding of FIG. 47 may be included at any position in the attribute slice header (i.e., attribute data unit header) of FIG. 46.

FIG. 47 shows an embodiment of a syntax structure of attribute_slice_data( ) according to the present disclosure. attribute_slice_data( ) according to the embodiments may carry an attribute bitstream belonging to a corresponding slice. The attribute_slice_data( ) may include attributes or attribute-related data in relation to some or all of the point clouds.

In the attribute slice data (attribute_slice_data( )) of FIG. 48, dimension=attribute_dimension[ash_attr_sps_attr_idx] indicates the attribute_dimension of an attribute set identified by the ash_attr_sps_attr_idx field in the attribute slice header. The attribute_dimension indicates the number of components constituting an attribute. An attributes according to embodiments indicates reflectance, color, or the like. Therefore, the number of components differs among attributes. For example, an attribute corresponding to color may have three color components (e.g., RGB). Accordingly, an attribute corresponding to reflectance may be a mono-dimensional attribute, and an attribute corresponding to color may be a three-dimensional attribute.

The attributes according to the embodiments may be attribute-encoded per dimension.

For example, an attribute corresponding to reflectance and an attribute corresponding to color may be each attribute-encoded. Also, attributes according to the embodiments may be attribute-encoded together regardless of the dimensions. For example, an attribute corresponding to reflectance and an attribute corresponding to color may be attribute-encoded together.

In FIG. 48, zerorun specifies the number of 0' prior to residual.

Also, in FIG. 48, according to an embodiment, i denotes the value of the i-th point for the attribute. In one embodiment, an attr_coding_type field and a lifting_adaptive_prediction_threshold field are signaled in the APS.

MaxNumPredictors in FIG. 48 is a variable used in the point cloud data decoding process, and may be obtained based on the value of the lifting_adaptive_prediction_threshold field signaled in the APS as follows.

MaxNumPredictors=lifting_max_num_direct_predicots+1

Here, lifting_max_num_direct_predictors indicates the maximum number of predictors to be used for direct prediction.

predIndex[i] according to the embodiments specifies the predictor index (or referred to as prediction mode) to decode the i-th point value of the attribute. The value of the predIndex[i] ranges from 0 to the value of lifting_max_num_direct_predictors.

FIG. 49 shows a structure of a point cloud data transmission device according to embodiments.

The transmission device of FIG. 49 corresponds to the transmission device 10000 of FIG. 1, the point cloud video encoder 10002 of FIG. 1, the transmitter 10003 of FIG. 1, the acquisition 20000/encoding 20001/transmission 20002 of FIG. 2, the encoder of FIG. 4, the transmission device of FIG. 12, the device of FIG. 14, the encoder of FIG. 18, and the like. Each component of FIG. 49 may correspond to hardware, software, a processor, and/or a combination thereof.

Operations of the encoder and the transmitter according to the embodiments are described below.

When point cloud data is input to the transmission device, a geometry encoder 60010 encodes position information (geometry data (e.g., XYZ coordinates, phi-theta coordinates, etc.)), and an attribute encoder 60020 encodes attribute data (e.g., color, reflectance, intensity, grayscale, opacity, medium, material, glossiness, etc.).

The compressed (encoded) data is divided into units for transmission. The data may be divided, by a sub-bitstream generator 60040, into units suitable for selection of necessary information in the bitstream unit according to layering structure information and may then be packed.

According to embodiments, an octree coded geometry bitstream is input to an octree coded geometry bitstream segmentation part 60041, and a direct coded geometry bitstream is input to a direct coded geometry bitstream segmentation part 60042.

The octree coded geometry bitstream segmentation part 60041 divides the octree coded geometry bitstream into one or more groups and/or subgroups based on information about segmented (separated) slices and/or information related to direct coding generated by a layer-group structure generator 60030. Detailed description thereof will be skipped. For details, see the description of FIGS. 15 to 33 given above.

In addition, the direct coded geometry bitstream segmentation part 60042 divides the direct coded geometry bitstream into one or more groups and/or subgroups based on the information on the segmented (separated) slices and/or information related to direct coding generated by the layer-group structure generator 60030. Detailed description thereof will be skipped. For details, see the description of FIGS. 15 to 33 given above.

An output of the octree coded geometry bitstream segmentation part 60041 and an output of the direct coded geometry bitstream segmentation part 60042 are input to a geometry bitstream bonding part 60043.

The geometry bitstream bonding part 60043 performs a geometry bitstream bonding process based on the information on the segmented (separated) slices and/or information related to direct coding generated by the layer-group structure generator 60030, and outputs sub-bitstreams to a segmented slice generator 60045 on a layer group-by-layer group basis. For example, the geometry bitstream bonding part 60043 concatenates an AEC bitstream and a DC bitstream within a slice. Final slices are created by the geometry bitstream bonding part 60043.

A coded attribute bitstream segmentation part 60044 divides the coded attribute bitstream into one or more groups and/or subgroups based on the information on the segmented (separated) slices and/or information related to direct coding generated by the layer-group structure generator 60030. The one or more groups and/or subgroups of the attribute information may be linked with the one or more groups and/or subgroups for the geometry information, or may be independently generated. For details, see FIGS. 15 to 33 described above. Detailed description thereof will be skipped.

The segmented slice generator 60045 segments one slice into multiple slices according to the inputs received from the geometry bitstream bonding part 60043 and/or the coded attribute bitstream segmentation part 60044 based on the information about segmented (separated) slices and/or direct coding related information generated by a metadata generator 60050. Each sub-bitstream is carried in each slice segment. In this case, the AEC bitstream and the DC bitstream may be carried in one slice or may be carried in different slices.

A multiplexer 60060 multiplexes the output of the segmented slice generator 60045 and the output of the metadata generator 60050 for each layer, and provides a multiplexed output to a transmitter 60070. For the information on segmented (separated) slices and/or information related to direct coding generated by the layer-group structure generator 60030 and/or the metadata generator, refer to FIGS. 34 to 48.

That is, as proposed in the present disclosure, when different types of bitstreams (e.g., an AEC bitstream and a DC bitstream) are contained in one slice, the bitstreams (e.g., the AEC bitstream and DC bitstream) generated by the geometry encoder 60010 may be separated according to the purposes. Then, respective slices or adjacency information may be included in one slice according to the information on the segmented (separated) slices and/or information related to direct coding (i.e., layer-group information) generated by the layer-group structure generator 60030 and/or the metadata generator. According to embodiments, the information on the segmented (separated) slices and/or information related to direct coding (e.g., information such as bitstream type, bitstream_offset, bitstream_length, and a bitstream direction in addition to layer-group information according to each slice id, layer information included in a layer-group, the number of nodes, layer depth information, and the number of nodes included in a subgroup) may be transmitted through the metadata generator 60050. The information on the segmented (separated) slices and/or information related to direct coding (e.g., information such as bitstream type, bitstream_offset, bitstream_length, and a bitstream direction in addition to layer-group information according to each slice id, layer information included in a layer-group, the number of nodes, layer depth information, and the number of nodes included in a subgroup) may be signaled in the SPS, APS, GPS, geometry data unit header, attribute data unit header, or SEI message. For details of the information on the segmented (separated) slices and/or information related to direct coding (e.g., information such as bitstream type, bitstream_offset, bitstream_length, and a bitstream direction in addition to layer-group information according to each slice id, layer information included in a layer-group, the number of nodes, layer depth information, and the number of nodes included in a subgroup), see FIGS. 34 to 48. Detailed description thereof will be skipped.

FIG. 50 shows a structure of a point cloud data reception device according to embodiments.

The reception device according to the embodiments of FIG. 50 corresponds to the reception device 10004 of FIG. 1, the receiver 10005 of FIG. 1, the point cloud video decoder 10006 of FIG. 1, the transmission 20002/decoding 20003/rendering 20004 of FIG. 2, the decoder of FIGS. 10 and 11, the reception device of FIG. 13, the device of FIG. 14, and the like. Each component of FIG. 50 may correspond to hardware, software, a processor, and/or a combination thereof.

Operations of the decoder/receiver according to the embodiments are disclosed below as follows.

When a bitstream is input to the receiver 61010 of the reception device, the receiver 61010 outputs the bitstream to the demultiplexer 61020, and the demultiplexer 61020 divides a bitstream containing position information and attribute information, and signaling information including information on segmented (separated) slices and/or information related to direct coding.

The divided bitstream containing the position information and attribute information is output to a sub-bitstream classifier 61040, and the divided signaling information is output to a metadata parser 61030.

The sub-bitstream classifier 61040 processes the bitstream including the position information and the attribute information based on information in each header of one or more slices. Then, it outputs a bitstream (or sub-bitstream) containing the geometry information to a geometry decoder 61050, and a bitstream (or sub-bitstream) containing the attribute information to an attribute decoder 61060.

Alternatively, in this process, a layer required by the receiver may be selected. Geometry data and attribute data may be reconstructed from the classified bitstreams by the geometry decoder 61050 and the attribute decoder 61060, respectively, according to the characteristics of the data, and may then be converted into a format for final output by a renderer 61070.

According to embodiments, the sub-bitstream classifier 61040 may include a slice selector 61041, a bitstream splitter 61042, and a bitstream segment concatenator 61043. The sub-bitstream classifier 61040 may be referred to as a decoding pre-process.

According to embodiments, the sub-bitstream classifier 61040 may classify/select a bitstream based on the metadata (e.g., the information on segmented (separated) slices and/or information related to direct coding) acquired by the metadata parser.

The information on the segmented (separated) slices and/or information related to direct coding may include information such as bitstream type, bitstream_offset, bitstream_length, and a bitstream direction in addition to layer-group information according to each slice id, layer information included in a layer-group, the number of nodes, layer depth information, and the number of nodes included in a subgroup. Detailed description thereof will be skipped. For details, reference will be made to FIGS. 34 to 48.

According to embodiments, the slice selector 61040 selects one or more slices from among a plurality of slices based on the information on segmented (separated) slices and/or information related to direct coding parsed by the metadata parser 61030 for scalable decoding.

According to embodiments, when the selected slice contains different types of geometry bitstreams (e.g., an AEC bitstream and a DC bitstream), each bitstream may be separately decoded through the bitstream splitter 61042.

According to embodiments, an octree coding-based AEC bitstream and a DC bitstream may be separated in a corresponding slice and processed by the geometry decoder 61050. In this case, the AEC bitstream and the DC bitstream may be separated in the slice based on the information on the segmented (separated) slices and/or information related to direct coding (e.g., bitstream type, bitstream_offset, bitstream_length, bitstream direction information). Also, for the separated bitstreams, an operation of concatenating bitstream segments of the same type in original order may be included. This operation may be performed by the bitstream segment concatenator 61043. This operation may be included in a process for processing bitstreams separated by layer-groups into a continuous bitstream, and the bitstreams may be sorted in order based on layer-group information. Bitstreams that may be processed in parallel may be processed by the geometry decoder 61050 without the concatenation operation.

An operation of each component of the reception device of FIG. 50 may follow the operation of a corresponding component of the transmission device of FIG. 49 or a reverse process thereof.

Figure 51:
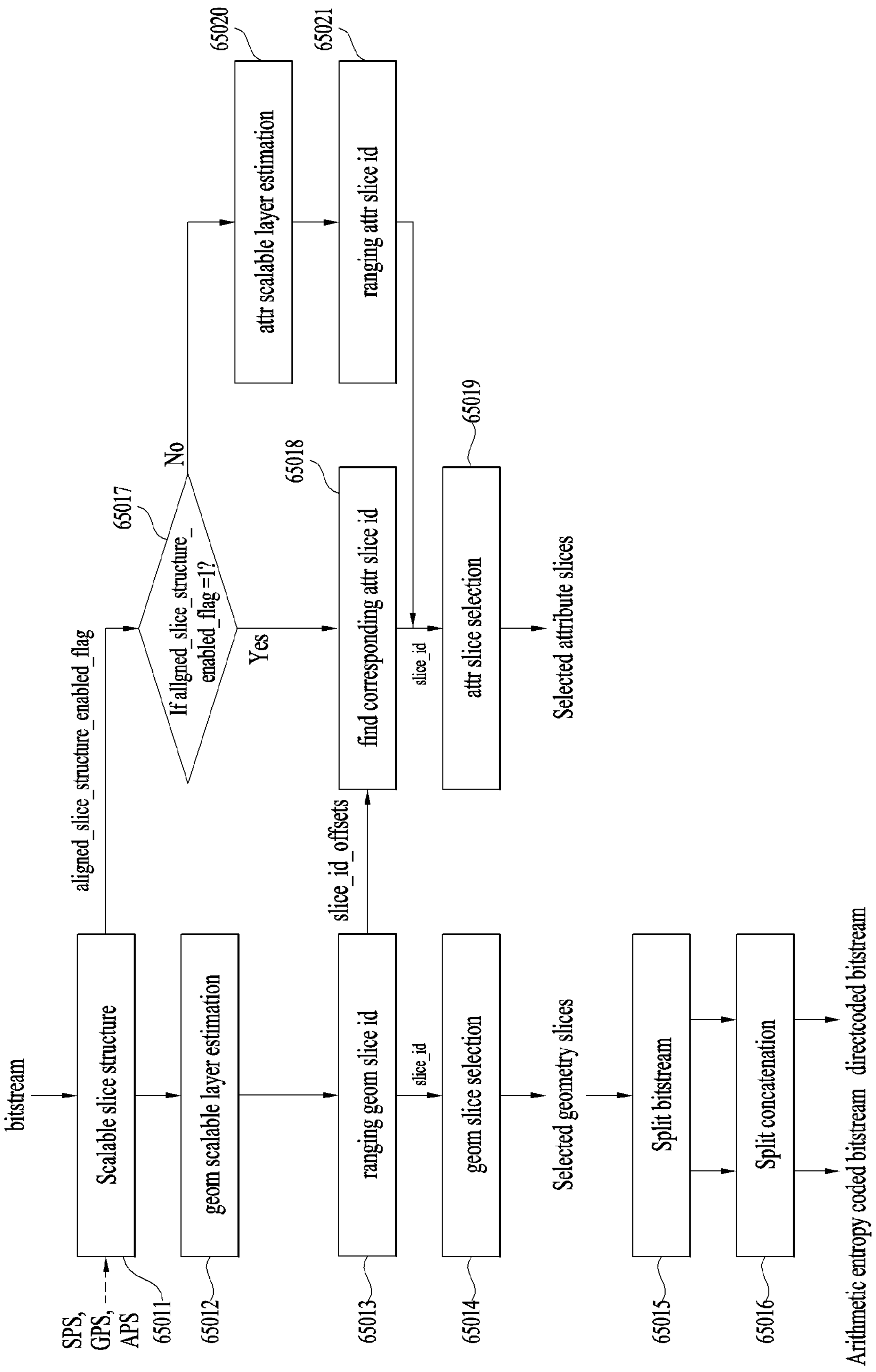
FIG. 51 is a flowchart illustrating an example of an operation of a point cloud reception device according to embodiments.

FIG. 51 is a flowchart of a point cloud data reception device according to embodiments.

That is, FIG. 51 illustrates the operation of the sub-bitstream classifier shown in FIG. 50 in more detail. In other words, it is assumed that the geometry data and the attribute data are scalably transmitted from the transmitter.

The reception device receives data on a slice-by-slice basis, and the metadata parser delivers parameter set information (e.g., information on segmented (separated) slices and/or information related to direct coding) in the SPS, GPS, APS, TPS, or the like. Based on the delivered information, scalability may be determined. When the data is scalable, the slice structure for scalable transmission is identified as shown in FIG. 51 (65011). First, the geometry slice structure may be identified based on information such as num_scalable_layers, scalable_layer_id, tree_depth_start, tree_depth_end, node_size, num_nodes, num_slices_in_scalable_layer, and slice_id carried in the GPS.

When aligned_slice_structure_enabled_flag is equal to 1 (65017), the attribute slice structure may also be identified in the same manner (e.g., geometry is encoded based on an octree, attributes are encoded based on scalable LoD or scalable RAHT, and geometry/attribute slice pairs generated through the same slice partitioning have the same number of nodes for the same octree layer).

When the structures are identical, the range of geometry slice id is determined according to the target scalable layer, and the range of attribute slice id is determined by slice_id_offset. A geometry/attribute slice is selected according to the determined ranges (65012 to 65014, 65018, and 65019).

When aligned_slice_sturcutre_enabled_flag=0, the attribute slice structure may be separately identified based on the information such as num_scalable_layers, scalable_layer_id tree_depth_start, tree_depth_end, node_size, num_nodes, num_slices_in_scalable_layer, and slice_id delivered through the APS, and the range of the necessary attribute slice id may be limited according to the scalable operation. Based on the range, a required slice may be selected through each slice id before reconstruction (65019, 65020, and 65021). The geometry/attribute slice selected through the above process is transmitted to the decoder as an input.

The decoding process according to the slice structure has been described above based on the scalable transmission or the scalable selection of the receiver. However, when scalable_transmission_enabled_flag is equal to 0, the process of ranging geom/attr slice id may be skipped and the entire slices may be selected such that they may be used even in the non-scalable operation. Even in this case, information on a preceding slice (e.g., a slice belonging to a higher layer or a slice specified by ref_slice_id) may be used through the slice structure information delivered through a parameter set such as the SPS, GPS, APS, or TPS (e.g., information on the segmented (separated) slices and/or information related to direct coding).

As described above, the bitstream may be received based on the scalable transmission, and the scalable bitstream structure may be identified based on the parameter information included in the bitstream. A geometry scalable layer may be estimated.

A geometry slice may be identified based on geom_slice_id.

A geometry slice may be selected based on slice_id.

The decoder may decode the selected geometry slice.

When aligned_slice_structure_enabled_flag contained in the bitstream is equal to 1, the attribute slice ID corresponding to the geometry slice may be checked. An attribute slice may be accessed based on slice_id_offset.

An attribute slice may be selected based on slice_id.

The decoder may decode the selected attribute slice.

When aligned_slice_structure_enabled_flag is not equal to 1, an attribute scalable layer may be estimated. An attribute slice may be identified based on the attribute slice id.

An attribute slice may be selected based on slice_id.

In the present disclosure, when different types of geometry bitstreams (e.g., an LM AEC bitstream and a DC bitstream) are present, all slices included in the range for the different bitstreams may be selected in the slice selection operation. When the different types of bitstreams are included in one slice, the bitstreams may be separated based on offset information and length information, and the separated bitstreams may be concatenated into one bitstream for decoding according to layer-group order (65015, 65016). This operation may be included in a process of processing bitstreams separated by layer-groups into a continuous bitstream. The bitstreams may be sorted in order based on layer-group information. Bitstreams that may be processed in parallel may be processed by the decoder without the concatenation operation.

The transmission device according to the embodiments has the following effects.

For point cloud data, the transmission device may divide and transmit compressed data according to a specific criterion. When layered coding according to the embodiments is used, the compressed data may be divided and transmitted according to layers. Accordingly, the storage and transmission efficiency may be increased on the transmitting side.

Referring to FIGS. 15 and 16, the geometry and attributes of the point cloud data may be compressed and provided. In the PCC-based service, the compression rate or the amount of data may be adjusted according to the receiver performance or transmission environment.

In the case where point cloud data is configured in one slice, when the receiver performance or transmission environment changes, 1) a bitstream suitable for each environment may be transcoded and stored separately, and may be selected at the time of transmission, or 2) or the transcoding operation may be needed prior to transmission. In this case, if the number of receiver environments to be supported increases or the transmission environment frequently changes, issues related to the storage space or a delay resulting from transcoding may be raised.

Figure 52:
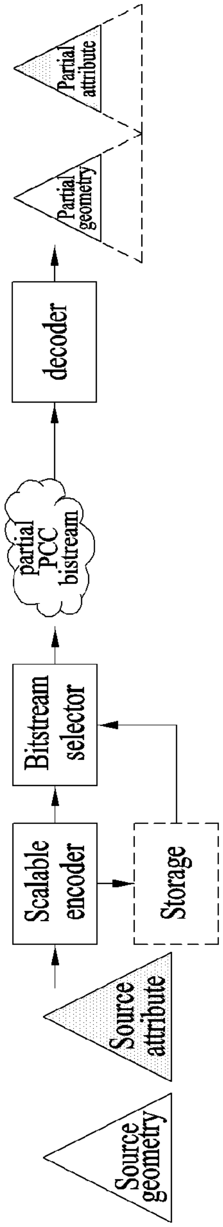
FIG. 52 illustrates encoding, transmission, and decoding of point cloud data according to embodiments.

FIG. 52 illustrates transmission/reception of point cloud data according to embodiments.

In order to address the above-described issues, the methods/devices according to the embodiments may process point cloud data as illustrated in FIG. 52.

When the compressed data is divided and transmitted according to layers according to the embodiments, only a necessary part of the pre-compressed data may be selectively transmitted in the bitstream stage without separate transcoding. The storage space may be efficiently operated as only one storage space is required per stream. In addition, efficient transmission may be implemented in terms of (bitstream selector) bandwidth because only necessary layers are selected before transmission.

The reception method/device according to the embodiments may provide the following effects.

According to embodiments, compressed data may be divided and transmitted according to a single criterion for point cloud data. When layered coding is used, the compressed data may be divided and transmitted according to layers. In this case, the efficiency on the receiving side may be increased.

FIGS. 15 and 16 illustrates the operations at the transmitting and receiving sides in the case of transmission of point cloud data composed of layers. In this case, when information for reconstructing the entire PCC data is delivered regardless of the receiver performance, the receiver needs to reconstruct the point cloud data through decoding and then select only data corresponding to a required layer (data selection or sub-sampling). In this case, since the transmitted bitstream is already decoded, a delay may occur in the receiver aiming at low latency or decoding may fail depending on the receiver performance Therefore, when a bitstream is divided into slices and delivered, the receiver may selectively deliver the bitstream to the decoder according to the density of point cloud data to be represented according to decoder performance or an application field. In this case, since selection is performed before decoding, decoder efficiency may be increased, and decoders of various performances may be supported.

The method/device according to the embodiments may deliver a bitstream using a layer group and a sub-group, and further perform slice segmentation.

Each part, module, or unit described above may be a software, processor, or hardware part that executes successive procedures stored in a memory (or storage unit). Each of the steps described in the above embodiments may be performed by a processor, software, or hardware parts. Each module/block/unit described in the above embodiments may operate as a processor, software, or hardware. In addition, the methods presented by the embodiments may be executed as code. This code may be written on a processor readable storage medium and thus read by a processor provided by an apparatus.

In the specification, when a part “comprises” or “includes” an element, it means that the part further comprises or includes another element unless otherwise mentioned. Also, the term “ . . . module (or unit)” disclosed in the specification means a unit for processing at least one function or operation, and may be implemented by hardware, software or combination of hardware and software.

Although embodiments have been explained with reference to each of the accompanying drawings for simplicity, it is possible to design new embodiments by merging the embodiments illustrated in the accompanying drawings. If a recording medium readable by a computer, in which programs for executing the embodiments mentioned in the foregoing description are recorded, is designed by those skilled in the art, it may fall within the scope of the appended claims and their equivalents.

The apparatuses and methods may not be limited by the configurations and methods of the embodiments described above. The embodiments described above may be configured by being selectively combined with one another entirely or in part to enable various modifications.

Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the apparatuses of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the apparatus according to the embodiments may include one or more processors capable of executing one or more programs. The one or more programs may perform any one or more of the operations/methods according to the embodiments or include instructions for performing the same. Executable instructions for performing the method/operations of the apparatus according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion. In this document, the term "I" and "," should be interpreted as indicating "and/or." For instance, the expression "A/B" may mean "A and/or B." Further, "A, B" may mean "A and/or B." Further, "A/B/C" may mean "at least one of A, B, and/or C." "A, B, C" may also mean "at least one of A, B, and/or C."

Further, in the document, the term "or" should be interpreted as "and/or." For instance, the expression "A or B" may mean 1) only A, 2) only B, and/or 3) both A and B. In other words, the term "or" in this document should be interpreted as "additionally or alternatively."

Various elements of the embodiments may be implemented by hardware, software, firmware, or a combination thereof. Various elements in the embodiments may be executed by a single chip such as a single hardware circuit. According to embodiments, the element may be selectively executed by separate chips, respectively. According to embodiments, at least one of the elements of the embodiments may be executed in one or more processors including instructions for performing operations according to the embodiments.

The operations according to the embodiments described in this document may be performed by a transmission/reception device including one or more memories and/or one or more processors according to the embodiments. The one or more memories may store programs for processing/controlling the operations according to the embodiments, and the one or more processors may control the various operations described in this document. The one or more processors may be referred to as a controller or the like. The operations according to the embodiments may be performed by firmware, software, and/or a combination thereof. The firmware, software, and/or combination thereof may be stored in the processors or the memories.

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signal unless context clearly dictates otherwise.

The terminology used to describe the embodiments is used for the purpose of describing particular embodiments only and is not intended to be limiting of the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

Mode for Disclosure

As described above, related contents have been described in the best mode for carrying out the embodiments.

INDUSTRIAL APPLICABILITY

As described above, the embodiments may be fully or partially applied to the point cloud data transmission/reception device and system. It will be apparent to those skilled in the art that variously changes or modifications may be made to the embodiments within the scope of the embodiments. Thus, it is intended that the embodiments cover the modifications and variations of this disclosure provided they come within the scope of the appended claims and their equivalents.

The invention claimed is:

1. A method of encoding point cloud data, the method comprising:

encoding geometry data of the point cloud data in a subgroup, wherein the subgroup belongs to a layer group, wherein the subgroup is identified by subgroup identification information and layer group identification information, wherein the layer group is a group of consecutive levels of a geometry tree, wherein the layer group includes a plurality of nodes and each level of the layer group includes one or more nodes, and wherein the layer group is identified by the layer group identification information and includes one or more subgroups;

encoding attribute data of the point cloud data in a subgroup that belongs to a layer group based on the geometry data; and transmitting the encoded geometry data, the encoded attribute data, and signaling data, wherein the signaling data includes the layer group identification information and the subgroup identification information, wherein the subgroup for encoding the geometry data and the subgroup for encoding the attribute data are identified by a common pair of the layer group identification information and the subgroup identification information.

2. The method of claim 1, wherein nodes in the geometry tree are grouped into at least the layer group or the subgroup.

3. The method of claim 1, wherein the signaling data further comprises entropy continuation enabled information for specifying whether or not entropy is used continuously.

4. A device for encoding point cloud data, the device comprising:

a geometry encoder configured to encode geometry data of the point cloud data in a subgroup, wherein the subgroup belongs to a layer group, wherein the subgroup is identified by subgroup identification information and layer group identification information, wherein the layer group is a group of consecutive levels of a geometry tree, wherein the layer group includes a plurality of nodes and each level of the layer group includes one or more nodes, and wherein the layer group is identified by the layer group identification information and includes one or more subgroups;

an attribute encoder configured to encode attribute data of the point cloud data in a subgroup that belongs to a layer group based on the geometry data; and a transmitter configured to transmit the encoded geometry data, the encoded attribute data, and signaling data, wherein the signaling data includes the layer group identification information and the subgroup identification information, and wherein the subgroup for encoding the geometry data and the subgroup for encoding the attribute data are identified by a common pair of the layer group identification information and the subgroup identification information.

5. The device of claim 4, wherein nodes in the geometry tree are grouped into at least the layer group or the subgroup.

6. The device of claim 4, wherein the signaling data further comprises entropy continuation enabled information for specifying whether or not entropy is used continuously.

7. A method of decoding point cloud data, the method comprising:

receiving geometry data, attribute data, and signaling data;

decoding the geometry data in a subgroup based on the signaling data, wherein the subgroup belongs to a layer group, wherein the subgroup is identified by subgroup identification information and layer group identification information, wherein the layer group is a group of consecutive levels of a geometry tree, wherein the layer group includes a plurality of nodes and each level of the layer group includes one or more nodes, and wherein the layer group is identified by the layer group identification information and includes one or more subgroups; and decoding the attribute data in a subgroup that belongs to a layer group based on the signaling data and the decoded geometry data, wherein the signaling data includes the layer group identification information and the subgroup identification information, and wherein the subgroup for decoding the geometry data and the subgroup for decoding the attribute data are identified by a common pair of the layer group identification information and the subgroup identification information.

8. The method of claim 7, wherein nodes in the geometry tree are grouped into at least the layer group or the subgroup.

9. The method of claim 7, wherein the signaling data further comprises entropy continuation enabled information for specifying whether or not entropy is used continuously.

10. A device for decoding point cloud data, the device comprising:

a receiver to receive geometry data, attribute data, and signaling data;

a geometry decoder to decode the geometry data in a subgroup based on the signaling data, wherein the subgroup belongs to a layer group, wherein the subgroup is identified by subgroup identification information and layer group identification information, wherein the layer group is a group of consecutive levels of a geometry tree, wherein the layer group includes a plurality of nodes and each level of the layer group includes one or more nodes, and wherein the layer group is identified by the layer group identification information and includes one or more subgroups; and an attribute decoder to decode the attribute data in a subgroup that belongs to a layer group based on the signaling data and the decoded geometry data, wherein the signaling data includes the layer group identification information and the subgroup identification information, and wherein the subgroup for decoding the geometry data and the subgroup for decoding the attribute data are identified by a common pair of the layer group identification information and the subgroup identification information.

11. The device of claim 10, wherein nodes in the geometry tree are grouped into at least the layer group or the subgroup.

12. The device of claim 10, wherein the signaling data further comprises entropy continuation enabled information for specifying whether or not entropy is used continuously.

* * * * *